(12) United States Patent
    Fujii et al.

(10) Patent No.: US 11,010,018 B2
(45) Date of Patent: May 18, 2021

(54) SYSTEM INCLUDING WEARABLE DEVICE AND ELECTRONIC DEVICE

(71) Applicant: Toshiba Client Solutions CO., LTD., Tokyo (JP)

(72) Inventors: Tetsuya Fujii, Tokyo (JP); Ryo Hatano, Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 148 days.

(21) Appl. No.: 16/040,395

(22) Filed: Jul. 19, 2018

(65) Prior Publication Data

US 2019/0205010 A1    Jul. 4, 2019

(30) Foreign Application Priority Data

Dec. 28, 2017    (JP) .............................. JP2017-253062

(51) Int. Cl.
  *G06F 3/048*    (2013.01)
  *G06F 3/0481*   (2013.01)
  (Continued)

(52) U.S. Cl.
  CPC ..... *G06F 3/04817* (2013.01); *G02B 27/0172* (2013.01); *G06F 1/163* (2013.01);
  (Continued)

(58) Field of Classification Search
  CPC .. G06F 3/0481; G06F 3/04817; G06F 3/0483; G06F 3/017; G06F 1/163; G06F 3/023; G06F 3/03547; G06F 3/0482; G06F 3/0485; G06F 3/0486; G06F 3/0487; G02B 27/0093; G02B 27/0172; G02B 2027/0138; G02B 2027/0178; G06T 15/20; H04L 29/06476
  See application file for complete search history.

(56) References Cited

U.S. PATENT DOCUMENTS 6,611,242 B1    8/2003  Hongo et al.
8,914,472 B1 *  12/2014  Lee ................... H04L 29/06476
                                                              709/219
(Continued)

FOREIGN PATENT DOCUMENTS

| JP | 2000-299851 A | 10/2000 |
| JP | 2005-242830 A | 9/2005 |
| JP | 2006-238110 A | 9/2006 |
| JP | 2007-072733 A | 3/2007 |

*Primary Examiner* — Haoshian Shih
(74) *Attorney, Agent, or Firm* — Knobbe, Martens, Olson & Bear, LLP

(57) ABSTRACT

According to one embodiment, a wearable device includes a first user interface and a display. An electronic device includes a second user interface and causes the display to display a home screen. The home screen displayed in the display is divided into variable-sized first, second, and third areas. One of the first area, the second area, and the third area is selectable by an operation from the first user interface or the second user interface. The selected area is larger than non-selected areas among the first area, the second area, and the third area. A central icon in the selected area is larger than other icons in the selected area. A display format of the central icon in the selected area is different from a display format of the other icons in the selected area.

20 Claims, 34 Drawing Sheets

(51) Int. Cl.
*G02B 27/01* (2006.01)
*G06F 3/023* (2006.01)
*G06F 3/0482* (2013.01)
*G06F 3/0485* (2013.01)
*G06F 3/0486* (2013.01)
*G06F 3/0487* (2013.01)
*G06F 3/0354* (2013.01)
*G06F 1/16* (2006.01)

(52) U.S. Cl.
CPC .......... *G06F 3/023* (2013.01); *G06F 3/03547* (2013.01); *G06F 3/0482* (2013.01); *G06F 3/0485* (2013.01); *G06F 3/0486* (2013.01); *G06F 3/0487* (2013.01); *G02B 2027/0138* (2013.01); *G02B 2027/0178* (2013.01)

(56) References Cited

U.S. PATENT DOCUMENTS

| | | | |
|---|---|---|---|
| 10,037,130 B2* | 7/2018 | Cho | G06F 3/016 |
| 10,424,117 B2* | 9/2019 | Li | G06T 15/20 |
| 2009/0013275 A1* | 1/2009 | May | G06F 3/0483 |
| | | | 715/765 |
| 2011/0138285 A1* | 6/2011 | Kuo | G06F 3/017 |
| | | | 715/727 |
| 2014/0189523 A1* | 7/2014 | Shuttleworth | G06F 3/04817 |
| | | | 715/741 |
| 2015/0309689 A1* | 10/2015 | Jin | G06F 3/04817 |
| | | | 715/765 |
| 2017/0115728 A1* | 4/2017 | Park | G02B 27/0093 |

* cited by examiner

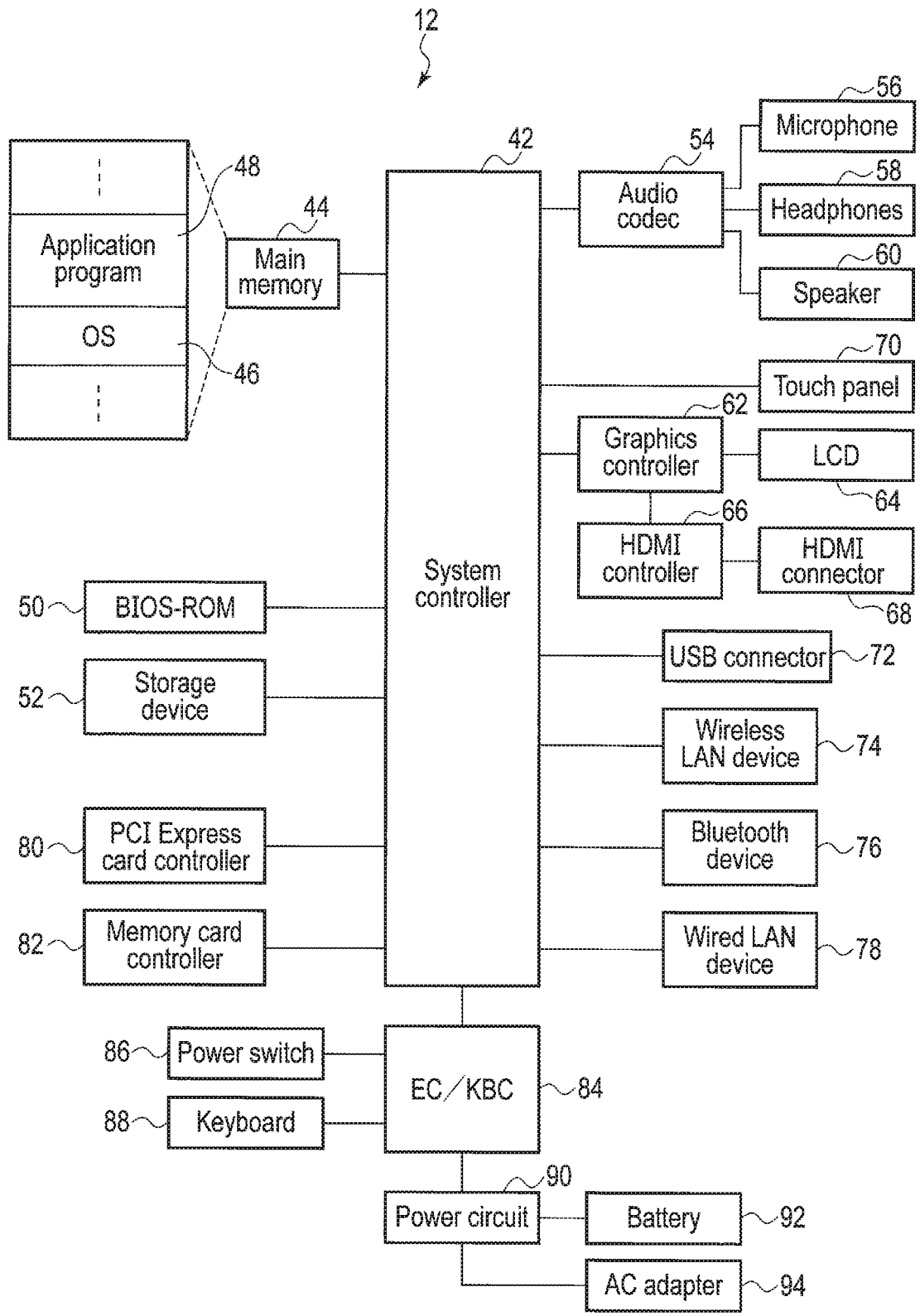
F I G. 2

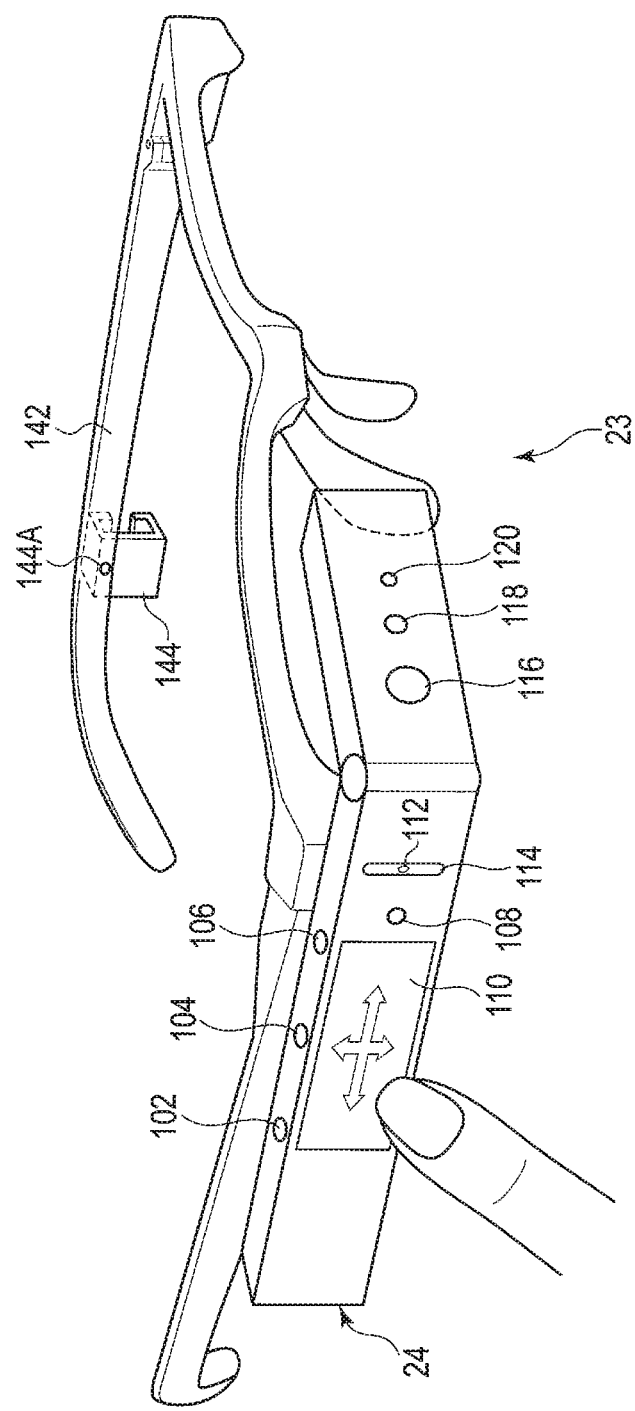
F I G. 3

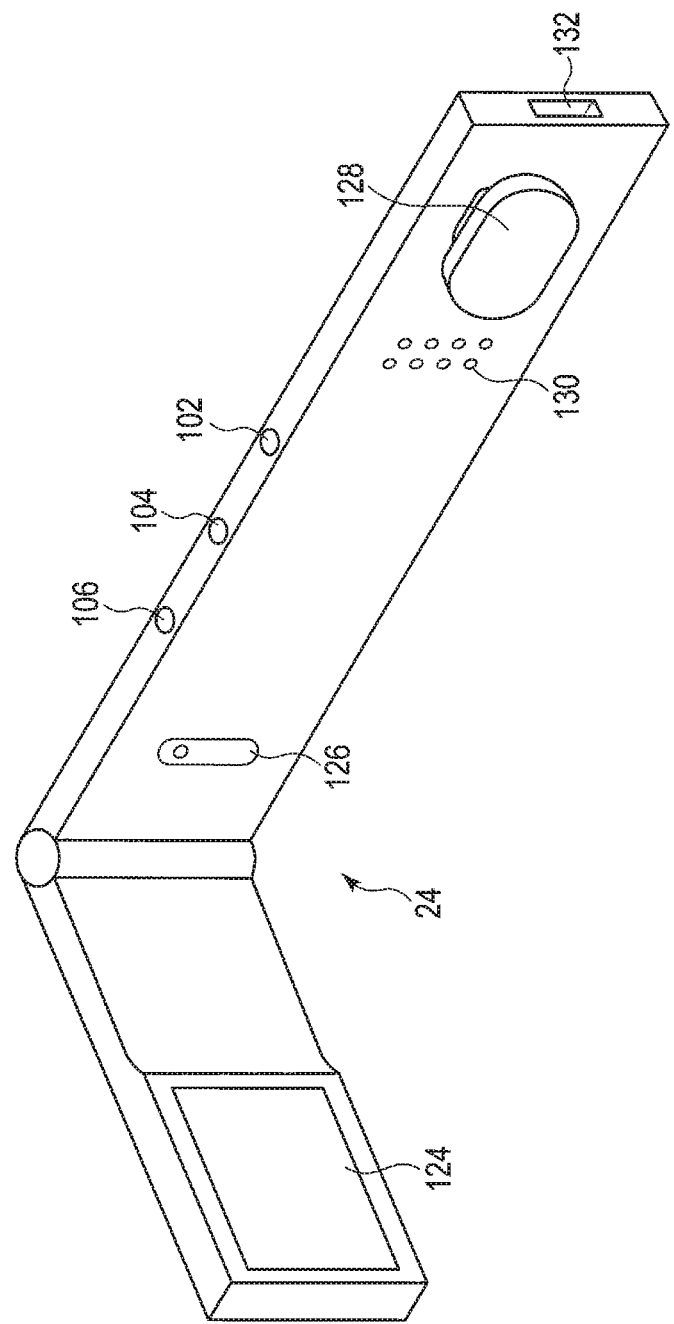
F I G. 4

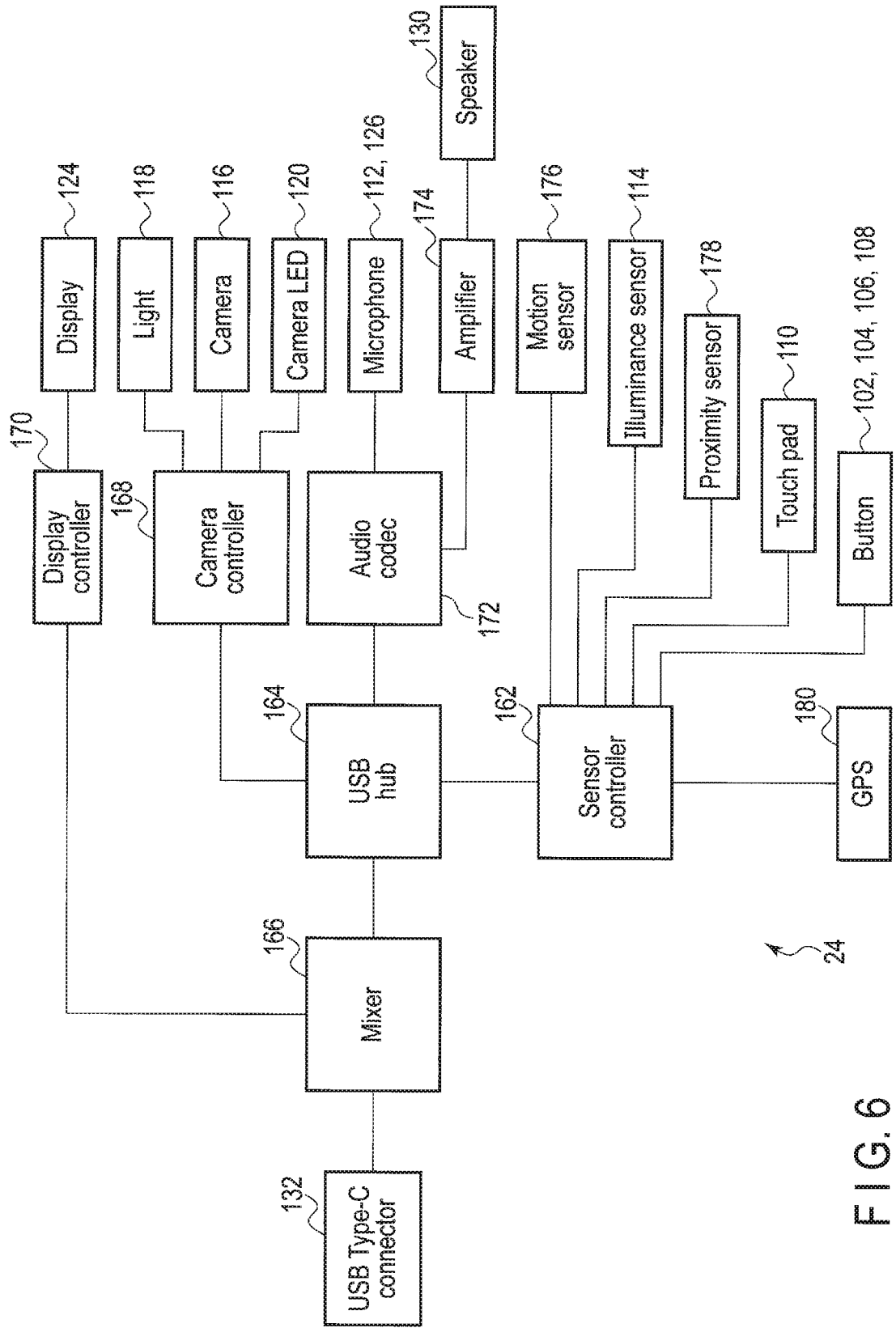
F I G. 6

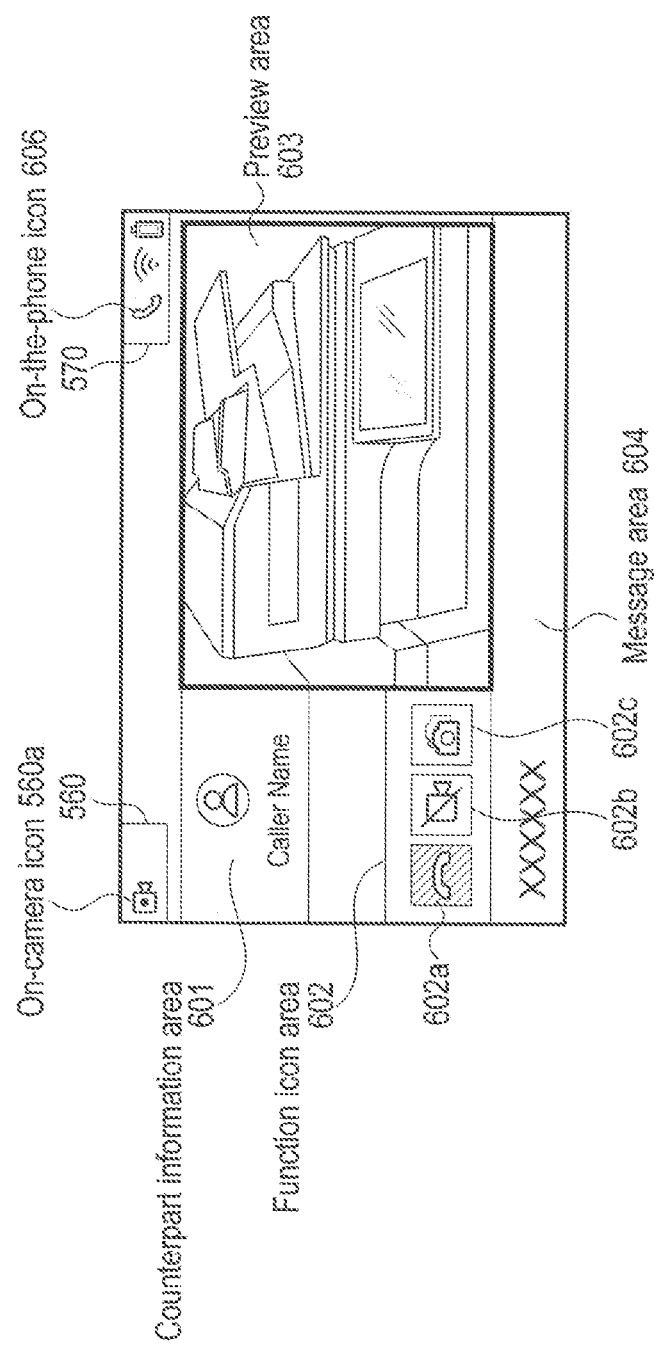
F I G. 16

SYSTEM INCLUDING WEARABLE DEVICE AND ELECTRONIC DEVICE

CROSS-REFERENCE TO RELATED APPLICATIONS

This application is based upon and claims the benefit of priority from Japanese Patent Application No. 2017-253062, filed Dec. 28, 2017, the entire contents of which are incorporated herein by reference.

FIELD

Embodiments described herein relate generally to a system including a wearable device and an electronic device.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and high processing capacity, and able to be used by a worker (user) on site, is needed separately from a data center (or cloud). Thereby, it is expected that promotion of the operational efficiency and productivity improvement at a workplace and the like, or load dispersion of data and improvement of a network environment will be achieved.

When the mobile edge computing device is provided with a display or a hardware keyboard, the worker has difficulty being dedicated to work. In order to solve this, every effort has been made to develop a mobile edge computing device provided with no display or hardware keyboard. If eyeglass-type wearable device is connected to such a mobile edge computing device, a display unit of the eyeglass-type wearable device may be used as a display of the mobile edge computing device, and the worker may check the display while performing the work.

An example of a possible application of such device is a remote support system. This system is expected to include a mobile PC operated by a workplace worker and an operator terminal operated by a supporter at the office or the like. The mobile PC and the operator terminal are connected together by the Internet or the like. Preferably, a video (also called moving image) and a photograph (also called a still image) of workplace may be transmitted from the mobile PC to the operator terminal, and a moving image and a still image (generically called image), documents and the like for work support may be transmitted from the operator terminal to the mobile PC. Preferably, the worker and the supporter may talk on the phone with each other.

Currently, no system suitable for such remote support as described above is present which includes a wearable device providing high visibility for the worker and an electronic device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an exemplary structure of an operator terminal 12 in FIG. 1.

FIG. 3 is a view showing an example of an external appearance of a wearable device 23 to be connected to a mobile PC 16 in FIG. 1.

FIG. 4 is a view showing an example of an external appearance of a main body 24 of the wearable device 23.

FIG. 6 is a block diagram showing an exemplary structure of the wearable device main body 24.

FIG. 16 is a diagram showing an example of a screen displayed on the wearable device 23 in a case where the mobile PC 16 (and the wearable device 23) and the operator terminal 12 are in a voice call session.

DETAILED DESCRIPTION

Figure 1:
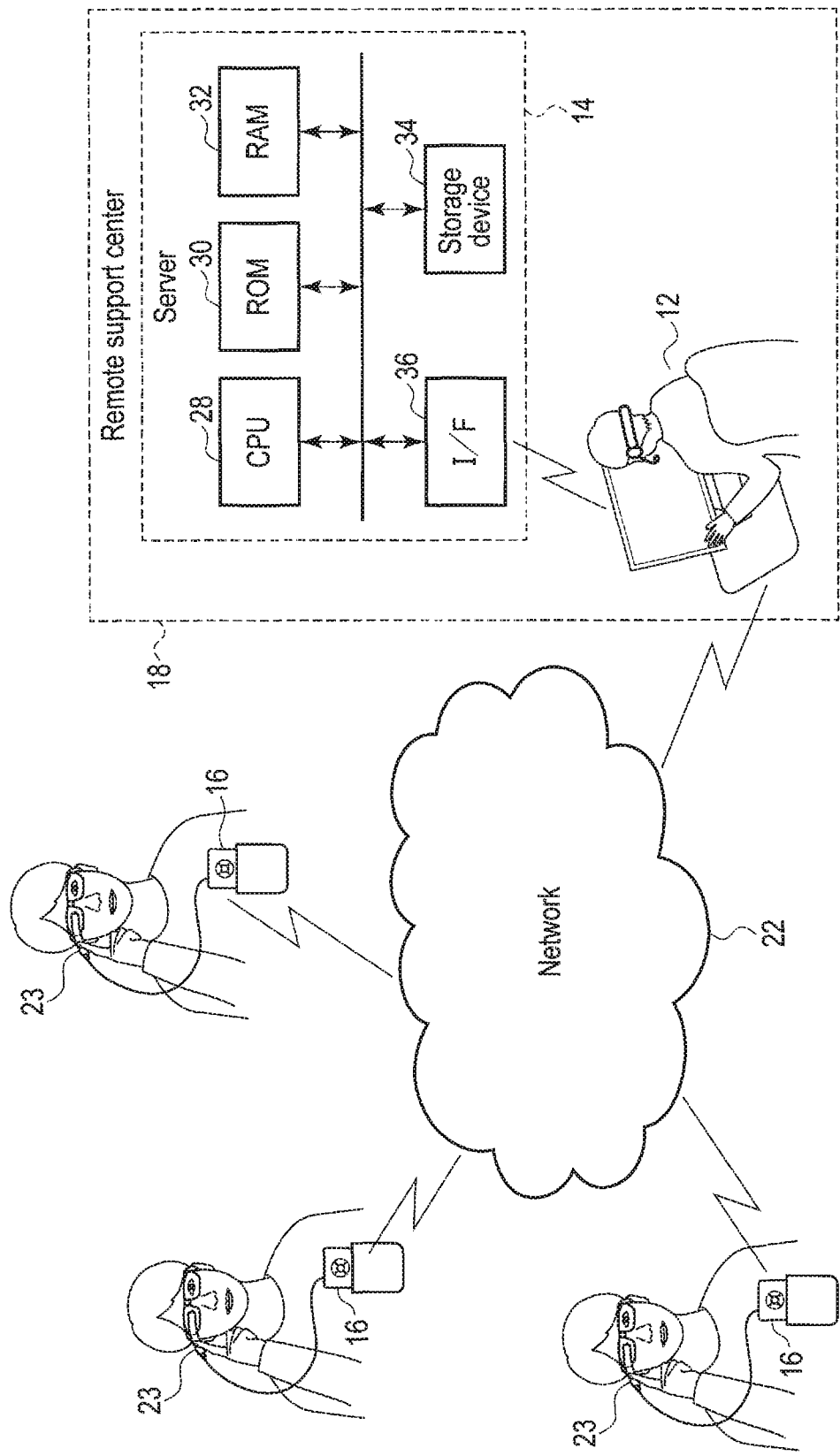
FIG. 1 is a block diagram showing an example of a remote support system including an electronic device of an embodiment.

Various embodiments will be described hereinafter with reference to the accompanying drawings.

In general, according to one embodiment, a system includes a wearable device comprising a first user interface and a display; and an electronic device comprising a second user interface and causing the display to display a home screen. The home screen is divided into variable-sized first, second, and third areas. First icons of a first type are displayed in the first area. Second icons of a second type are displayed in the second area. Third icons of a third type are displayed in the third area. One area of the first area, the second area, and the third area is selectable by an operation from the first user interface or the second user interface. The one area is larger than non-selected areas among the first area, the second area, and the third area. The first icons, the second icons, and the third icons are scrollable by an operation from the first user interface or the second user interface. A central icon in the one area is larger than other icons in the one area. A display format of the central icon in the one area is different from a display format of the other icons in the one area.

Embodiments will be described hereinafter with reference to the accompanying drawings. The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

[Remote Support System]

FIG. 1 is a block diagram showing an example of a remote support system configured to realize edge computing. The remote support system is a system used by an operator at the rear to support a user, for example, a worker (also called a user) at a workplace from a remote place. Examples of work at the workplace include a complicated maintenance service, picking operation in a distribution warehouse, monitoring of a workplace, disaster relief/medical support, and the like. The worker side of the workplace is also called a front end, and the operator side at the rear is also called a back end. The remote support system includes a mobile personal computer (also called a mobile PC or a mobile edge computing device in some cases) 16 and an eyeglass-type wearable device 23 both carried by the worker, and a remote support center (data center) 18 at a location remote from the worker. The mobile PC 16 and the remote support center 18 are connected together via a network 22 so as to be able to communicate with each other. The mobile PC 16 and the remote support center 18 may be connected to the network 22 through wired LAN cables or may be connected to the network 22 through a wireless LAN, Bluetooth (registered trade mark), and the like.

A wearable device 23 is connected to the mobile PC 16. Although FIG. 1 shows an example in which the wearable device 23 is connected to the mobile PC 16 through a cable, the wearable device 23 may also be connected to the mobile PC 16 through a wireless LAN, Bluetooth or the like. The wearable device 23 is provided with a camera and a display device. An image taken by the camera may be transmitted to the mobile PC 16, and the image transmitted from the mobile PC 16 may be displayed on the display device.

As shown in FIG. 1, it is also possible for a plurality of workers to communicate with each other through the network. In this case, communication may also be carried out through the remote support center 18, and communication can also be carried out only between the workers without being carried out through the operator of the remote support center 18.

The remote support center 18 includes a terminal (hereinafter referred to as an operator terminal) 12 operated by the operator supporting the workers, and a sever 14.

The remote support center 18 makes a voice call or an information exchange between the mobile PC 16 (and wearable device 23) and the operator terminal 12. It is possible to carry out video distribution of a real-time image taken with the wearable device 23 (connected to the mobile PC 16) to the operator terminal 12, and it is also possible to carry out mutual transmission/reception of an image between the mobile PC 16 and the operator terminal 12. Further, it is also possible to transmit a text message from the operator terminal 12 to the mobile PC 16. For example, in the picking operation at the distribution warehouse, a place of a picking item is displayed on the eyeglass-type wearable device 23, whereby hands-free picking can be realized.

The remote support typically includes, for example, the following functions.

(1) A voice call function of carrying out an interactive voice call between the mobile PC 16 and the operator terminal 12.

(2) A live video distribution function of carrying out video distribution of a real-time image taken with the wearable device 23 to the operator terminal 12 during a voice call.

(3) A function of carrying out transmission/reception of a still image between the mobile PC 16 and the operator terminal 12 during a voice call (The mobile PC 16 transmits a taken still image or a capture image being video-distributed to the operator terminal 12. The operator terminal 12 edits the received image by writing characters, pictures, and the like, and transmits the edited image to the mobile PC 16. The still image received by the mobile PC 16 is stored in a folder in the mobile PC 16, and can be browsed.).

(4) A screen sharing function of displaying the entire desk-top screen of the operator terminal 12 or a window of an arbitrary application program on the wearable device 23 during a voice call.

(5) A text message transmitting function of transmitting a text message from the operator terminal 12 to the mobile PC 16.

The server 14 is configured to carry out processing for remote support in place of or in cooperation with the operator terminal 12, and is provided with a processor (CPU) 28, ROM 30, RAM 32, and a storage device 34 constituted of a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 includes a desktop PC, a notebook PC, and the like on a desk in an office where the operator does office work. The operator issues an instruction to the worker having the mobile PC 16 by a conversation or image while confirming the situation of the workplace on the basis of a real-time image by using the operator terminal 12.

The operator can write pictures, characters, and the like to the image file received from the mobile PC 16 by using the operator terminal 12 to edit the image file, transmit the edited image file to the mobile PC 16, and store the edited image file into the operator terminal 12.

The operator terminal 12 is provided with a system controller 42 including a processor. A main memory 44, a BIOS-ROM 50, a storage device 52 constituted of HDD or SSD, an audio codec 54, a graphics controller 62, a touch panel 70, a USB (registered trade mark) connector 72, a wireless LAN device 74, a Bluetooth device 76, a wired LAN device 78, a PCI Express (registered trade mark) card controller 80, a memory card controller 82, an embedded controller/keyboard controller (EC/KBC) 84, and the like are connected to the system controller 42.

The system controller 42 executes various programs to be loaded from the storage device 52 into the main memory 44. These programs include an operating system (OS) 46, and application program 48 for remote support. The system controller 42 also executes the Basic input/output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to headphones 58 or a speaker 60. Further, the audio codec 54 converts an analog audio signal input thereto from a microphone 56 into a digital signal. The microphone 56 and headphones 58 may be provided singly, and may also be provided in an integrated manner as an intercom.

The graphics controller 62 controls a liquid crystal display (LCD) 64 to be used as a display monitor of the operator terminal 12. The touch panel 70 is overlaid on the LCD 64, and is configured in such a manner as to allow a handwriting input operation to be carried out on the LCD 64 by means of a touch-pen or the like. An HDMI (registered trade mark) controller 66 is also connected to the graphics controller 62. The HDMI controller 66 is connected to an HDMI connector 68 for connection to an external display device.

The wireless LAN device 74 executes wireless LAN communication of the IEEE802.11 standard for the purpose of connection to the network 22. The Bluetooth device 76 executes wireless communication of the Bluetooth standard for the purpose of connection to an external device. The wired-LAN device 78 executes wired LAN communication of the IEEE802.3 standard for the purpose of connection to the network 22. As described above, the connection between the operator terminal 12 and the network 22 may be made by wireless communication or may be made by wired communication.

The PCI Express card controller 80 carries out communication of the PCI Express standard between the operator terminal 12 and an external device. The memory card controller 82 writes data into a memory card such as an SD (Secure Digital) card (registered trade mark), and reads data from the memory card.

The EC/KBC 84 is a power management controller, and, for example, the EC/KBC 84 is realized as a one-chip microcomputer incorporating therein also a keyboard controller configured to control a keyboard 88. The EC/KBC 84 has a function of powering on or powering off the operator terminal 12 according to an operation of a power switch 86. Control of the power-on and power-off is executed by cooperation between the EC/KBC 84 and a power circuit 90. Even while the operator terminal 12 is in the power-off state, the EC/KBC 84 operates by power from a battery 92 or an AC adaptor 94. The power circuit 90 uses the power from the battery 92 or from the AC adaptor 94 (to be connected as an external electric power supply) to generate the power to be supplied to each component.

[Wearable Device 23]

FIG. 3 shows an example of an external appearance of the wearable device 23 to be connected to the mobile PC 16. The wearable device 23 is provided with an eyeglass frame 142 and a wearable device main body 24. The eyeglass frame 142 may have a shape obtained by removing lenses from general eyeglasses and is worn on the face of the worker. The eyeglass frame 142 may have a structure to which eyeglasses can be attached. When the worker habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device main body 24 is attached to and detached from one of the mounting brackets 144 on the right or left temple. In FIG. 3, the mounting bracket 144 on the temple at the right side of the worker is hidden behind the wearable device main body 24, and hence is not shown. As described above, the wearable device main body 24 is provided with a display 124 (shown in FIG. 4) (referred to as a display unit in the claims). The display 124 is configured in such a way as to be viewed by one eye. Therefore, the mounting brackets 144 are provided on both the right and left temples so that the wearable device main body 24 can be attached to the mounting bracket on the dominant eye side. The wearable device main body 24 need not be detachably attached to the eyeglass frame 142 by means of the mounting bracket 144. The wearable devices 23 for the right eye and left eye in which the wearable device main bodies 24 are respectively fixed to the eyeglass frames 142 on the right and left frames may be prepared. Furthermore, the wearable device main body 24 may not be attached to the eyeglass frame 142, but may be attached to the head of the worker by using a helmet, a goggle, and the like.

An engaging piece 128 (shown in FIG. 4) of the wearable device main body 24 is forced between upper and lower frames of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backward and forward in the mounting bracket 144. Accordingly, the wearable device main body 24 is adjustable in the front-back direction so that the worker's eye can be brought to a focus on the display 124. Furthermore, the mounting bracket 144 is rotatable around an axis 144A perpendicular to the temple. After the wearable device main body 24 is attached to the eyeglass frame 142, the wearable device main body 24 is adjustable in the vertical direction so that the display 124 can be positioned on the worker's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the worker without detaching/reattaching the entire wearable device 23 from/to the face of the worker.

[Wearable Device Main Body 24]

The wearable device main body 24 is constituted of a side part to be along the temple of the eyeglass frame 142, and a front part to be positioned on the line of sight of one eyeball of the worker. The angle which the front part forms with the side part is adjustable.

As shown in FIG. 3, on the outside surface of the front part, a camera 116, a light 118, and a camera LED 120 are provided. The light 118 is an auxiliary lighting fixture emitting light at the time of shooting a dark object. The camera LED 120 is configured to be turned on at the time of shooting a photograph or a video to thereby cause the objective person to be photographed to recognize that he or she is to be photographed. A photograph and a picture are generically called a still image.

On the top surface of the side part of the wearable device main body 24 attached to the right side temple, first, second, and third buttons 102, 104, and 106 are provided. When the dominant eye of the worker is the left eye, the wearable device main body 24 is attached to the left side temple. The top and the bottom of the wearable device main body 24 are reversed according to whether the wearable main body 24 is attached to the right side temple or to the left side temple. Therefore, the first, second, and third buttons 102, 104, and 106 may be provided on both the top surface and the undersurface of the side part.

On the outside surface of the side part, a touch pad 110, a fourth button 108, a microphone 112, and an illuminance sensor 114 are provided. The touch pad 110 and the fourth button 108 can be operated by a forefinger. When the wearable device main body 24 is attached to the right side temple, the buttons 102, 104, and 106 are arranged at positions at which the buttons 102, 104, and 106 can be operated by a forefinger, a middle finger, and a third finger, respectively. The touch pad 110 (referred to as a first user interface in the claims) is configured such that the movement of finger in up and down directions or back and forth directions on the surface on the touch pad 110 as indicated by arrows can be detected. The movement to be detected includes flicking of a finger for grazing the surface quickly in addition to dragging of a finger for moving the finger with the finger kept in contact with the surface. Upon detection of up-and-down or back-and-forth movement of the worker's finger, the touch pad 110 inputs a command. In this description, the command implies an executive instruction to execute specific processing to be issued to the wearable device main body 24. Operation procedures for the first to fourth buttons 102, 104, 106, and 108, and the touch pad 110 are determined in advance by the application program.

For example, when the third button 106 is pressed once, item selection/item execution is carried out, when the third button 106 is held down, a list of activated application programs is displayed, when the second button 104 is pressed once, the screen returns to the home screen, when the second button 104 is held down, a menu of quick settings is displayed, and when the first button 102 is pressed once, cancellation (operation identical to the operation of the Esc key of the keyboard) of an operation is executed.

Regarding the operation of the touch pad 110, for example, when the touch pad 110 is dragged up and down, the cursor is moved up and down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, the second button 104 is arranged at a position as to be operated by a middle finger, the third button 106 is arranged at a position as to be operated by a third finger, and the fourth button 108 is arranged at a position as to be operated by a little finger. The reason why the fourth button 108 is provided not on the top surface of the side part, but on the outside surface of the side part is that there is space restriction. The fourth button 108 may also be provided on the top surface of the side part in the same manner as the first to third buttons 102, 104, and 106. The illuminance sensor 114 detects the illuminance of the surrounding area in order to automatically adjust the brightness of the display.

FIG. 4 shows an example of an external appearance of the back side of the wearable device main body 24. On the inner side of the front part, a display 124 constituted of an LCD is provided. On the inner side of the side part, a microphone 126, a speaker 130, and an engaging piece 128 are provided. The microphone 126 is provided at a front position of the side part, and the speaker 130 and the engaging piece 128 are provided at a rear position of the side part. Headphones may be used in place of the speaker 130. In this case, the microphone and the headphones may also be provided in an integrated manner as an intercom in the same manner as the operator terminal 12.

Figure 5:
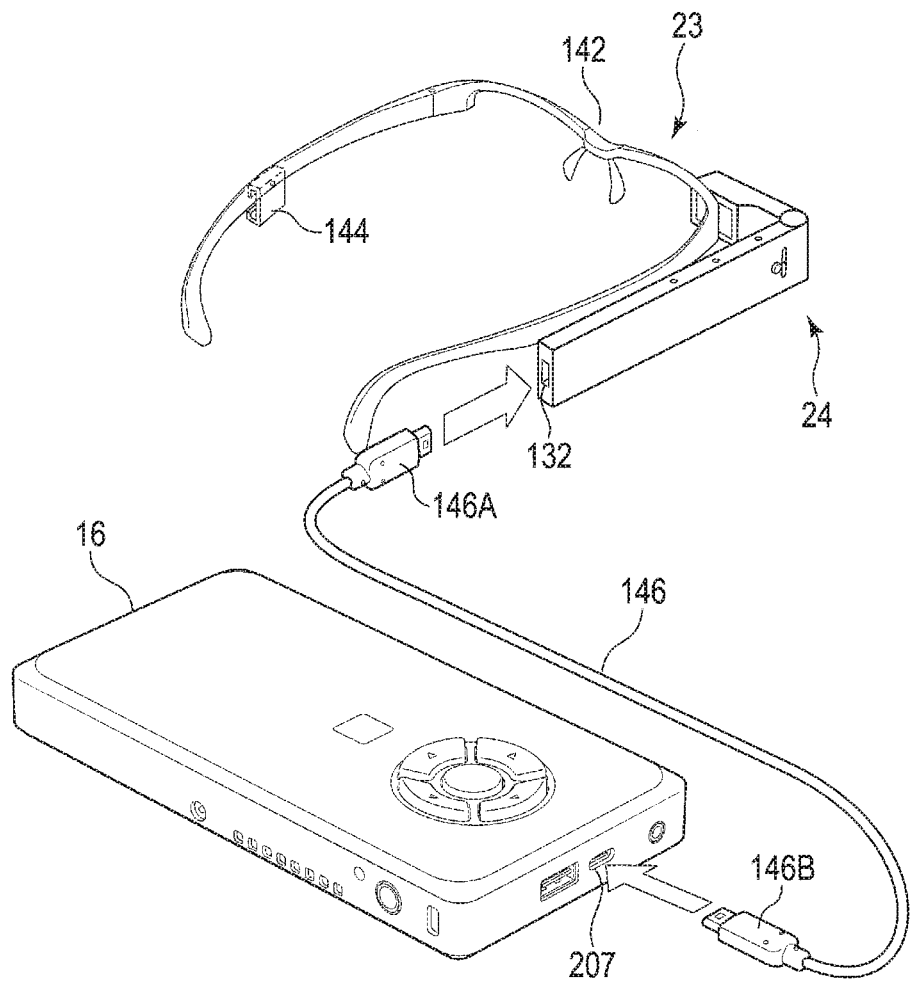
FIG. 5 is a view showing an example of connection between the mobile PC 16 and the wearable device main body 24.

FIG. 5 shows an example of connection between the mobile PC 16 and the wearable device main body 24. At a rear position of the side part, a receptacle 132 into which a plug 146A at one end of a cable 146 conforming to the USB type-C (registered trade mark) standard is to be inserted is provided. A plug 146B at the other end of the USB type-C cable 146 is inserted into a connector 207 conforming to the USB type-C standard provided on an upper end face of the mobile PC 16. As described above, the wearable device main body 24 is connected to the mobile PC 16 through the USB type-C cable 146, and image signals and the like are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or a DC terminal serving as a drive power supply, and the drive power is supplied from the mobile PC 16 to the wearable device main body 24 through the USB type-C cable 146. However, the wearable device main body 24 may also be provided with a drive power supply.

FIG. 6 is a block diagram showing an exemplary structure of the wearable device main body 24. The USB type-C connector 132 is connected to a mixer 166. A display controller 170 and USB hub 164 are respectively connected to a first terminal and a second terminal of the mixer 166. The display 124 is connected to the display controller 170. A camera controller 168, an audio codec 172, and a sensor controller 162 are connected to the USB hub 164. The camera 116, light 118, and camera LED 120 are connected to the camera controller 168. Audio signals from the microphones 112 and 126 are input to the audio codec 172, and audio signal from the audio codec 172 is input to the speaker 130 through an amplifier 174.

A motion sensor (for example, an acceleration sensor, a geomagnetism sensor, a gravitation sensor, a gyroscopic sensor, etc.) 176, the illuminance sensor 114, a proximity sensor 178, the touch pad 110, the first to fourth buttons 102, 104, 106 and 108, and a GPS sensor 180 are connected to the sensor controller 162. Although not shown in FIG. 4, the motion sensor 176, and the proximity sensor 178 are arranged inside the wearable device main body 24. The motion sensor 176 detects a motion, a direction, an attitude, and the like of the wearable device main body 24. The proximity sensor 178 detects attachment of the wearable device 23 on the basis of approach of a face, a finger and the like of the worker thereto.

[Mobile PC 16]

Figure 7:
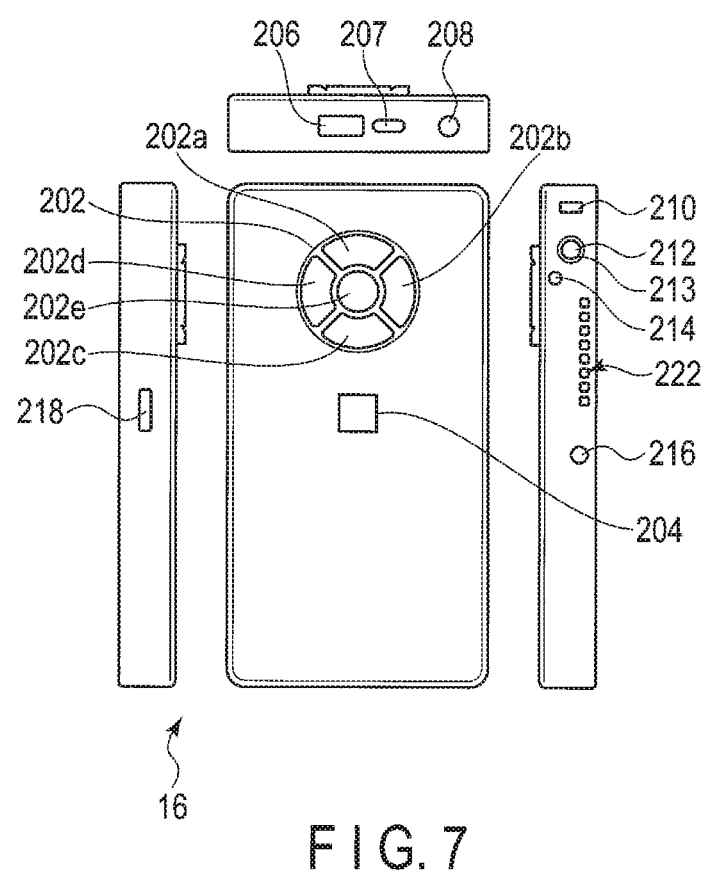
FIG. 7 is a view showing an example of an external appearance of the mobile PC 16.

FIG. 7 shows an example of an external appearance of the mobile PC (mobile edge computing device) 16. The mobile PC 16 has a small size and light weight, i.e., a width thereof is about 10 cm or less, a height thereof is about 18 cm or less, a thickness thereof is about 2 cm, and a weight thereof is about 300 g. Accordingly, the mobile PC 16 can be held in a pocket of the work clothing of the worker, a holster to be attached to a belt, or a shoulder case, and is wearable. Although the mobile PC 16 incorporates therein semiconductor chips such as a CPU, a semiconductor memory, and the like, and storage devices such as a Solid State Disk (SSD), and the like, the mobile PC 16 is not provided with a display device and a hardware keyboard for input of characters. A fingerprint sensor 204 is provided in the center of a front surface of the mobile PC 16. The mobile PC 16 prevents input of a password due to the lack of a keyboard, and thus, the fingerprint sensor 204 is used for user authentication at the time of login to the mobile PC 16. Five buttons 202 (also referred to as a cross button) 202 is provided between the fingerprint sensor 204 and one longitudinal end of the mobile PC 16. The five buttons 202 includes a center button 202e (also referred to as a decision button or an enter button) arranged in the center of the button and four buttons (an up button 202a, a right button 202b, a down button 202c, and a left button 202d) arranged above, below, on the right of, and on the left of the center button 202e (referred to as a second user interface in the claims). The five buttons 202 allows commands and the like to be input. User authentication at the time of login may be achieved by assigning numbers to the buttons 202a to 202d of the five buttons 202 to allow input of a password including any of the numbers. In this case, the fingerprint sensor 204 may be omitted.

The operations identical to those of the buttons 102, 104, 106, and 108, and the touch pad 110 of the wearable device main body 24 can also be applied to the five buttons 202. The worker cannot watch the state where the buttons 102, 104, 106, and 108, and the touch pad 110 of the wearable device main body 24 are being operated. Therefore, it may be necessary for a worker to become accustomed to carrying out an intended operation depending on the worker. Further, the buttons 102, 104, 106, and 108, and the touch pad 110 are small in size, and thus they may be difficult to operate. In the embodiment, the five buttons 202 of the mobile PC 16 can also be operated in the same manner as above, and hence the above-mentioned fear can be dispelled. The operation procedures of the five buttons 202 are determined by the application program.

For example, when the decision button 202e is pressed once, item selection/item execution is carried out (corresponding to pressing once of the third button 106 in the wearable device main body 24), when the decision button 202e is held down, ending or cancellation of an operation is carried out (corresponding to pressing once of the first button 102 in the wearable device main body 24), when the up button 202a is pressed once, the cursor is moved upward (corresponding to upward drag on the touch pad 110 in the wearable device main body 24), when the up button 202a is held down, a list of activated application programs is displayed (corresponding to holding down the third button 106 in the wearable device main body 24), when the down button 202c is pressed once, the cursor is moved downward (corresponding to downward drag on the touch pad 110 in the wearable device main body 24), when the down button 202c is held down, a menu of quick settings (described below) is displayed (corresponding to pressing of the second button 104 for a long time in the wearable device main body 24), when the left button 202d is pressed once, the right icon is selected (corresponding to backward drag/flick on the touch pad 110 in the wearable device main body 24), and when the right button 202b is pressed once, the left icon is selected (corresponding to forward drag/flick on the touch pad 110 in the wearable device main body 24).

On the upper side face of the mobile PC 16, a USB 3.0 connector 206, a USB type-C connector 207, and an audio jack 208 are provided.

On one side face (side face on the left side when viewed from the front) of the mobile PC 16, a card slot 218 for a memory card is provided. The memory card includes, for example, an SD card, a micro SD card (registered trade mark), and the like.

On the other side face (side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212 like a ring to indicate the state of power-on and the like based on colors and lighting states. The DC IN/battery LED 214 indicates the state of the mobile PC 16 such as whether or not the battery is being charged, and the remaining battery level based on colors and lighting states. The mobile PC 16 can be driven by the battery and can also be driven with the AC adapter connected to the DC terminal 216. Although not illustrated in the drawings, a battery housing in a back surface of the mobile PC 16 is provided with a cover which can be installed and removed by one-touch operation to enable the battery to be easily replaced.

The worker often views the display 124 of the wearable device main body 24 during work and may thus operate the five buttons 202 gropingly. As described above, the fingerprint sensor 204 is provided in the center of the front surface of the mobile PC 16, and the five buttons 202 are provided between the fingerprint sensor 204 and the upper end of the mobile PC 16. Thus, the worker can gropingly recognize which of the buttons of the five buttons 202 is the up button 202a based on the positional relationship with the fingerprint sensor 204. Moreover, the side surface of the upper portion of the mobile PC 16 is provided with the USB type-C connector 207. Thus, which of the buttons of the five buttons 202 is the up button 202a can also be gropingly recognized based on the connection position of the USB type-C cable 146. The up button 202a may be provided with a feel different from the feel of the other buttons.

Figure 8:
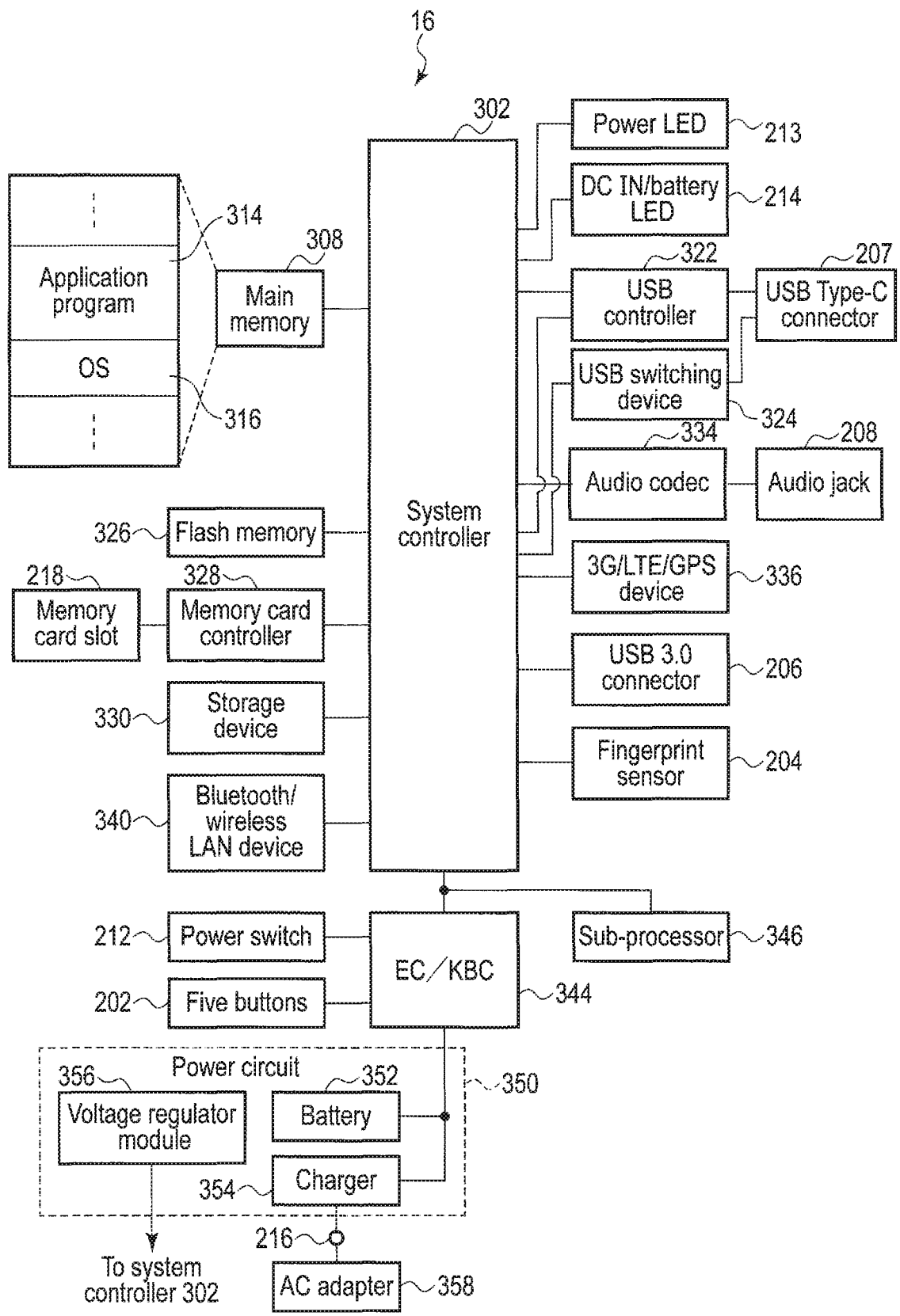
FIG. 8 is a block diagram showing an exemplary structure of the mobile PC 16.

FIG. 8 is a block diagram showing an exemplary structure of the mobile PC 16. The mobile PC 16 can carry out video distribution of an image taken with the wearable device main body 24 to the operator terminal 12, and enables browse of the image received from the operator terminal 12. The mobile PC 16 is provided with a camera function and a viewer function. The camera function is a function of shooting a photograph or a video by means of the camera 116 of the wearable device main body 24. The taken photograph and video are stored in a camera folder in the mobile PC 16, and can be browsed by the viewer function. The viewer function is a function of enabling browse of a file stored in the camera folder. The types of the files include still images, moving images, PDF files, photographs and videos taken with the camera function, images received from the operator terminal 12, images transmitted to the operator terminal 12, and files stored in a user folder in the mobile PC 16. In the following explanation, moving image is synonymous with video unless explained especially.

The mobile PC 16 includes a system controller 302 including a processor (CPU) and a controller/hub (not shown in FIG. 8). The system controller 302 connects to a main memory 308, the power LED 213, the DC IN/battery LED 214, a USB controller 322, a flash memory 326, a memory card controller 328, a storage device 330 including an HDD or an SDD, a USB switching device 324, an audio codec 334, a 3G/LTE/GPS device 336, the fingerprint sensor 204, the USB 3.0 connector 206, a Bluetooth/wireless LAN device 340, an EC/KBC 344, and the like. The main memory 308 includes a frame memory 310 which is a buffer memory for screen display.

The system controller 302 executes various programs loaded from the storage device 330 into the main memory 308. These programs include an OS 316 and an application program 314 for remote support.

The audio codec 334 converts a digital audio signal which is an object (to be reproduced) into an analog audio signal, and supplies the converted analog audio signal to the audio jack 208. Further, the audio codec 334 converts the analog audio signal (input from the audio jack 208) into a digital signal.

The memory card controller 328 accesses to a memory card such as an SD card to be inserted into the memory card slot 218, and controls read/write of data from/to the SD card.

The USB controller 322 controls data transmission and reception to and from the USB type-C cable (not illustrated in the drawings) connected to the USB type-C connector 207 and the USB 3.0 cable (not illustrated in the drawings) connected to the USB 3.0 connector 206.

Although not shown in the drawings, a port expansion adapter can also be connected to the USB type-C connector 207 to allow an interface such as HDMI to be used for the connector 207.

The Bluetooth/wireless LAN device 340 executes wireless communication conforming to the Bluetooth/IEEE802.11 standard for the purpose of connection to the network 22. The connection to the network 22 may not depend on wireless communication, and may depend on wired LAN communication conforming to the IEEE802.3 standard.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by cooperative operation of the EC/KBC 344 and the power circuit 350. Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component. The power circuit 350 includes a voltage regulator module 356. The voltage regulator module 356 is connected to a processor 304.

Although the mobile PC 16 is constituted as a body separate from the wearable device main body 24, the mobile PC 16 may be incorporated into the wearable device main body 24, and both of them may also be integrated into one body.

[Front-End]

Figure 9:
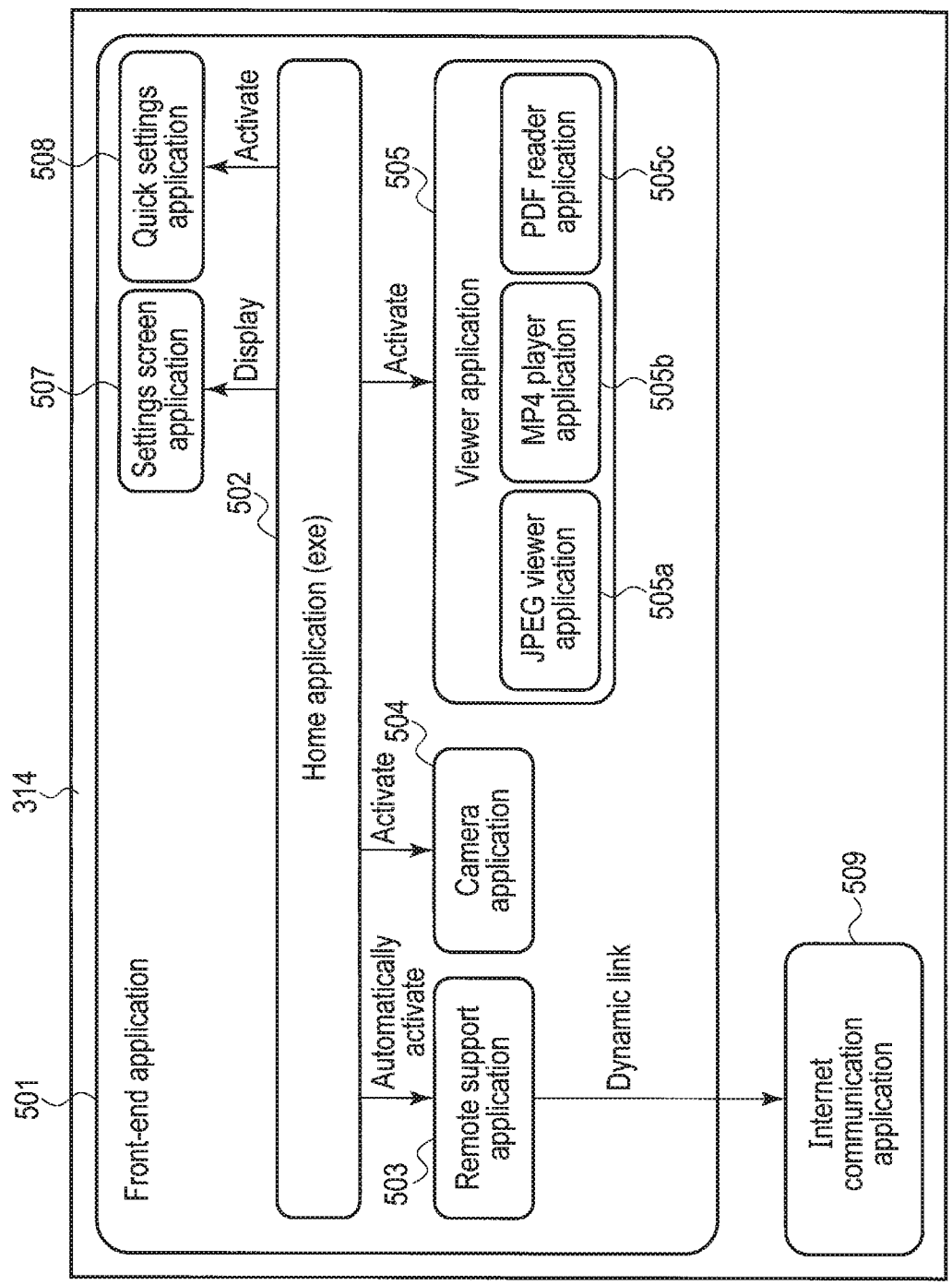
FIG. 9 is a diagram showing an example of an application program for the mobile PC 16.

FIG. 9 shows an example of the application program 314 for the mobile PC 16. The application program is hereinafter sometimes simply referred to as an application.

As described above, the remote support system is realized by executing a front-end application 510 operating on the worker side, that is, the front-end side, and a back-end application 710 operating on the operator side, that is, the back-end side. A configuration of the back-end application will be described below, and now, a configuration of the front-end application will be described.

The application program 314 for the mobile PC 16 includes an Internet communication application 509 and a front-end application 501. The Internet communication application 509 is used to allow for communication with the operator terminal 12. An example of the Internet communication application 509 is Skype for Business 2016 (registered trademark), and the like.

The front-end application 501 includes applications including a home application 502, a remote support application 503, a camera application 504, and a viewer application 505.

The home application 502 is an application which is activated when the front-end application 501 is activated. The home application 502 displays a home screen for the front-end application 501. The home screen includes icons arranged side by side, and used to activate the applications such as the camera application 504 and the viewer application 505, respectively. In other words, the home application 502 is an application displaying the icons arranged side by side, and used to activate the applications, respectively. The worker may activate each of the applications included in the front-end application 501, on the home screen displayed by the home application 502.

The remote support application 503 is an application adapted to support remote support functions such as voice call sessions with the operator terminal 12 and live video distribution using the Internet communication application 509. The remote support application 503 is automatically activated when the home application is activated. In this manner, the remote support application 503 operates as a resident application, thus allowing the worker to communicate with the operator terminal 12 at any time using the Internet communication application 509.

If a Skype for Business 2016 client application is used as the Internet communication application 509, the remote support application 503 uses the functions of the Skype for Business client application using Lync SDK 2013 (registered trademark) as a dynamic link.

The camera application 504 is an application which supports a photograph taking function and a video taking function of the camera 116 of the wearable device main body 24. Taken photographs and videos are saved in the mobile PC 16.

In this case, the viewer application 505 allows contents to be browsed, and includes a JPEG viewer application 505a, an MP4 player application 505b and a PDF reader application 505c. The JPEG viewer application 505a is an application allowing any of the photographs saved in the mobile PC 16 to be browsed. The MP4 player application 505b is an application allowing any of the videos saved in the mobile PC 16 to be reproduced. The PDF reader application 505c is an application allowing any of the PDF files saved in the mobile PC 16 to be browsed.

The JPEG viewer application 505a, the MP4 player application 505b, and the PDF reader application 505c are implemented as Windows (registered trademark) desktop applications.

The worker may make settings for the front-end side, that is, the wearable device 23 (the wearable device main body 24) and the mobile PC 16. A front-end-side system including the wearable device 23 (the wearable device main body 24) and the mobile PC 16 may be referred to as a wearable viewer.

A settings screen application 507 is an application allowing for settings for the wearable viewer, display of information, and the like. Selecting a Settings icon described below allows a settings screen to be displayed.

A quick settings application 508 is also an application allowing settings to be made for the wearable viewer, and is activated by holding down the down button 202c.

The worker utilizing the remote support system realized by executing the front-end application 501 shown in FIG. 9 can perform the following work.

(1) Receiving the Remote Support

Execution of the remote support application 503 enables the worker to receive the remote support. Examples of the remote support provided for the worker include making a call to the operator terminal 12, receiving a call from the operator terminal 12, distributing a real-time video taken with the camera 116 to the operator terminal 12, taking and distributing a photograph to the operator terminal 12, viewing an image received from the operator terminal 12, sharing a screen of the operator terminal 12 (the desktop screen, a screen of an application program, or the like), and receiving a text message from the operator terminal 12.

(2) Camera Shooting

Execution of the camera application 504 enables the worker to take a photograph or a moving image using the wearable device main body 24. The taken photograph or moving image is saved in the mobile PC 16.

(3) JPEG Viewer

Execution of the JPEG viewer application 505a enables the worker to browse static images (including photographs) saved in the mobile PC 16.

(4) MP4 Player

Execution of the MP4 player application 505b enables the worker to reproduce any of the moving images saved in the mobile PC 16.

(5) PDF Reader

Execution of the PDF reader application 505c enables the worker to browse the PDF files saved in the mobile PC 16.

(6) Settings

Execution of the settings screen application 507 or the quick settings application 508 enables the worker to set an operating environment for the wearable viewer such as adjustment of volume of the speaker 130 of the wearable device main body 24, adjustment of brightness of the wearable device main body 24, and turn-on or turn-off of the camera LED 120 of the wearable device main body 24.

Now, activation and termination of the front-end application 501 will be described.

When the power switch 212 is pressed to activate the mobile PC 16, the front-end application 501 is automatically activated, and the home screen of the front-end application 501 described below is displayed on the screen of the display 124 of the wearable device main body 24 in a full-screen mode.

Pressing the power switch 212 in a power-on state allows the front-end application 501 to be terminated to shut down the remote support system on the front-end side. The front-end application 501 allows the front-end-side remote support system not only to be shut down but also to be brought into a sleep mode. The front-end application 501 further enables hibernation, and allows the front-end-side remote support system to be brought into a rest mode.

[Home Screen]

Figure 10:
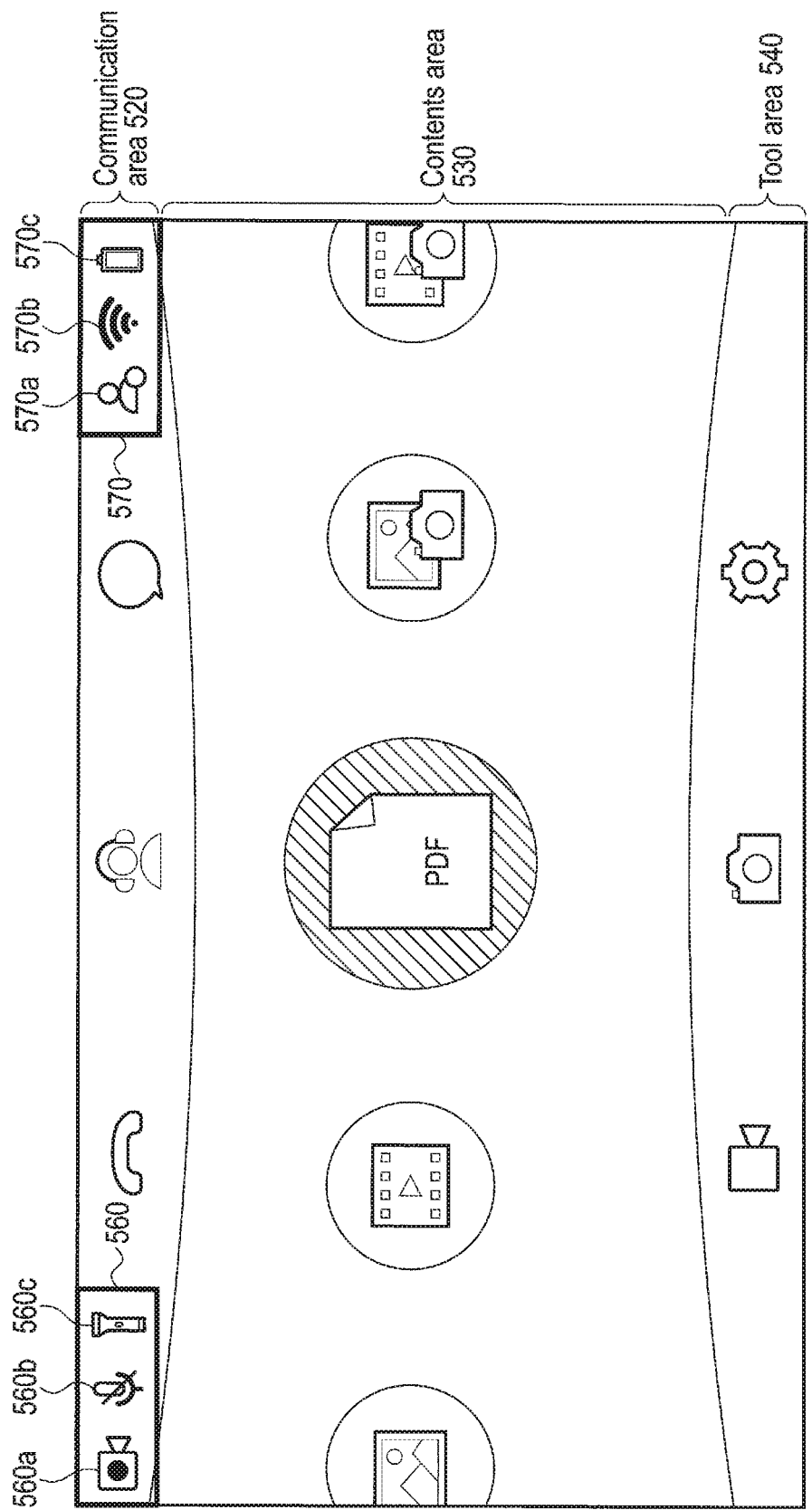
FIG. 10 is a diagram showing an example of a home screen displayed on the wearable device 23.

FIG. 10 is a diagram showing an example of the home screen displayed on the display 124 of the wearable device main body 24.

When the front-end application 501 is activated, the home application 502 is activated to display the icons used to activate the above-described applications, and the icons for the functions. A screen displaying these icons side by side is referred to as the home screen.

FIG. 10 shows the entire home screen. The home screen, which is horizontally long (for example, rectangular), is divided into three horizontally long areas (for example, three rectangles each with bendable long sides). The upper area is referred to as a communication area 520, the central area is referred to as a contents area 530, and the lower area is referred to as a tool area 540. The size and shape of each of the areas can be varied by moving a focus, and one area with the focus placed therein is the largest in width (vertical width) among all areas. Thus, the icons in the focus area are displayed larger than the icons in the other areas. In the example in FIG. 10, the focus is placed in the contents area 530, and thus, the central area is wider than the other areas. However, upward or downward movement of the focus widens the upper or lower area, with the central area narrowed.

Upper and lower boundary lines of each area are not linear. The upper boundary line of the focus area is slightly bended downward (toward the focus area side), and the lower boundary line of the focus area is slightly bended upward (toward the focus area side). That is, the width of the focus area is smallest in the central portion and increases toward each of the opposite ends. Thus, the icon positioned in the center of the focus area can be made prominent.

The communication area 520 displays the icons arranged side by side, and used to activate the applications needed to communicate with an outside operator, i.e., the icons allowing activation of the functions to receive remote support from the operator terminal 12. The contents area 530 displays a plurality of icons arranged side by side and associated with the viewer application 505. The displayed icons include an icon corresponding to a folder with still image data saved therein, an icon corresponding to a folder with moving image data saved therein, and an icon corresponding to a folder with PDF data saved therein. The tool area 540 displays icons arranged side by side and including an icon allowing activation of a function to take a photograph, an icon allowing activation of a function to take a video, and an icon used to make settings for the wearable viewer. The icon in the home screen with the focus placed therein is displayed larger than the other icons and highlighted.

At a left and a right ends of an upper area on the home screen, status areas 560 and 570 are displayed respectively. In screens other than the home screen, such as screens for the remote support application 503, the status areas 560 and 570 are also arranged at the same positions as those in the home screen. That is, the status areas 560 and 570 are constantly arranged in the upper left and right areas, respectively, of the screen. The status areas 560 and 570 are areas for display of statuses of the mobile PC 16 and the wearable device main body 24, such as the remaining battery level, a network connection status, and a voice call status.

As shown in FIG. 10, the status area 560 displays an on-camera icon 560a, a microphone mute icon 560b, and a LED light icon 560c.

The on-camera icon 560a is displayed at the leftmost position in the status area 560 during distribution of a live video or recording of a moving image. In a state where neither distribution of a live video nor recording of a moving image is executed, nothing is displayed at the leftmost position in the status area 560.

The microphone mute icon 560b is displayed in a central portion of the status area 560 when the microphones 112 and 126 of the wearable device main body 24 are in a mute mode. When the microphones 112 and 126 are not in the mute mode, nothing is displayed in the central portion of the status area 560.

The LED light icon 560c is displayed at the rightmost position in the status area 560 while the light 118 of the wearable device main body 24 is on. While the light 118 is not on, nothing is displayed at the rightmost position in the status area 560.

The status area 570 is displayed in the upper right area of the screen. As shown in FIG. 10, the status area 570 displays a voice call status icon 570a, a Wi-Fi (registered trademark) status icon 570b, and a battery status icon 570c.

The voice call status icon 570a is displayed when the worker who is the user of the wearable device main body 24 is enabled to talk on the phone with the operator using the operator terminal 12. Specifically, the voice call status icon 570a is displayed at the leftmost position in the status area 570 during a standby mode following signing in to the server for the Internet communication application 509. Furthermore, while the worker and the operator are on the phone, an on-the-phone icon 606 described below (shown in FIG. 16) is displayed instead of the voice call status icon 570a. In a state where the worker is not enabled to talk on the phone with the operator or if the worker is not on the phone with the operator, nothing is displayed at the leftmost position in the status area 570.

The Wi-Fi status icon 570b is an icon indicative of a Wi-Fi radio wave level. The radio wave level is expressed by the number of curves (circular arcs). A larger number of curves indicate that performing Wi-Fi communication is easy, whereas a smaller number of curves indicate that performing Wi-Fi communication is difficult.

The battery status icon 570c is an icon indicative of the remaining battery level of the mobile PC 16, and is displayed at the rightmost position in the status area 570. If the battery is being charged, an icon indicating that the battery is being charged (not shown in the drawings) is displayed instead of the battery status icon 570c.

The home screen includes the definition of the arrangement of the icons, and the functions each provided by pressing the decision button with the corresponding icon selected, and the like. In the embodiment, the home screen is described in XML. When an XML file is provided to the user and the user edits the XML file, the user may freely change the layout of the home screen, or in the home application 502, activate another application, thus allowing expandability of the front-end application 501 to be enhanced.

Figure 11:
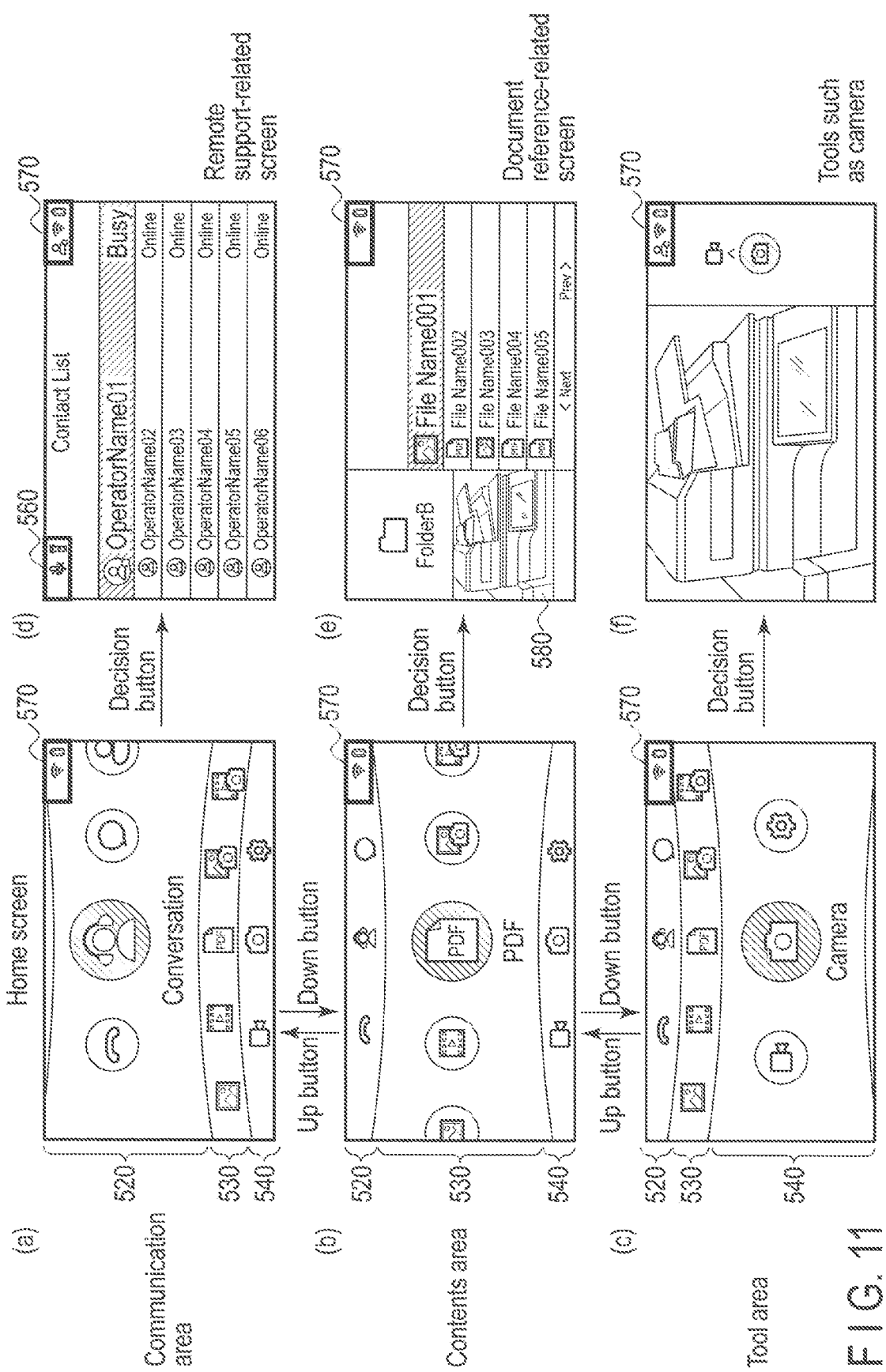
FIG. 11 is a diagram showing an example of transition of the screen resulting from operations of a worker on the home screen.

FIG. 11 shows an example of transition of the home screen resulting from the worker's button operations.

The home screen includes the communication area 520, the contents area 530, and the tool area 540 as described above. As shown in FIG. 10, in an initial state, the contents area 530 corresponds to a wide focus area. A pressing operation by the up button 202a and the down button 202c allows the focus area to be changed.

While the home screen with the focus placed in the contents area 530 (FIG. 10, FIG. 11(b)) is displayed, if the up button 202a is pressed, then the focus is moved upward to change the screen to the home screen in which the communication area 520 is displayed as a wide focus area (FIG. 11(a)). While the home screen in FIG. 11(a) is displayed, if the down button 202c is pressed, then the screen is changed to the home screen in which the contents area 530 is displayed as a wide focus area (FIG. 11(b)).

While the home screen in FIG. 11(b) is displayed, if the down button 202c is pressed, then the screen is changed to the home screen in which the tool area 540 is displayed as a wide focus area (FIG. 11(c)). While the home screen in FIG. 11(c) is displayed, if the up button 202a is pressed, then the screen is changed to the home screen in which the contents area 530 is displayed as a wide focus area (FIG. 11(b)).

As shown in FIG. 11(a), icons used to activate remote-support-related functions are arranged in the communication area 520. By selecting one of the icons arranged in the communication area 520 and pressing the decision button (center button) 202e, the worker may activate the application corresponding to the selected icon. For example, when a Conversation icon in the communication area 520 in FIG. 11(a) is selected, the home screen is changed to a contact list screen (FIG. 11(d)) displaying a contact name list.

The contents area 530 displays icons arranged side by side and corresponding to folders in which documents are saved. By selecting one of the icons and pressing the decision button 202e, the worker may browse any of the JPEG files, MP4 files, PDF files, or the like saved in the folder corresponding to the selected icon. For example, when the PDF icon in the contents area 530 in FIG. 11(b) is selected, the home screen is changed to a screen displaying a list of PDF files saved in the mobile PC 16 (FIG. 11(e)).

The tool area 540 displays icons arranged side by side and including an icon used to activate a function to take a photograph, an icon used to activate a function to take a video, and an icon used to make settings for the wearable viewer. For example, by selecting one of the icons arranged in the tool area 540 and pressing the decision button 202e, the worker may activate the application corresponding to the selected icon. For example, when a Camera icon in the tool area 540 in FIG. 11(c) is selected, the home screen is changed to a screen for taking a photograph (FIG. 11(f)).

Figure 12:
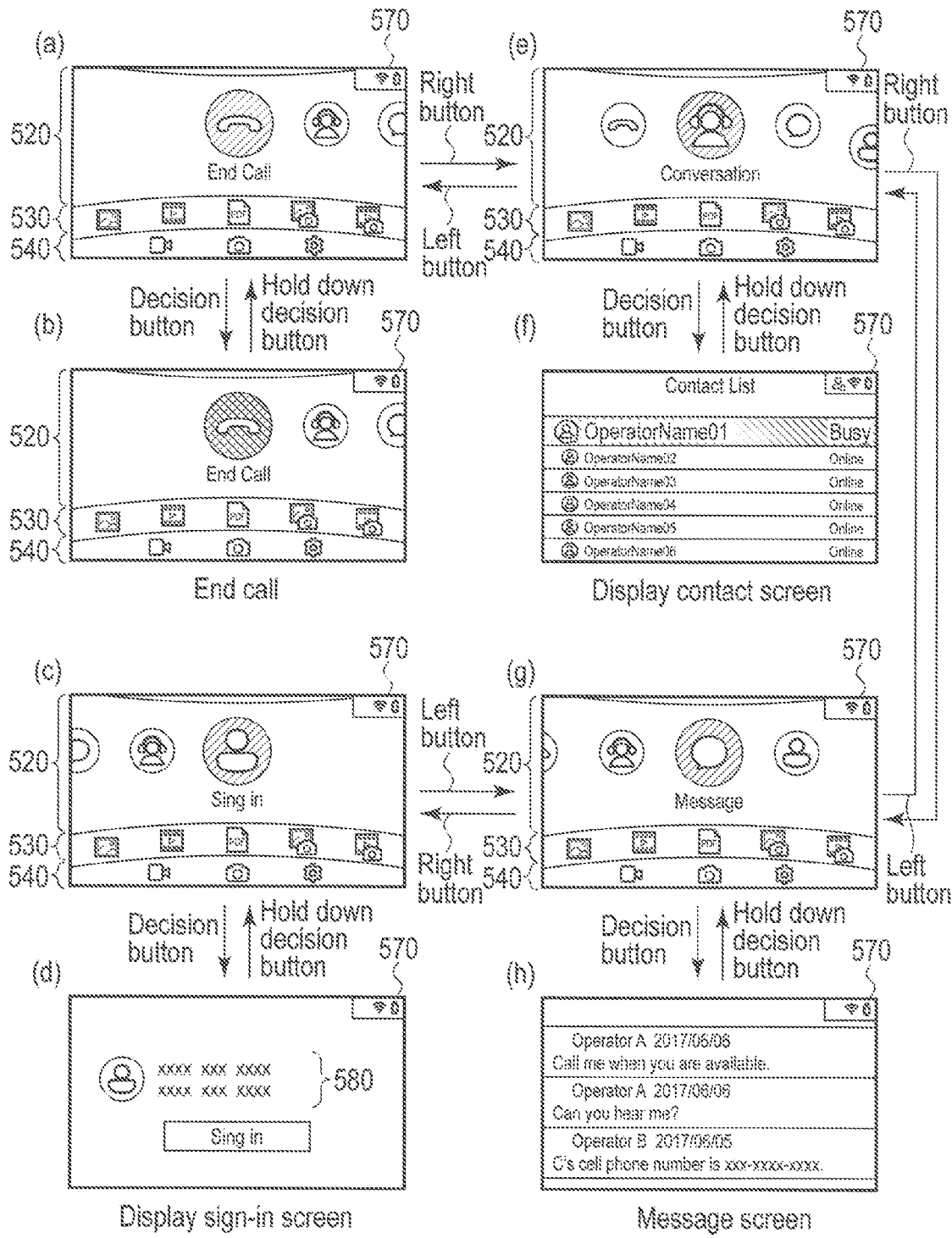
FIG. 12 is a diagram showing an example of transition of the screen resulting from selection of each of icons positioned in a communication area in the home screen.

FIG. 12 shows an example of transition of the screen resulting from selection of each of the icons positioned in the communication area 520.

In the example in FIG. 12, the communication area 520 can display four icons arranged in a row direction and including an End Call icon, a Conversation icon, a Message icon, and a Sign-In icon. However, only a part of the four icons is displayed. The focus is assumed to be located in the icon arranged in the center of the communication area 520. The types of the icons arranged in the communication area 520 are not limited to the above-described ones.

First, horizontal scrolling will be described.

While the home screen with the End Call icon positioned in the center and with the focus placed at the End Call icon (FIG. 12(a)) is displayed, when the right button 202b is pressed, all the icons are scrolled leftward to change the screen to one with the Conversation icon positioned in the center and with the focus placed at the Conversation icon (FIG. 12(e)). As a result, the focus is moved substantially rightward. In this state, when the left button 202d is pressed, all the icons are scrolled rightward to return the screen to the home screen with the End Call icon positioned in the center (FIG. 12(a)).

Similarly, while the home screen with the Conversation icon positioned in the center (FIG. 12(e)) is displayed, when the right button 202b is pressed, all the icons are scrolled leftward to change the screen to one with the Message icon positioned in the center and with the focus placed at the Message icon (FIG. 12(g)). In this state, when the left button 202d is pressed, all the icons are scrolled rightward to return the screen to the home screen with the Conversation icon positioned in the center (FIG. 12(e)).

Similarly, while the home screen with the Message icon positioned in the center (FIG. 12(g)) is displayed, when the right button 202b is pressed, all the icons are scrolled leftward to change the screen to one with the Sign-In icon positioned in the center and with the focus placed at the Sign-In icon (FIG. 12(c)). In this state, when the left button 202d is pressed, all the icons are scrolled rightward to return the screen to the home screen with the Message icon positioned in the center (FIG. 12(g)).

With the communication area 520 displayed as described above, pressing the right button 202b or the left button 202d allows the focus to be moved rightward or leftward and also allows the icon with the focus placed thereat to be displayed in the center of the area. In other words, when a focus is moved to the left or the right regions of the communication area 520 based on an operation from the right button 202b or the left button 202d for the communication area 520, a focused icon is displayed in a center of the communication area 520.

If the left button 202d is pressed while the home screen where the End Call icon corresponding to the leftmost icon in the communication area 520 is positioned in the center is displayed, the screen may transition to the one where the Sign-In icon corresponding to the rightmost icon in the communication area 520 is positioned in the center or the screen with the End Call icon positioned in the center may remain displayed.

Similarly, if the right button 202b is pressed while the home screen where the Sign-In icon corresponding to the rightmost icon in the communication area 520 is positioned in the center of the screen is displayed, the screen may transition to the one where the End Call icon corresponding to the leftmost icon in the communication area 520 is positioned in the center or the screen with the Sign-In icon positioned in the center may remain displayed.

Now, transition of the screen resulting from selection of each icon will be described.

When the worker using wearable viewer and the operator operating the operator terminal 12 are talking on the phone with each other, if the End Call icon is selected and the decision button 202e is pressed while the screen with the End Call icon positioned in the center (FIG. 12(a)) is displayed, then the mode where the worker and the operator talk on the phone with each other is ended (this is also referred to as end call). At this time, the screen in FIG. 12(a) is changed to one with the color of the End Call icon changed (end call status screen) (FIG. 12(b)). If the decision button 202e is held down with the end call status screen (FIG. 12(b)) displayed, the screen returns to the screen in which the color of the End Call icon is unchanged (FIG. 12(a)).

While the screen with the Conversion icon positioned in the center (FIG. 12(e)) is displayed, when the Conversation icon is selected and the decision button 202e is pressed, the screen is changed to the contact list screen (FIG. 12(f)) displaying a contact name list. In other words, related information (a contact name list) of the focused icon (Conversion icon) is displayed on the home screen, based on an operation from the decision button 202e for the focused icon (Conversion icon) in the communication area 520. The worker may select one of the contact names and make a call to the contact name. If the decision button 202e is held down with the screen in FIG. 12(f) displayed, the screen returns to the one shown in FIG. 12(e). In other words, the related information (a contact name list) displayed on the home screen is deleted and the home screen including the focused icon (Conversion icon) in the communication area 520 is displayed again, based on an operation from the decision button 202e for the related information (a contact name list) displayed on the home screen.

While the screen with the Message icon placed in the center (FIG. 12(g)) is displayed, if the Message icon is selected and the decision button 202e is pressed, then the screen is changed to a message screen displaying a message list (FIG. 12(h)). The message screen displays text messages transmitted from the operator terminal 12 and saved in the mobile PC 16. If the decision button 202e is held down with the message screen (FIG. 12(h)) displayed, the screen returns to the one shown in FIG. 12(g)).

While the screen with the Sign-In icon placed in the center (FIG. 12(c)) is displayed, if the Sign-In icon is selected and the decision button 202e is pressed, then the screen is changed to a sign-in screen (FIG. 12(d)). At this time, the sign-in screen displays account information 580 on the worker from the Internet communication application 509. Furthermore, the worker may perform sign-in on the sign-in screen through button operations. If the decision button 202e is held down with the sign-in screen displayed, the screen returns to the one shown in FIG. 12(c).

Figure 13:
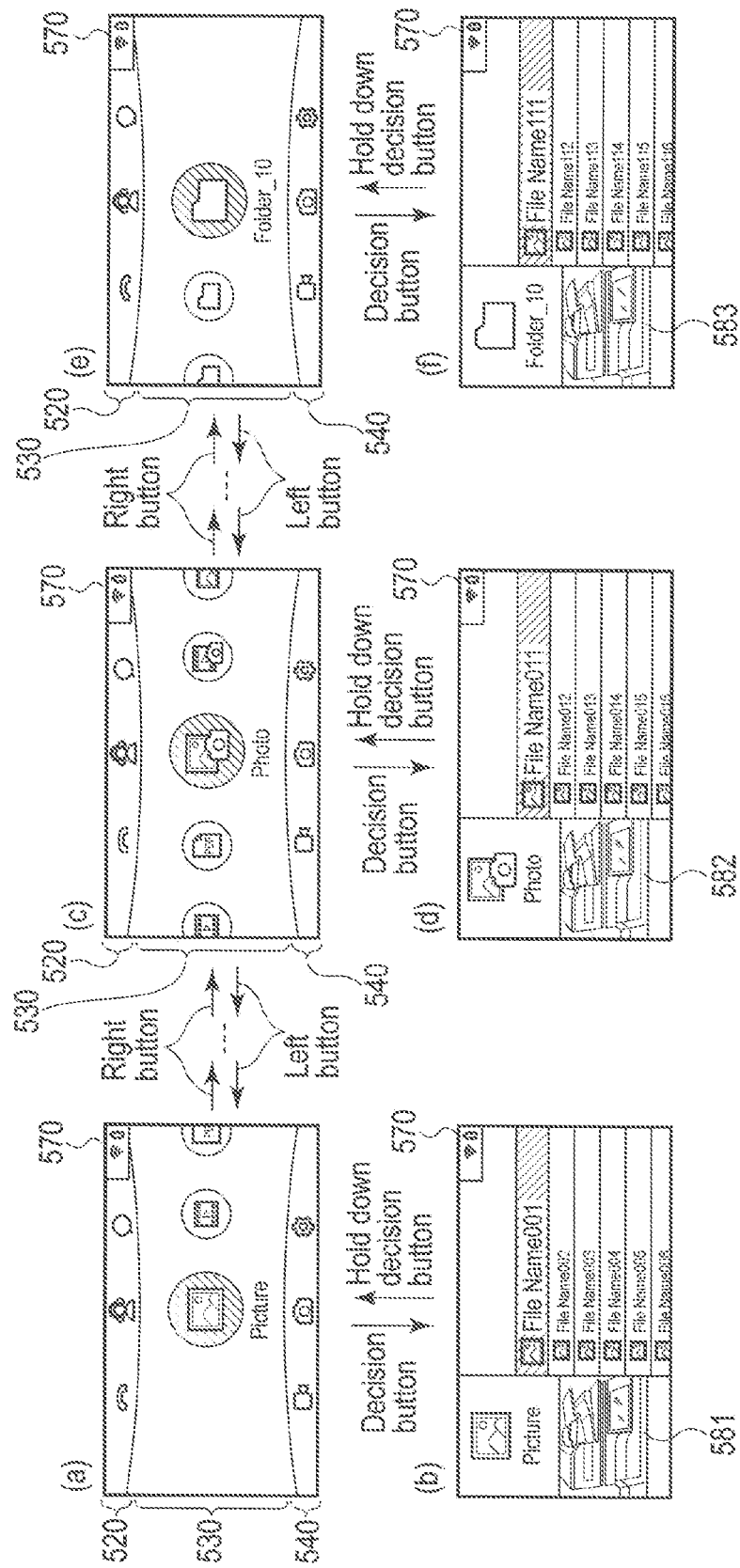
FIG. 13 is a diagram showing an example of transition of the screen resulting from selection of each of icons positioned in a contents area in the home screen.

FIG. 13 shows an example of transition of the screen resulting from selection of each of the icons positioned in the contents area 530.

A Picture icon, a Photo icon, a PDF icon, a Folder_10 icon, and the like are arranged in the contents area 530. The types of the icons arranged in the contents area 530 are not limited to these types.

First, horizontal scrolling will be described.

As described with reference to FIG. 12, when the right button 202b/left button 202d is pressed, all the icons are moved leftward/forward to move the focus rightward/leftward, thus switching the screen to one where the icon with the focus placed thereat is positioned in the center.

If the left button 202d is pressed while the home screen where the Picture icon corresponding to the leftmost icon in the contents area 530 is positioned in the center is displayed, the screen may transition to one where the Folder_10 icon corresponding to the rightmost icon in the contents area 530 is positioned in the center, or the screen with the Picture icon positioned in the center may remain displayed.

Similarly, if the right button 202b is pressed while the home screen where the Folder_10 icon corresponding to the rightmost icon in the contents area 530 is positioned in the center is displayed, the screen may transition to the one where the Picture icon corresponding to the leftmost icon in the contents area 530 is positioned in the center, or the screen with the Folder_10 icon positioned in the center may remain displayed.

Now, transition of the screen resulting from selection of each icon will be described. By way of example, transitions of the screens resulting from selection of the Picture icon, the Photo icon, and the Folder_10 icon will be described.

While the screen with the Picture icon positioned in the center (FIG. 13(a)) is displayed, if the Picture icon is selected and the decision button 202e is pressed, then the screen is changed to one displaying a list of files saved in the Picture folder (FIG. 13(b)). The file list screen includes a thumbnail 581 indicative of the contents of the file with the focus placed thereat. JPEG files and the like received from the operator terminal 12 are saved in the Picture folder. The worker may select a desired file from the file list and browse the selected JPEG file or the like. If the decision button 202e is held down with the file list screen displayed, the screen returns to the one with the Picture icon positioned in the center (FIG. 13(a)).

While a screen with the Photo icon positioned in the center (FIG. 13(c)) is displayed, if the Photo icon is selected and the decision button 202e is pressed, then the screen is changed to one displaying a list of files saved in the Photo folder (FIG. 13(d)). The file list screen includes a thumbnail 582 indicative of the contents of the file with the focus placed thereat. Photographs taken with the camera 116 and the like are saved in the Photo folder. The worker may select a desired file (photograph or the like) from the file list and browse the selected file (photograph or the like). Furthermore, if the decision button 202e is held down with the file list screen displayed, the screen returns to the one with the Photo icon positioned in the center (FIG. 13(c)).

While a screen with the Folder_10 icon positioned in the center (FIG. 13(e)) is displayed, if the Folder_10 icon is selected and the decision button 202e is pressed, then the screen is changed to one displaying a list of files saved in a user folder labeled Folder_10 (FIG. 13(f)). The files include various files for photographs, still images, moving images, and the like. The file list screen includes a thumbnail 583 indicative of the contents of the file with the focus placed thereat. In Folder_10 (user folder), a file selected by the worker is saved. The worker may select a desired file from the file list and browse the selected file. Furthermore, if the decision button 202e is held down with the file list screen (FIG. 13(f)) displayed, the screen returns to the one with the Folder_10 icon positioned in the center (FIG. 13(e)).

Figure 14:
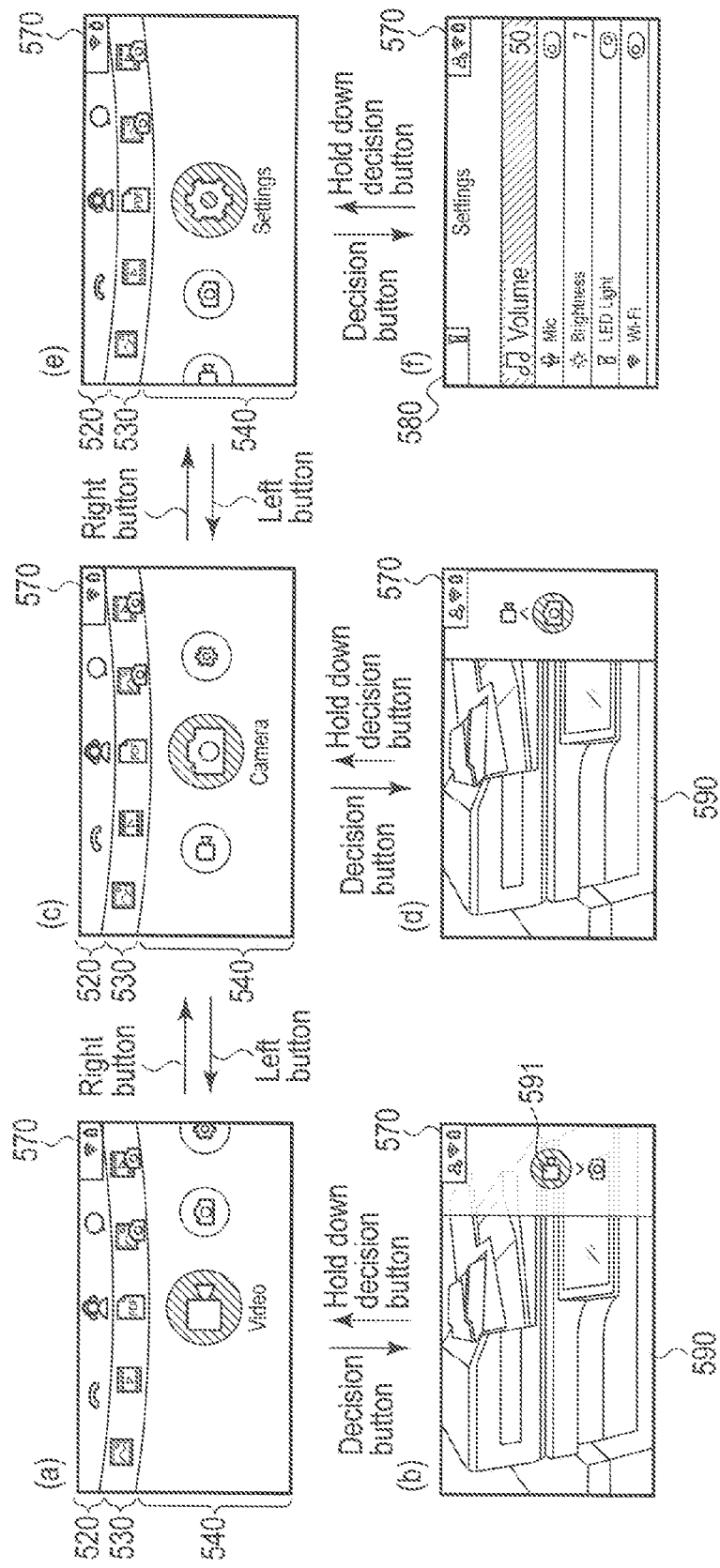
FIG. 14 is a diagram showing an example of transition of the screen resulting from selection of each of icons positioned in a tool area in the home screen.

FIG. 14 shows an example of transition of the screen resulting from selection of each of the icons in the tool area 540.

In the example shown in FIG. 14, three icons labeled Video, Camera, and Settings are arranged in the tool area 540. The types of the icons arranged in the tool area 540 are not limited to these types.

First, horizontal scrolling will be described.

As described with reference to FIG. 12 and FIG. 13, when the right button 202b/left button 202d is pressed, all the icons are moved leftward/forward to move the focus rightward/leftward, thus switching the screen to one where the icon with the focus placed thereat is positioned in the center.

If the left button 202d is pressed while the home screen where the Video icon corresponding to the leftmost icon in the tool area 540 is positioned in the center is displayed, the screen may transition to one where the Settings icon corresponding to the rightmost icon in the tool area 540 is positioned in the center, or the screen with the Video icon positioned in the center may remain displayed.

Similarly, if the right button 202b is pressed while the home screen where the Settings icon corresponding to the rightmost icon in the tool area 540 is positioned in the center is displayed, the screen may transition to the one where the Video icon corresponding to the leftmost icon in the tool area 540 is positioned in the center, or the screen with the Settings icon positioned in the center may remain displayed.

Now, transition of the screen resulting from selection of each icon will be described. By way of example, transitions of the screens resulting from selection of the Video icon, the Camera icon, and the Settings icon will be described.

While a screen with the Video icon positioned in the center (FIG. 14(a)) is displayed, if the Video icon is selected and the decision button 202e is pressed, then the screen is changed to one for moving image taking (FIG. 14(b)). Furthermore, if the decision button 202e is held down with the screen for moving image taking displayed, the screen returns to the one with the Video icon positioned in the center (FIG. 14(a)).

While a screen with the Camera icon positioned in the center (FIG. 14(c)) is displayed, if the Camera icon is selected and the decision button 202e is pressed, then the screen is changed to one for photo taking (FIG. 14(d)). Furthermore, if the decision button 202e is held down with the screen for photo taking displayed, the screen returns to the one with the Camera icon positioned in the center (FIG. 14(c)).

While a screen with the Settings icon positioned in the center (FIG. 14(e)) is displayed, if the Settings icon is selected and the decision button 202e is pressed, then the screen is changed to a settings screen (FIG. 14(f)). Furthermore, if the decision button 202e is held down with the settings screen displayed, the screen returns to the one with the Settings icon positioned in the center (FIG. 14(e)).

[Remote Support Function]

Figure 15:
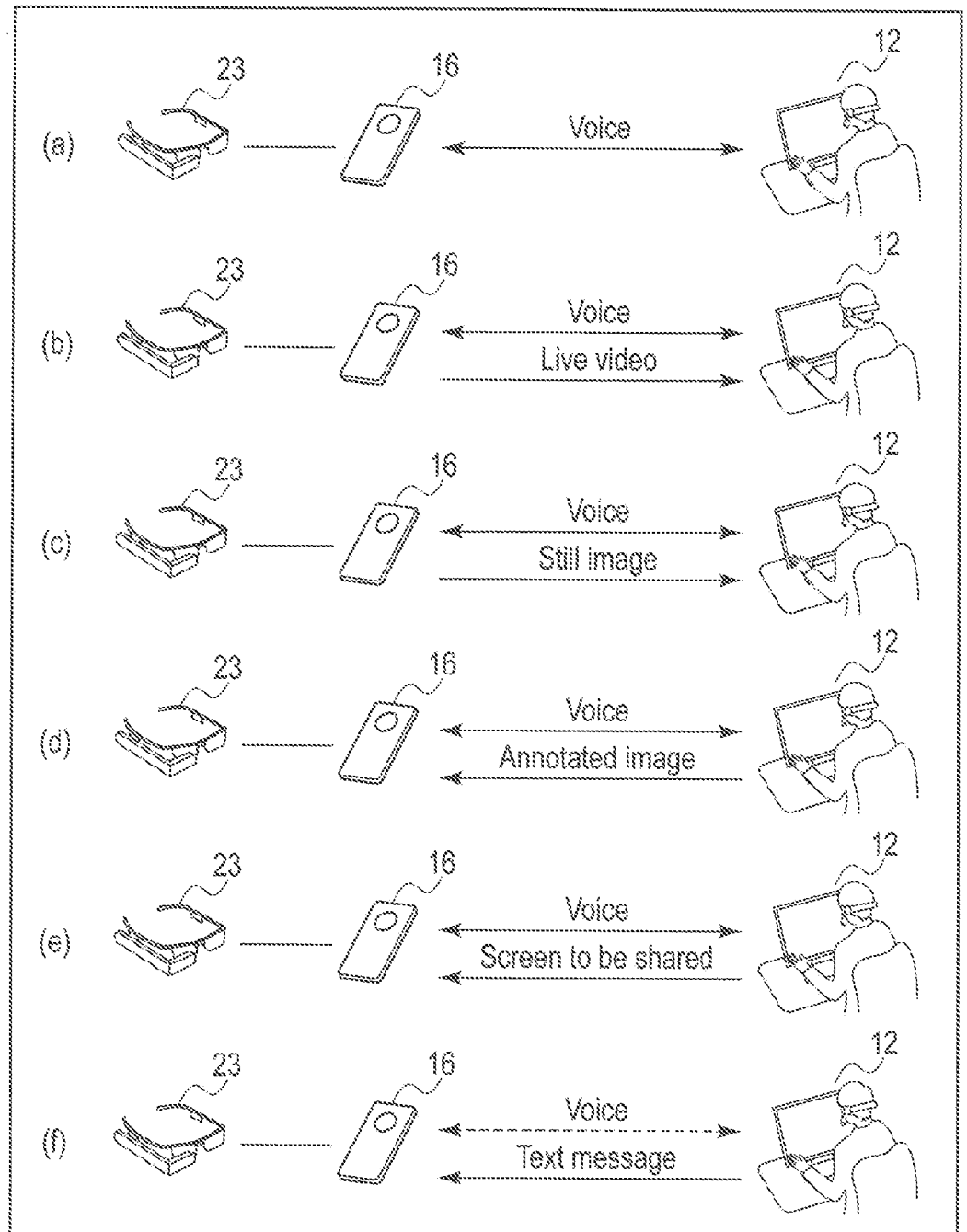
FIG. 15 is a diagram showing an example of remote support.

Now, an outline of the remote support function performed by the remote support application 503 will be provided using FIG. 15.

(1) Voice Call Function

This function involves bidirectional voice calls between the mobile PC 16 and the operator terminal 12. The mobile PC 16 may make a call to the operator terminal 12 by designating one of the contact names included in the Internet communication application 509. The mobile PC 16 may respond to the call from the operator terminal 12.

(2) Live Video Distribution Function

This function involves distributing a real-time video taken with the camera 116 from the wearable device 23 to the operator terminal 12 during a voice call session between the mobile PC 16 and the operator terminal 12, as shown in FIG. 15(b). Live videos can be distributed only from the mobile PC 16 to the operator terminal 12 (only one direction).

(3) Still Image Transmission and Reception Function

This function involves transmitting a still image captured from a live video or a photograph taken with the camera 116, from the mobile PC 16 to the operator terminal 12 during a voice call session between the mobile PC 16 and the operator terminal 12, as shown in FIG. 15(c). Furthermore, as shown in FIG. 15(d), the operator terminal 12 may create an edited image (annotated image) by, for example, writing characters into, drawing pictures, and the like on a still image transmitted from the mobile PC 16 or a still image saved in the operator terminal 12. During a voice call session between the mobile PC 16 and the operator terminal 12, the mobile PC 16 may receive the edited image (annotated image) from the operator terminal 12 and display the image on the display 124.

(4) Screen Share Function

This function is performed when an operation for sharing the entire desktop screen of the operator terminal 12 or a certain application screen is performed during a voice call session between the mobile PC 16 and the operator terminal 12, to display, on the display 124, the entire desktop screen displayed on the LCD 64 of the operator terminal 12 or the window of the certain application as shown in FIG. 15(e). Consequently, the screen is shared by the LCD 64 of the operator terminal 12 and the display 124 of the wearable device main body 24.

(5) Text Message Transmission Function

This function involves transmitting a text message from the operator terminal 12 to the mobile PC 16 as shown in FIG. 15(f). The text message transmission can be performed not only during a voice call but also while no call is made. The text message is received by the mobile PC 16 and displayed on the display 124.

[Request for Remote Support]

The worker may request for the functions of remote support by using the communication area 520. When one of the End Call icon, the Conversation icon, the Message icon, and the Sign-In icon arranged in the communication area 520 is selected and the decision button 202e is pressed, the function corresponding to the selected icon is requested and performed.

The remote support functions will be described below in detail.

[Screen Configuration of the Remote Support Application]

Before describing the remote support functions, a screen (on-the-phone screen) will be described using FIG. 16 which is displayed on the display 124 while the worker using the wearable viewer and the operator using the operator terminal 12 are talking on the phone with each other.

The on-the-phone screen includes a counterpart information area 601, a function icon area 602, a preview area 603, a message area 604, and status areas 560, 570.

The counterpart information area 601 displays information on a counterpart on the phone. Specifically, the counterpart information area 601 displays the name of the operator using the operator terminal 12 connected to the mobile PC 16 for a voice call and a photograph of the operator (counterpart on the phone) registered in the server for the Internet communication application 509. If no photograph of the counterpart on the phone is registered in the server for the Internet communication application 509, a dummy image may be displayed.

An end call icon 602a, a live video distribution start/stop icon 602b, and an image taking mode switch icon 602c are arranged in the function icon area 602. When one of the icons is selected by using the right button 202b or the left button 202d and the decision button 202e is pressed, the function corresponding to the selected icon is performed.

When the end call icon 602a is selected and the decision button 202e is pressed, the voice call session between the mobile PC 16 and the operator terminal 12 is ended. The end call icon 602a performs the same function as that of the End Call icon arranged in the communication area 520.

When the live video distribution start/stop icon 602b is selected and the decision button 202e is pressed, live video distribution is started or stopped.

When the image taking mode switch icon 602c is selected and the decision button 202e is pressed, an image taking mode of the camera 116 is changed. Modes for taking a still image include a standard mode in which a still image can be taken with standard image quality (for example, 640×360) and a high image quality mode in which a still image can be taken with high image quality (2048×1536). A pressing operation for the image taking mode switch icon 602c allows switching between the standard mode and the high image quality mode.

The preview area 603 displays a live video taken with the camera 116 of the wearable device 23 while the live video is being distributed. At this time, the live video is displayed enclosed by a frame in a first color (a thick line in FIG. 16). In other words, the preview area 603 is peripherally enclosed by the frame in the first color during the live video distribution. Any first color may be used so long as the first color is different from a second color described below. The first color is hereinafter assumed to be green.

If the live video distribution is stopped, no video is displayed in the preview area 603. When a still image is taken in the high image quality mode, a preview image screen for the camera 116 is displayed in the preview area 603. Image taking in the high image quality mode will be described below in detail.

The message area 604 displays a text message received from the operator terminal 12. Transmission of a text message by the operator terminal 12 is achieved, for example, by an instant message function of the Internet communication application 509. The message area 604 may also display guidance for the worker. For example, a message indicative of an error is displayed if, for example, the video distribution fails to be appropriately performed.

When a moving image is recorded during the live video distribution as also shown in FIG. 10, the on-camera icon 560a is displayed at the leftmost position in the status area 560. When the mobile PC 16 and the operator terminal 12 are in a voice call session, the on-the-phone icon 606 is displayed at the leftmost position in the status area 570.

[Voice Call Function]

First, the voice call function will be described.

(1) Start of a Voice Call

A voice call session between the mobile PC 16 and the operator terminal 12 may be started in response to a request from the mobile PC 16 or a request from the operator terminal 12.

First, a case will be described where a voice call is started in response to a request from the mobile PC 16.

The worker may select a desired contact name from the contact list screen shown in FIG. 12(f) and press the decision button 202e to make a call (voice call request) to the selected contact name. The contact list screen is displayed by selecting the Conversation icon (FIG. 12(e)) arranged in the communication area 520 and pressing the decision button 202e.

When the decision operation for the contact name is performed to allow the mobile PC 16 to make a voice call request to the operator terminal 12 corresponding to the contact name and a receiving operation is performed at the operator terminal 12, a communication path is established between the mobile PC 16 and the operator terminal 12. Consequently, a voice call is started between the mobile PC 16 and the operator terminal 12. When the voice call is started, the screen of the display 124 is switched from the contact list screen (FIG. 12(f)) to an on-the-phone screen shown in FIG. 16. Furthermore, the leftmost icon in the resident status area 570 changes from the voice call status icon 570a indicating a standby status to the on-the-phone icon 606 indicating that the mobile PC 16 and the operator terminal 12 are in a voice call session.

While a video is being taken with the camera 116, when a voice call session with the operator terminal 12 is started in response to the request from the mobile PC 16, the live video taken with the camera 116 automatically starts to be transmitted to the operator terminal 12.

Now, a case will be described where a voice call is started in response to a request from the operator terminal 12.

When a voice call request is made from the operator terminal 12 to the mobile PC 16, a call receiving screen described below (FIG. 26) is displayed on the display 124. When the decision button 202e is pressed with the call receiving screen displayed, a communication path is established between the mobile PC 16 and the operator terminal 12. Consequently, a voice call is started between the mobile PC 16 and the operator terminal 12. Before the voice call is started, the screen displayed on the display 124 of the wearable device main body 24 is switched to the on-the-phone screen. The on-the-phone screen corresponds to the screen in FIG. 16 with no live video displayed in the preview area 603. Furthermore, the leftmost icon in the status area 570 changes from the voice call status icon 570a to the on-the-phone icon 606. Since the remote support application 503 is resident, the mobile PC 16 can receive a call (voice call request) from the operator terminal 12 at any time.

While a video is being taken with the camera 116, when a voice call session with the mobile PC 16 is started in response to a request from the operator terminal 12, the live video taken with the camera 116 starts to be transmitted to the operator terminal 12 if the live video distribution start/stop icon 602d is pressed.

As described above, a timing to start live video distribution varies depending on whether the voice call is started in response to a request from the mobile PC 16 or a request from the operator terminal 12. This is because, if the voice call is started in response to a request from the mobile PC 16, the worker is expected to intend to call and inform the operator of the situation of the workplace as fast as possible, so that the system is configured such that, in this case, the live video distribution is automatically started once the voice call path is established. On the other hand, if the voice call is started in response to a request from the operator terminal 12, the worker does not necessarily intend to positively inform the operator of the situation of the workplace, so that the system is configured such that, in this case, the live video distribution is started if the worker inputs a relevant instruction after the voice call path is established.

(2) End of the Voice Call

When the End Call icon arranged in the communication area 520 of the home screen is selected and the decision button 202e is pressed, or when the end call icon 602a in the on-the-phone screen shown in FIG. 16 is selected and the decision button 202e is pressed, the voice call is ended (end call). When the voice call is ended, the on-the-phone screen returns to the home screen and the left icon in the status area 570 changes from the on-the-phone icon 606 to the voice call status icon 570a.

Furthermore, also when the end call operation is performed by the operator terminal 12, the voice call is ended through the above-described operation.

If the operator performs the end call operation while an application other than the remote support application 503 is in use, a screen displayed based on execution of the application in use continues to be displayed and is not switched to the home screen. However, the left icon in the status area 570 changes from the on-the-phone icon 606 to the voice call status icon 570a.

[Live Video Distribution Function]

Now, the live video distribution function will be described using FIG. 17.

FIG. 17(a) shows the on-the-phone screen indicating that the end call icon 602a has been selected. This screen is displayed in response to the start of a voice call session with the mobile PC 16 following a voice call request from the operator terminal 12. Then, when the right button 202b is pressed, the on-the-phone screen is switched to a screen indicating that live video distribution start/stop icon 602b has been selected as shown in FIG. 17(b). Then, when the decision button 202e is pressed (instruction input), the live video distribution is started as shown in FIG. 17(c). As described above, when a voice call request is made from the operator terminal 12 and a voice call session with the mobile PC 16 is started, the live video distribution is started under the condition that the worker inputs the relevant instruction.

As described above, when a voice call request is made from the mobile PC 16 and a voice call session with the operator terminal 12 is started, the live video distribution is automatically started.

When the live video distribution is started, a live video taken with the camera 116 is distributed to the operator terminal 12. The direction of the live video distribution is only from the mobile PC 16 to the operator terminal 12, and no live video is distributed from the operator terminal 12 to the mobile PC 16. The distributed live video is displayed in the preview area 603. At this time, the live video is enclosed by a green frame in order to indicate that the live video distribution is in execution as shown in FIG. 17(c).

While the live video distribution is in execution, if the live video distribution start/stop icon 602b is selected and the decision button 202e is pressed, then the live video distribution is stopped. When the live video distribution is stopped, the screen shown in FIG. 17(c) returns to the screen shown in FIG. 17(b).

[Still Image Transmission and Reception Function]

Now, in regard to the still image transmission and reception function, (1) still image transmission and (2) still image reception will be separately described.

(1) Still Image Transmission

During a voice call, a still image taken with the camera 116 may be transmitted to the operator terminal 12. The modes of the camera 116 for still image taking include the standard mode and the high image quality mode.

First, a case where a still image is taken in the standard mode will be described. In the standard mode, a still image may be taken and transmitted to the operator terminal 12 during live video distribution.

As shown in FIG. 18(a), during the live video distribution, if the right button 202b is pressed several times with one of the icons arranged in the function icon area 602 selected, the preview area 603 is enabled to be selected (FIG. 18(b)). When the preview area 603 is selected, the live view taken with the camera 116 is displayed enclosed by the second color. That is, the frame of the preview area 603 changes from green to the second color (for example, white). An icon 607 indicates that the camera 116 is in use for taking the live view is also displayed in the preview area 603. Any second color may be used so long as the second color is different from the first color. The second color is hereinafter assumed to be white.

In this state, when the decision button 202e is pressed, the screen of the live video is captured (FIG. 18(c)). The taken still image is automatically transmitted to the operator on the phone (the operator terminal 12 connected to the mobile PC 16 for a voice call). After the still image is taken, the taken still image is automatically displayed in the full-screen mode in order to set the resolution of the still image to 640×360 pixels (FIG. 18(d)).

After transmission of the taken still image to the operator terminal 12 is completed, the screen returns to on-the-phone screen indicating that the live video distribution is in execution (FIG. 18(b)). Furthermore, if the decision button 202e is pressed a plurality of times with the screen in FIG. 18(b) displayed, then each press allows the screen to be captured (allows a still image to be taken), with the captured screen transmitted to the operator terminal 12.

Now, a case where a still image is taken in the high image quality mode will be described.

The camera 116 can be switched between the standard mode and the high image quality mode. However, no still image is allowed to be taken in the high image quality mode during the live video distribution. Thus, when a still image starts to be taken with the camera 116 in the high image quality mode while the live video is being transmitted to the operator terminal 12, the live video transmission is automatically stopped.

FIG. 19(a) shows the on-the-phone screen displayed when no live video is distributed. In this case, when the right button 202b or the left button 202d is operated and the decision button 202e is pressed with the focus placed at the image taking mode switch icon 602c in the function icon area 602, the image taking mode of the camera 116 is switched from the standard mode to the high image quality mode. The screen in FIG. 19(a) is switched to the screen shown in FIG. 19(c). An attention sentence indicating that the image taking mode has been switched to the high image quality mode may be displayed in the message area 604.

FIG. 19(b) shows the on-the-phone screen displayed while the live video distribution is in execution. In this state, when the right button 202b or the left button 202d is operated and the decision button 202e is pressed with the focus placed at the image taking mode switch icon 602c in the function icon area 602, the live video distribution is automatically stopped, and the image taking mode of the camera 116 is switched from the standard mode to the high image quality mode. The screen in FIG. 19(b) is switched to the screen shown in FIG. 19(c). In the message area 604, an attention sentence indicating that the image taking mode has been switched to the high image quality mode and that the live video distribution has been stopped, may be displayed.

When the image taking mode is changed to the high image quality mode, a preview image from the camera 116 is displayed in the preview area 603. The preview area 603 displays the icon 607 indicating that a photograph is to be taken with the camera 116.

When the right button 202b is pressed with the screen in FIG. 19(c) displayed, the preview area 603 is enabled to be selected, and a preview image from the camera 116 is displayed enclosed by a white frame as shown in FIG. 19(d). That is, the frame of the preview area 603 is changed from green to white. In this state, when the decision button 202e is pressed, a photograph (still image) is taken in the high image quality mode and transmitted to the operator terminal 12. Furthermore, if the decision button 202e is pressed a plurality of times, each press allows a photograph (still image) to be taken in the high image quality mode, with the taken photograph (still image) to be transmitted to the operator terminal 12. When the photograph (still image) is taken, a shutter sound may be made.

After the photograph (still image) is taken, the taken photograph (still image) is displayed on the display 124 for three seconds or until the transmission is completed (FIG. 19(e)). After the transmission of the taken photograph (still image) to the operator terminal 12 is completed, the screen returns to the one with the preview image from the camera 116 displayed enclosed by the white frame (FIG. 19(d)).

The system may be configured in such a manner that, after the photograph (still image) is taken, the image taking mode of the camera 116 is automatically switched from the high image quality mode to the standard mode. That is, if the image taking mode is switched to the high image quality mode during the live video distribution, the screen shown in FIG. 19(e) may automatically be switched to the screen shown in FIG. 19(b) after the image taking is ended. If the image taking mode is switched to the high image quality mode when no live video is distributed, the screen shown in FIG. 19(e) may automatically be switched to the screen shown in FIG. 19(a) after the image taking is ended.

(2) Still Image Reception

Upon receiving a still image transmitted from the operator terminal 12 during a voice call session with the operator terminal 12, the mobile PC 16 transmits the received still image to the wearable device main body 24 to allow the still image to be displayed on the display 124 (full-screen display). Even when another screen such as the home screen is displayed during a voice call, the mobile PC 16 may receive the still image and automatically displays the received still image on the screen displayed on the display 124 (full-screen display). Then, if the decision button 202e is pressed, the received still image is deleted from the screen displayed on the display 124. Furthermore, whenever a still image is received from the operator terminal 12, the display 124 displays the latest image.

The still image received by the mobile PC 16 is saved in the storage device 330. Thus, the worker may browse the received still image by selecting an icon corresponding to a folder (received files are saved) arranged in the contents area 530 and by pressing the decision button 202e.

[Screen Share Function]

Now, the screen share function will be described.

When an operation for screen share is performed on the operator terminal 12 while the mobile PC 16 is in a voice call session with the operator terminal 12, a screen share target screen (shared screen) is automatically displayed on the display 124. The shared screen is displayed in the full-screen mode, and thus, the aspect of the original window is not maintained. The size of the screen is adjusted by the operator terminal 12 as necessary.

The shared screen may be temporarily hidden by pressing the right button 202b. At this time, the display 124 displays the on-the-phone screen showing a thumbnail of the shared screen in an area between the counterpart information area 601 and the function icon area 602.

The shared screen may be re-displayed (full-screen display) by pressing the left button 202d a plurality of times.

[Text Message Reception]

Figure 20:
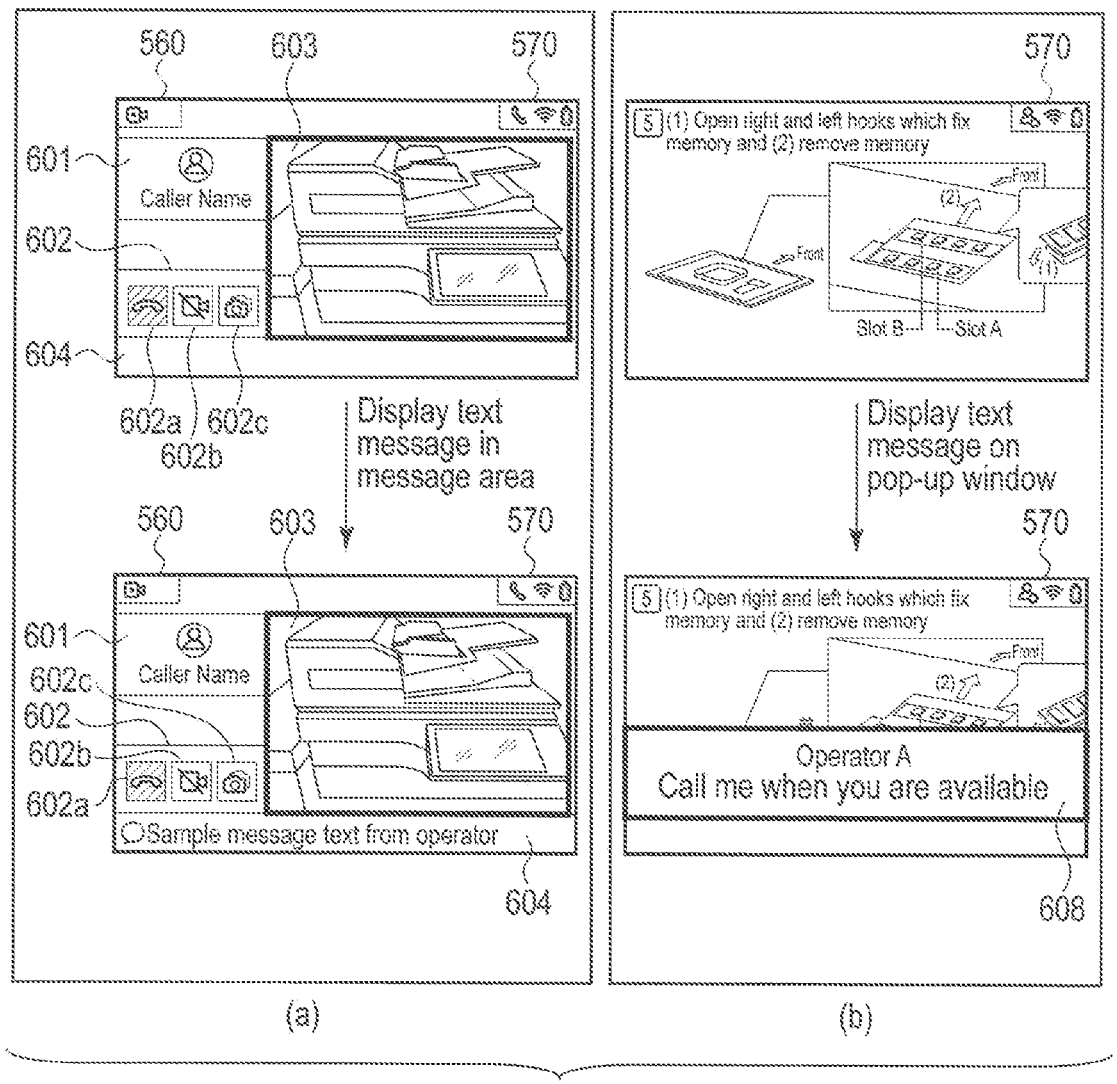
FIG. 20 is a diagram showing an example of transition of the screen displayed on the wearable device 23 in a case where the mobile PC 16 receives a text message while the mobile PC 16 and the operator terminal 12 are in a voice call session.

Now, the function of the mobile PC 16 to receive a text message from the operator terminal 12 will be described using FIG. 20.

The mobile PC 16 may receive a text message transmitted from the operator terminal 12, using the instant message function of the Internet communication application 509. The mobile PC 16 can also receive a text message from the operator terminal 12 which is not connected to the mobile PC 16 for a voice call.

If, during a voice call session between the mobile PC 16 and the operator terminal 12, the mobile PC 16 receives a text message from the operator on the phone (the operator terminal 12 connected to the mobile PC 16 for a voice call), the received message is displayed in the message area 604 as shown in FIG. 20(a).

A text message may be received from an operator different from the operator on the phone. For example, while an operator terminal A (not shown in the drawings) and the mobile PC 16 are connected together for a voice call, the mobile PC 16 may receive a text message from an operator terminal B (not shown in the drawings) not connected to the mobile PC 16 for a voice call. Furthermore, while the worker is executing another application, that is, the screen of the application in operation is displayed on the display 124, as illustrated in FIG. 20(b), the mobile PC 16 may receive a text message from the operator terminal 12 not connected to the mobile PC 16 for a voice call.

If the mobile PC 16 receives a text message from an operator different from the operator on the phone with the worker with the mobile PC 16 (from the operator terminal 12 not connected to the mobile PC 16 for a voice call), then the text message is displayed in a pop-up window on the screen displayed on the display 124. Specifically, a pop-up area 608 displaying the received text message is displayed. At this time, the name of the sender is displayed along with the received text message.

As illustrated in FIG. 20(a), only one line of text message (to be displayed in a pop-up window) can be displayed in the message area 604, and the number of characters in the line is approximately 60 characters (one-byte characters) from the head of the line.

In a case shown in FIG. 20(b), the text message displayed in the pop-up window is hidden by pressing the decision button 202e.

On the other hand, in a case shown in FIG. 20(a), the text message displayed in the message area 604 of the on-the-phone screen continues to be displayed until the voice call is ended.

While a text message is displayed in the message area 604 or in the pop-up area 608, if a new text message from the operator terminal 12 reaches the mobile PC 16, the already displayed text message (old message) disappears from the screen, with only the newly received text message displayed.

Furthermore, the received text message is saved in the mobile PC 16, and the worker may browse the saved text message using an instant message history function (see FIG. 12(h)).

[File Viewer]

Now, a viewer function (viewer application) provided in the mobile PC 16 will be described.

The viewer function is a function to enable any of the photographs (still images), videos (moving images), PDF files and the like (saved in the mobile PC 16) to be browsed by selecting a corresponding one of the icons arranged in the contents area 530 on the home screen.

(1) Display of a File in a Folder

The icons corresponding to folders are arranged in the contents area 530 as described above. When any of the icons arranged in the contents area 530 is selected and the decision button 202e is pressed, files saved in the folder corresponding to the selected icon are displayed in a list (see FIG. 13(b), FIG. 13(d), and FIG. 13(f)). In this state, when a desired file is selected from the file list using the right button 202b or left button 202d and the decision button 202e is pressed, the contents of the selected file are displayed by the viewer application corresponding to an extension of the selected file (JPEG viewer application, MP4 player application, or PDF reader application). If the files are arranged in the file list in descending order based on a file creation date, files with newer creation dates are arranged at higher positions.

The icons arranged in the contents area 530 include icons labeled Picture (still image), Video (moving image), PDF, Camera, Received Picture (received file), Sent Picture (transmitted file), and the like as icons for folders corresponding to standard folders, and icons for folders corresponding to user folders. As shown in FIG. 13(c), a Photo icon may be arranged in the contents area 530. The arrangement of the icons corresponding to the folders is separately defined in a settings file and may be changed by settings or the like.

Still image files, moving image files, and PDF files are hereinafter assumed to be saved in the same folder, for example, the folder specified by C:\Users\public\Documents\TosRC\ (hereinafter referred to as a TosRC folder).

The Picture (still image) icon is an icon used to access JPEG files previously saved in the mobile PC 16. When the Picture icon is selected and the decision button 202e is pressed, only the JPEG files included in the files saved in the TosRC folder are displayed in a list. When one of the listed files is selected and the decision button 202e is pressed, the selected file is displayed on the display 124 by the JPEG viewer application 505a.

The Video (moving image) icon is an icon used to access the MP4 files previously saved in the mobile PC 16. When the Video icon is selected and the decision button 202e is pressed, only the MP4 files included in the files saved in the TosRC folder are displayed in a list. When one of the listed files is selected and the decision button 202e is pressed, the selected file is displayed on the display 124 by the MP4 player application 505b.

The PDF icon is an icon used to access the PDF files previously saved in the mobile PC 16. When the PDF icon is selected and the decision button 202e is pressed, only the PDF files included in the files saved in the TosRC folder are displayed in a list. When one of the listed files is selected and the decision button 202e is pressed, the selected file is displayed on the display 124 by the PDF reader application 505c.

When the Camera icon is selected and the decision button 202e is pressed, a list of photographs (still images) and videos (moving images) taken by the camera application 504 is displayed. Photographs (still images) and videos (moving images) are saved in a folder for each user account. For example, taken photographs (still images) and videos (moving images) are saved in a folder specified by C:\Users\[User Name]\Documents\TosRC\Camera\.

When one of the files for photographs (still images) included in the listed files is selected and the decision button 202e is pressed, the selected file is displayed on the display 124 by the JPEG viewer application 505a. When one of the files for videos (moving images) included in the listed files is selected and the decision button 202e is pressed, the selected file is displayed on the display 124 by the MP4 player application 505b.

When the Received Picture icon is selected and the decision button 202e is pressed, a list of the JPEG files is displayed which have been received from the operator terminal 12 by using the function of the remote support application 503. The JPEG files received from the operator terminal 12 are saved in a folder for each user account. For example, the JPEG files received from the operator terminal 12 are saved in a folder specified by C:\Users\[User Name]\Documents\TosRC\Received\.

When one of the listed JPEG files is selected and the decision button 202e is pressed, the selected JPEG file is displayed on the display 124 by the JPEG player application 505a.

When the Sent Picture icon is selected and the decision button 202e is pressed, a list of the JPEG files is displayed which have been transmitted to the operator terminal 12 by using the function of the remote support application 503. The JPEG files transmitted to the operator terminal 12 are saved in a folder for each user account. For example, the JPEG files transmitted to the operator terminal 12 are saved in a folder specified by C:\Users\[User Name]\Documents\TosRC\Sent\.

When one of the listed JPEG files is selected and the decision button 202e is pressed, the selected JPEG file is displayed on the display 124 by the JPEG player application 505a.

Now, the user folders will be described.

The viewer application 505 supports folders of which purpose may be freely determined, and thus allows the worker to set user folders. JPEG files, MP4 files, and PDF files may be saved in the user folders. Up to five user folders may be provided. The worker may use a settings file to designate paths (locations of the folders) and folder names displayed in the contents area 530. Each of the displayed names (folder names) includes up to 32 one-byte characters. In the example in FIG. 13, the user folder is named Folder_10.

Now, the JPEG viewer application 505a, the MP4 player application 505b, and the PDF reader application 505c, included in the viewer application 505, will be described.

If the file selected from the file list by the worker is a JPEG file, the JPEG viewer application 505a is activated to display the selected JPEG file (still image file) on the display 124.

The still image displayed on the display 124 is enlarged in stages by pressing the decision button 202e. For example, whenever the decision button 202e is pressed, a scale factor for the image is changed from 100% to 200%, then to 300%, and back to 100%. During zoomed display (during enlarged display), when the up button 202a, the right button 202b, the down button 202c, or the left button 202d is operated, the display position of the image is moved.

The worker may enlarge the still image on the screen by performing a pinch operation using the touch pad 110 of the wearable device main body 24. The worker may also similarly reduce the still image on the screen.

If the file selected from the file list by the worker is an MP4 file (moving image file), the MP4 player application 505b is activated to display and reproduce the selected MP4 file (moving image file) on the display 124 of the wearable device main body 24.

When the decision button 202e is pressed during the reproduction of the MP4 file (moving image file), the reproduction of the MP4 file (moving image file) is temporarily suspended. Then, when the decision button 202e is pressed again, the reproduction of the MP4 file (moving image file) is resumed.

If the file selected from the file list by the worker is a PDF file, the PDF reader application 505c is activated to display the selected PDF file on the display 124.

When the up button 202a or the down button 202c is operated, a displayed page of the PDF file is scrolled (page feeding).

The PDF file displayed on the display 124 is enlarged in stages by pressing the decision button 202e. For example, whenever the decision button 202e is pressed, a scale factor for the file is changed from 100% to 200%, then to 300%, then to 400%, and back to 100%. During zoomed display (during enlarged display), when the up button 202a, the right button 202b, the down button 202c, or the left button 202d is operated, the display position of the file is moved.

The worker may enlarge the PDF file on the screen with the PDF file displayed therein by performing a pinch operation using the touch pad 110 of the wearable device main body 24. The worker may also similarly reduce the PDF file on the screen.

[Camera Function]

Now, the camera function provided in the mobile PC 16 will be described.

The use of the camera application 504 allows a photograph or a video to be taken with the camera 116 of the wearable device main body 24, and the taken photograph or video may be saved in the storage device 330 of the mobile PC 16. The Camera icon (photo taking icon) and the Video icon (video taking icon) are arranged in the tool area 540 of the home screen. Selection of the Camera icon (photo taking icon) allows the camera application 504 to be activated in the photo taking mode. Selection of the Video icon (video taking icon) allows the camera application 504 to be activated in the video taking mode.

In this manner, the camera application 504 supports the two modes: the photo taking mode and the video taking mode. Therefore, the worker may switch the image taking mode of the camera 116 by operating the right button 202*b* or the left button 202*d*.

(1) Photo Taking

If the camera 116 is in the photo taking mode, a photograph is taken with the camera 116 whenever the decision button 202*e* is pressed. When a photograph is taken, the shutter sound is made and the taken photograph is displayed on the display 124 for three seconds. Subsequently, the screen returns to the preview display.

In this case, the size of the photograph is, for example, 2048×1536 (4:3) pixels. The taken photograph is saved in a specified photo folder of the mobile PC 16. In the above-described example, the taken photograph is saved in the folder specified by C:\Users\[User Name]\Documents\TosRC\Camera\. The worker may display the taken photograph on the display 124 by performing an appropriate operation on the contents area 530 of the home screen. Specifically, when the Camera icon arranged in the contents area 530 of the home screen is selected and the decision button 202*e* is pressed, the taken photograph is displayed.

(2) Video Taking

If the camera 116 is in the video taking mode, video taking is started when the decision button 202*e* is pressed. When the decision button 202*e* is pressed again during the video taking, the video taking is stopped. During the video taking, a taken image (preview image) is displayed on the display 124. Furthermore, an icon indicating that video recording is in execution (an icon 591 in FIG. 14(*b*)) is displayed on the screen.

In this case, the size of the video is, for example, 1080p video @ 30 fps, and the time available for video recording is, for example, up to 15 minutes. When the maximum time is reached after the video taking is started, the video taking is automatically stopped.

A file of the taken video is saved in a specified video folder in the mobile PC 16. In the above-described example, the video file is saved in the folder specified by C:\Users\[User Name]\Documents\TosRC\Camera\.

The worker may reproduce the taken video on the display 124 by performing an appropriate operation on the contents area 530 of the home screen. Specifically, when the Camera icon arranged in the contents area 530 of the home screen is selected and the decision button 202*e* is pressed, the taken video is reproduced.

[Settings]

Now, an operation for setting an operating environment for the mobile PC 16 and the wearable device 23 will be described. The setting operation includes a method using the settings screen application 507 and a method using the quick settings application 508.

First, the method using the settings screen application 507 will be described.

Figure 21:
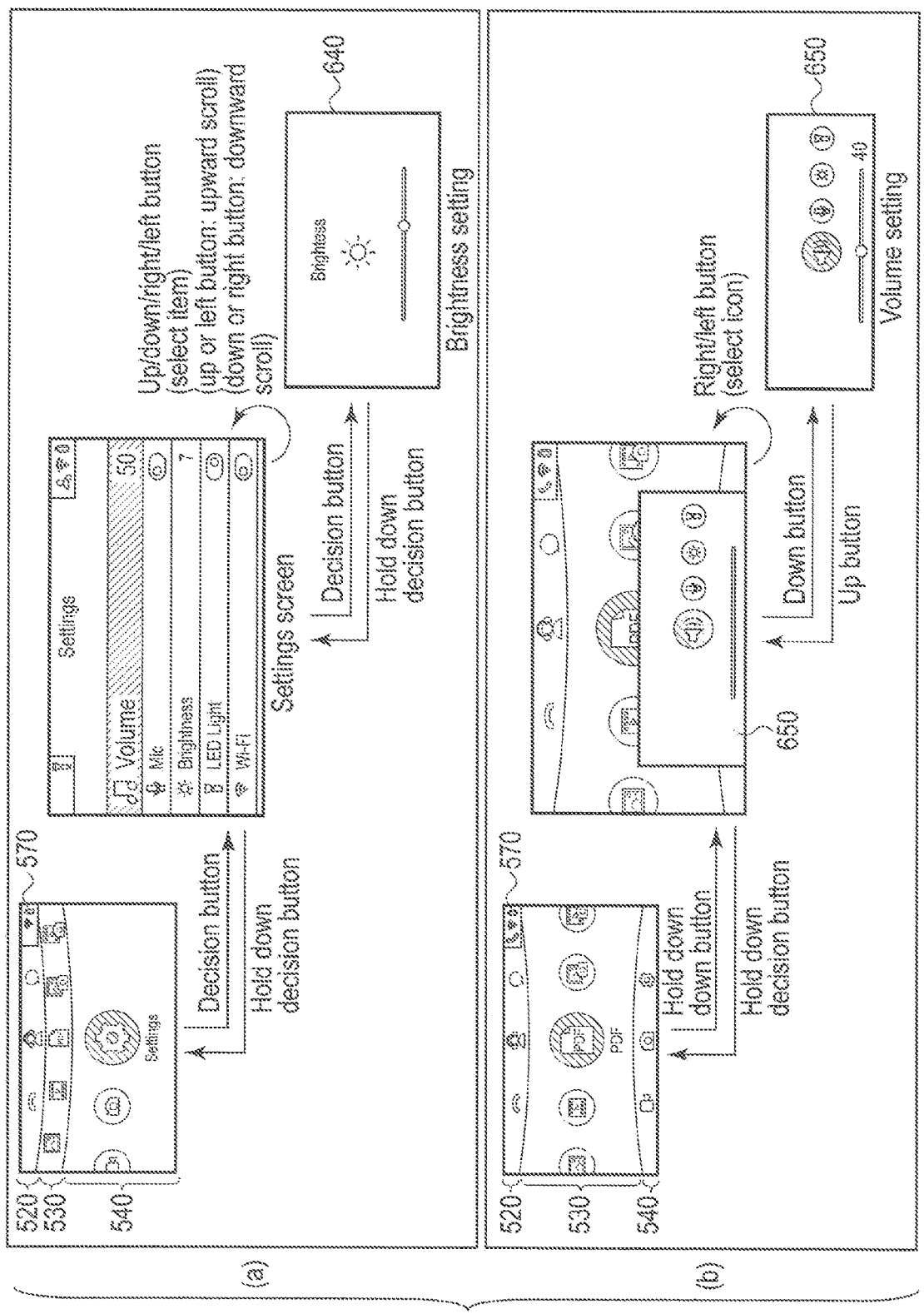
FIG. 21 is a diagram showing an example of transition of the screen displayed on the wearable device 23 in a case where the mobile PC 16 sets an operational environment for the wearable device 23.

As shown in FIG. 21(*a*), when the Settings icon arranged in the tool area 540 of the home screen is selected and the decision button 202*e* is pressed, the settings screen is displayed. The settings screen displays a list of setting items.

The worker may set the following matters on the settings screen.

(1) Volume Setting

The volume of voice heard through the speaker 130 can be varied. When Volume on the settings screen is selected and the decision button 202*e* is pressed, the settings screen is switched to a volume setting screen not shown in the drawings.

(2) Voice Mute

Voice input through the microphones 112, 126 can be muted. When "Mic" on the settings screen is selected and the decision button 202*e* is pressed, the settings screen is switched to a voice mute setting screen not shown in the drawings. Furthermore, the voice mute can be canceled in the similar manner.

(3) Screen Brightness Adjustment

The brightness of the display 124 can be adjusted. As shown in FIG. 21(*a*), when the up button 202*a*, the right button 202*b*, the down button 202*c*, or the left button 202*d* is operated and Brightness on the settings screen is selected, with the decision button 202*e* pressed, the settings screen is switched to a brightness setting screen. When the decision button 202*e* is held down after the brightness is adjusted, the brightness setting screen returns to the settings screen.

(4) LED Light ON/OFF

The light 118 can be turned on and off. When LED Light on the settings screen is selected and the decision button 202*e* is pressed, the setting screen is switched to a LED light setting screen.

(5) Wi-Fi SSID Switching

The SSID of a connection access point may be selected from a set SSID list. At this time, unregistered SSIDs are not displayed.

(6) Wi-Fi ON/OFF

The Bluetooth/wireless LAN device 340 may be enabled or disabled in a switching manner. When Wi-Fi is selected on the settings screen and the decision button 202*e* is pressed, the settings screen is switched to a Wi-Fi setting screen not shown in the drawings.

(7) Version Display

The version numbers of the applications installed into the mobile PC 16 can be displayed. When one of the setting items in which the version numbers are to be displayed is selected on the settings screen application and the decision button 202*e* is pressed, the version numbers of the applications installed into the mobile PC 16 are displayed.

(8) Display of License Terms

The contents of a license agreement (EULA) for the front-end application 501 can be displayed. When an item to which the contents of the license agreement (EULA) are to be displayed is selected on the setting screen application and the decision button 202*e* is pressed, the contents of the license agreement (EULA) are displayed.

(9) System Shutdown

When a prescribed item is selected on the settings screen and the decision button 202*e* is pressed, shutdown, sleep, hibernation, or reactivation of the mobile PC 16 can be executed.

Now, the method using the quick settings application 508 will be described.

As described in FIG. 21(*b*), when the down button 202*c* is held down with any screen displayed on the display 124, the quick settings application 508 is activated to display a menu 650 for the quick setting application 508 on the displayed screen. The quick settings application 508 can be activated at any time regardless of whatever application is operating.

If the quick settings application 508 is used, among the matters which may be set if the settings screen application 507 is used, the settings of (1) volume, (2) voice mute, (3) screen brightness adjustment, and (4) LED light ON/OFF may be changed.

When the focus is placed at a desired one of the icons displayed in the menu 650 of the quick settings application 508 shown in FIG. 21(*b*) and the up button 202*a* or the down button 202*c* is operated, any of the settings (1) to (4) can be changed. FIG. 21(*b*) shows an example where the volume is set with the focus placed at the icon for the volume setting.

When the decision button 202*e* is held down, the quick settings application 508 is terminated.

[Installer]

The front-end application 501 is installed into the mobile PC 16 by an installer. The installer may install, at a time, modules such as Lync SDK 2013 which are needed for operations of the front-end application 501. However, the Internet communication application 509, for example, a Skype for Business client application, and the like, needs to be separately installed. The front-end application 501 includes a license management function incorporated therein to disable the front-end application 501 when a predetermined period of time has elapsed since installation in the mobile PC 16.

[Setup of the Windows Desktop Environment]

The following description relates to an example of a setup procedure for the wearable viewer including installation of the front-end application 501 into the mobile PC 16.

For the following settings, work is performed using a display, a keyboard, and a mouse connected to the mobile PC 16 but not shown in the drawings.

(1) Creation of a Windows Account

A user account with a standard authority is created for the worker using the wearable viewer, and the front-end application 501 is operated by the user account.

(2) Installation of the Internet Communication Application 509

(3) Connection of the Internet Communication Application 509 to the Server

The worker logs into the Windows using the user account created in (1).

(4) Registration of a Fingerprint

If the mobile PC 16 supports fingerprint authentication, a fingerprint of the worker using the wearable viewer is registered by using Windows settings (sign-in option) as necessary.

(5) Installation of the Front-End Application (6) Setting of Automatic Activation of the Front-End Application A registry editor is activated, and a prescribed value is registered in the registry editor.

[Back-End Operations]

Figure 22:
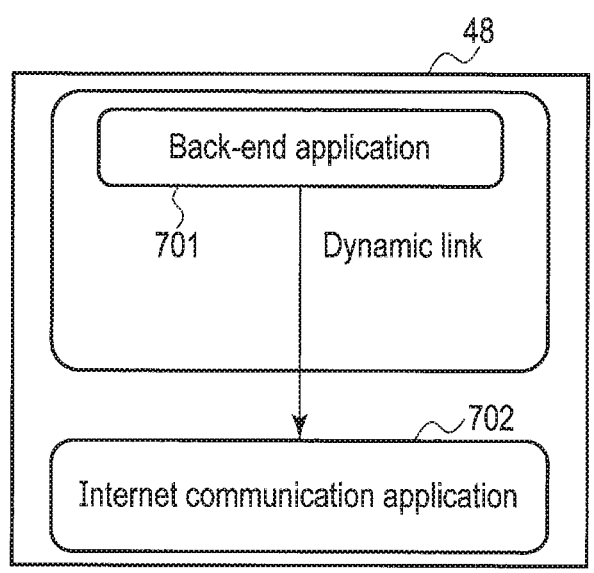
FIG. 22 is a diagram showing an example of an application program for the operator terminal 12.

FIG. 22 shows an example of the application program 48 for the operator terminal 12.

In the remote support, the back-end (operator terminal 12) side may communicate with the mobile PC 16 using the Internet communication application 509. A back-end application 701 is an application operating on the operator terminal 12 to assist the remote support provided by an Internet communication application 702. The back-end application 701 includes a function to allow an image file to be transmitted to and received from the mobile PC 16 by using the Internet communication application 702 and an edition function to allow an annotation to be added to the image file. The back-end application 701 installed into the operator terminal 12 is also implemented as a Windows desktop application. The Internet communication application 702 may be similar to the Internet communication application 509 in the mobile PC 16.

The operator using the remote support system including the operator terminal 12 by executing the back-end application 701 can perform the following work.

(1) As the work which uses the Internet communication application 509, the operator may:

make a call to the mobile PC 16, receive a call from the mobile PC 16, display a live video distributed from the mobile PC 16, on the LCD 64 of the operator terminal 12, share a desktop screen or a screen of the application in operation with the mobile PC 16 (screen share), and transmit a text message to the mobile PC 16.

(2) As the work which uses the back-end application 701, the operator may:

receive an image file transmitted from the mobile PC 16 which is in communication with the operator terminal 12, write a handwriting annotation to the image file, and transmit the image file with the annotation added thereto, to the mobile PC 16 which is in communication with the operator terminal 12.

Now, activation and termination of the back-end application 701 will be described below.

At the operator terminal 12, both the Internet communication application 702 and the back-end application 701 operate. The back-end application 701 is activated by the operator at the operator terminal 12 by designating the back-end application 701. The system may be configured in such a manner that, when the operator activates the operator terminal 12 and signs in to the Windows, the back-end application 701 is automatically activated.

In this case, the Internet communication application 702 needs to be activated earlier than the applications for the operator terminal 12. Furthermore, when the Internet communication application 702 is activated, a presence status changes to "online", but before the back-end application 701 is activated, constraints are imposed such as prevention of transmission of still images from the mobile PC 16.

In order to terminate the back-end application 701, the operator may perform a relevant operation on an end menu of the back-end application 701.

[Communication with the Mobile PC 16]

Communication with the mobile PC 16 as viewed from the operator terminal 12 will be described.

(1) Voice Call Start

When a voice call request (call) is made from the operator terminal 12, the operator makes a call by designating one of the contact names (mobile PC 16) in the contact list of the Internet communication application 702. When the mobile PC 16 side performs a receiving operation, the operator can talk on the phone with the worker using the mobile PC 16.

When a voice call request (call) is made from the mobile PC 16, a call receiving screen is displayed in a pop-up window of the operator terminal 12 by using the function of the Internet communication application 702. The call receiving screen displays the name and a face image of the caller (the worker using the mobile PC 16). When an accept button is pressed on the call receiving screen, a communication path with the mobile PC 16 is established to allow the operator to talk on the phone with the worker.

(2) Live Image Display

A live video distributed from the mobile PC 16 is displayed on the operator terminal 12. When the mobile PC 16 makes a call to the operator terminal 12 to start a voice call session between the mobile PC 16 and the operator terminal 12, live video distribution is automatically started to display the live video on the on-the-phone screen. The on-the-phone screen is displayed on the LCD 64 of the operator terminal 12. When the operator terminal 12 makes a call to the mobile PC 16 to start a voice call session with the mobile PC 16, the live video distribution is not automatically started. If the worker using the mobile PC 16 performs an instructing operation, the live video is displayed on the on-the-phone screen.

(3) Voice Mute/Mute Cancellation

On the on-the-phone screen for the voice call session between the operator terminal 12 and the mobile PC 16, voice mute/mute cancellation may be performed. If the voice mute is set, no voices on the operator terminal 12 side are transmitted to the mobile PC 16.

(4) Voice Call End

Pressing the end call button on the on-the-phone screen allows the voice call to be ended on the operator terminal 12. The communication is also disconnected if the end call operation is performed on the mobile PC 16.

[Still Image Reception]

Figure 23:
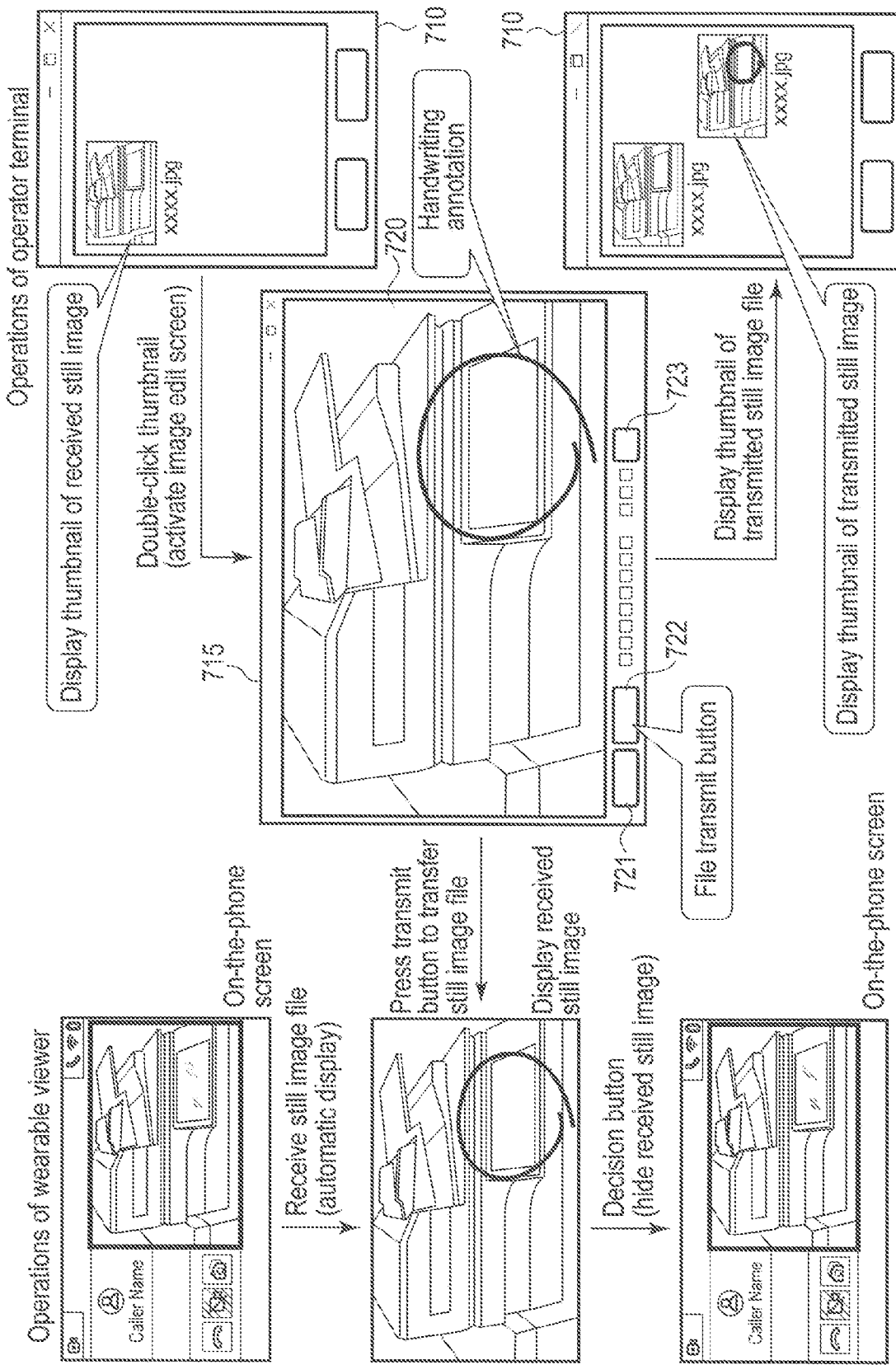
FIG. 23 is a diagram showing an example of a flow of operations in which the operator terminal 12 adds an annotation to the still image and transmits the still image with the annotation added thereto to the mobile PC 16.

The operator terminal 12 may receive an image file from the mobile PC 16 which is in communication with the operator terminal 12. The received image file is displayed in a thumbnail form on the file transmit and receive screen 710 as shown in FIG. 23. When the thumbnail of the still image is double-clicked, an image edit screen 715 is activated to display the selected image file thereon. In order to display the received still image in a thumbnail form, the file transmit and receive screen 710 needs to be previously displayed on the LCD 64 of the operator terminal 12.

[Annotation Function]

When one of the received files each displayed in a thumbnail form on the file transmit and receive screen 710 is selected and double-clicked, the image edit screen 715 is activated to display the selected image file in an image area 720 thereon. The image edit screen 715 displays buttons 721, 722, 723, and a file transmit button is denoted by 722.

The operator may perform, for example, writing characters, drawing pictures, and the like using the image edit screen 715. FIG. 23 shows that a write operation is performed on a still image transmitted from the mobile PC 16 and that an annotation drawn by the write operation is added to the received still image.

[Still Image Transmission]

When the file transmit button 722 on the image edit screen 715 is pressed, the image with the annotation added thereto (the still image displayed in the image area 720) is transmitted to the mobile PC 16. The transmitted still image (the image with the annotation added thereto) is saved in the operator terminal 12 as an image file. Furthermore, a history of the transmitted still image (image with the annotation added thereto) file is displayed in a thumbnail form on the file transmit and receive screen 710. A thumbnail of the file of the transmitted still image is displayed on the file transmit and receive screen 710 when the still image is transmitted.

When the still image (the image with the annotation added thereto) transmitted from the operator terminal 12 is received by the mobile PC 16, the received still image is displayed on the screen of the display 124 in the full-screen mode. Consequently, the worker can view the image with the annotation added thereto. Subsequently, when the decision button 202e is pressed, the screen returns to the on-the-phone screen.

Figure 24:
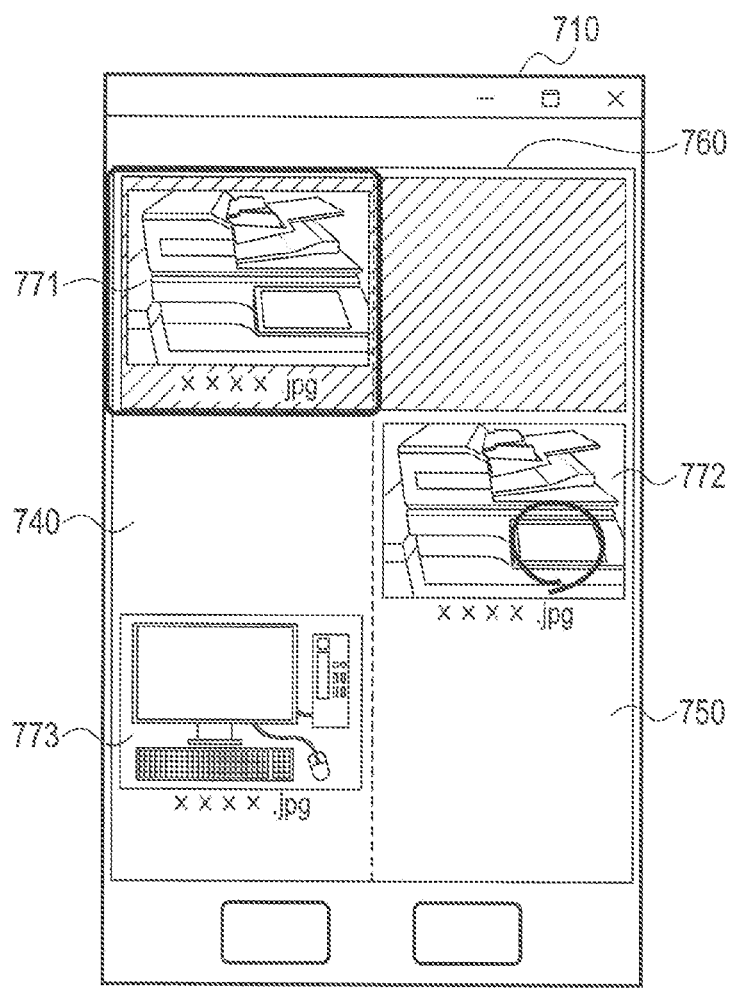
FIG. 24 is a diagram showing an example of a screen of the operator terminal 12 displaying thumbnails of still images received from the mobile PC 16 and a thumbnail of a still image transmitted to the mobile PC 16.

FIG. 24 shows an example of the screen (file transmit and receive screen 710) of the LCD 64 displaying thumbnails of still images received from the mobile PC 16 and a thumbnail of a still image transmitted to the mobile PC 16.

The file transmit and receive screen 710 includes a file transmit and receive area 760, and the file transmit and receive area 760 includes a file receive area 740 and a file transmit area 750. The file receive area 740 corresponds to a left half of the file transmit and receive area 760. The file transmit area 750 corresponds to a right half of the file transmit and receive area 760.

The file receive area 740 is an area where a thumbnail of a still image received from the mobile PC 16 by the operator terminal 12 is displayed. If a plurality of still images is received from the mobile PC 16 as shown in FIG. 24, thumbnails 771, 773 of the still images are arranged from top of file receive area 740 in chronological order (in time series) of reception by the operator terminal 12.

The file transmit area 750 is an area where a thumbnail of a still image transmitted to the mobile PC 16 by the operator terminal 12 is displayed. FIG. 24 shows an example where a thumbnail 772 of the still image received from the mobile PC 16 and to which the annotation has been added is displayed in the file transmit area 750. Display of the thumbnail 722 of the still image means that the still image 772 has been transmitted from the operator terminal 12 to the mobile PC 16. If a plurality of still images is transmitted to the mobile PC 16, thumbnails of the still images are arranged from the top of file transmit area 750 in chronological order (in time series) of transmission by the operator terminal 12.

FIG. 24 implies that, when a still image A corresponds to the thumbnail 771, a still image B corresponds to the thumbnail 772, and a still image C corresponds to the thumbnail 773, the operator terminal 12 has performed operations in order of reception of the still image A, transmission of the still image B, and reception of the still image C. Display of the thumbnail 772 below the thumbnail 771 and display of the thumbnail 773 below the thumbnail 772 indicate reception of the still image A, transmission of the still image B, and reception of the still image C. As described above, the thumbnails of the received still images and the thumbnail of the transmitted still image are collectively arranged in chronological order (in time series).

If the operator terminal 12 transmits a still image to a plurality of mobile PCs 16, the workers using the mobile PCs 16 to which the still image is to be transmitted may be identified, and information on the identified workers and a thumbnail of the transmitted still image may be displayed in the file transmit area 750 as a history.

[Screen Share]

The desktop screen of the operator terminal 12 and a screen of the application in operation on the operator terminal 12 may be shared with the mobile PC 16 which is in a voice call session with the operator terminal 12. Consequently, the mobile PC 16 may allow documents in the PDF or the like selected by the operator terminal 12 to be remotely displayed on the display 124.

[Installation/Uninstallation]

The back-end application 701 is installed by the installer. The installer can install, at a time, modules such as Lync SDK 2013 which are needed for the operations of the back-end application 701. However, the Internet communication application 702, for example, the Skype for Business client application, and the like, needs to be separately installed.

[Front-End and Back-End User Interfaces]

For the above-described main functions, a user interface on the wearable viewer side and a user interface on the operator terminal 12 side will be described.

Figure 25:
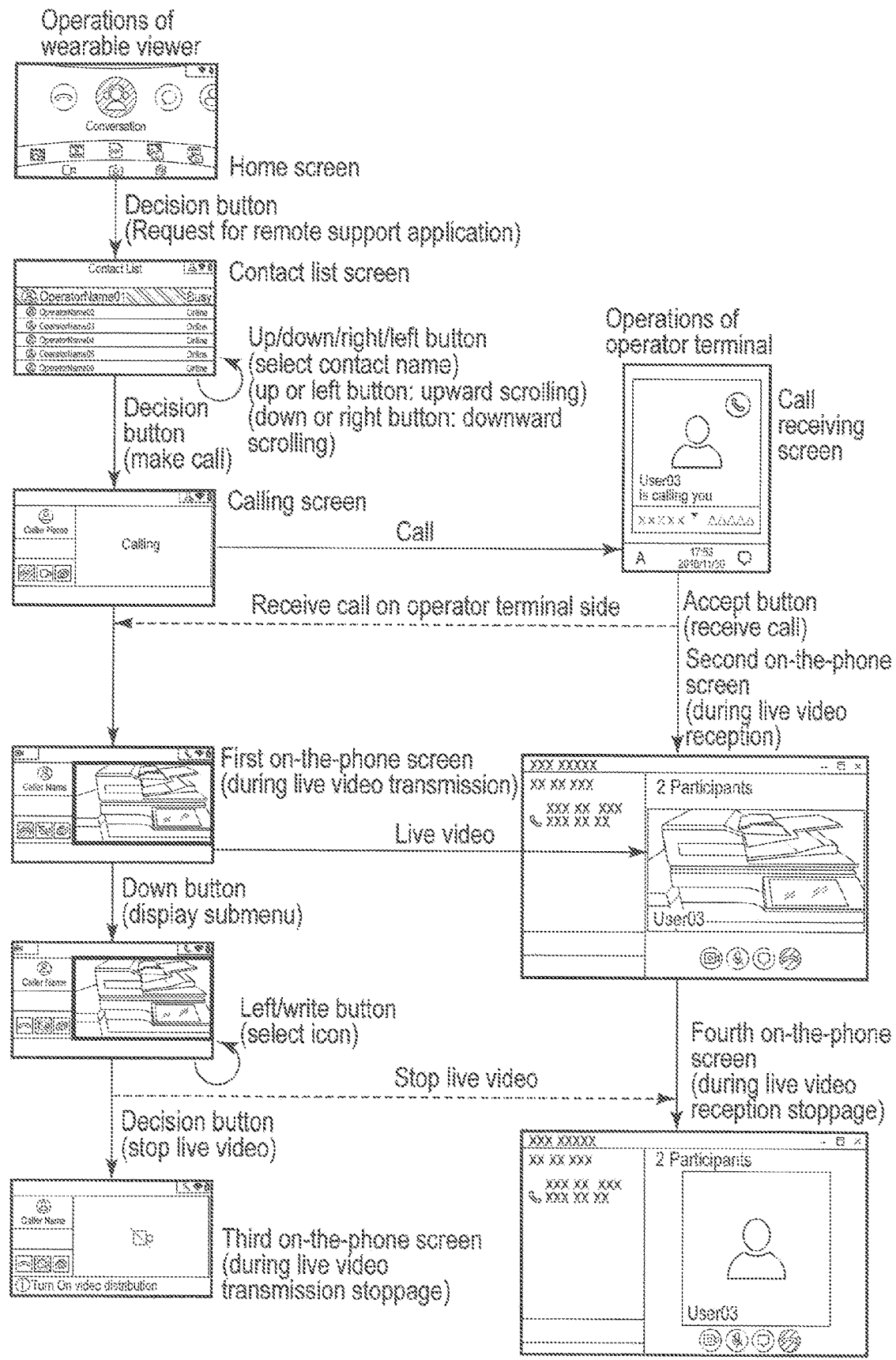
FIG. 25 is a diagram showing a user interface on a wearable viewer side and a user interface on the operator terminal 12 side in a case where the operator terminal 12 receives a call from the mobile PC 16 and a live video is distributed to the operator terminal 12.

FIG. 25 shows a user interface provided in a case where the operator terminal 12 receives a call from the mobile PC 16 to allow live video distribution to be performed. FIG. 25 relates to the former half of the description of the (1) Voice Call Start, included in the above description of the [Voice Call Function] with reference to FIG. 12.

On the wearable viewer side, when the worker selects the Conversation icon arranged in the communication area 520 of the home screen and presses the decision button 202e, the contact list screen is displayed. By operating the four buttons (up button 202a, right button 202b, down button 202c, and left button 202d) on the contact list screen, the worker determines the contact name. At this time, when the worker presses the up button 202a or the left button 202d, the focus is scrolled upward. On the other hand, at this time, when the operator presses the down button 202c or the right button 202b, the focus is scrolled downward.

When the worker determines the contact name and presses the decision button 202e, a call is made to the operator terminal 12 corresponding to the contact name. At this time, a calling screen is displayed on the wearable viewer side.

On the operator terminal 12 side, when the call from the mobile PC 16 is received, the call receiving screen is displayed. When the operator presses the accept button on the operator terminal 12, the operator terminal 12 receives the call from the mobile PC 16, and a voice call path is established to allow a voice call session to be started.

When the voice call session is started, transmission of a live video is automatically started. At this time, the video taken with the camera 116 is distributed to the operator terminal 12. Furthermore, the screen displayed on the wearable viewer side is switched from the calling screen to the on-the-phone screen during live video transmission (first on-the-phone screen). On the first on-the-phone screen, the distributed live image is displayed enclosed by a green frame.

At this time, on the operator terminal 12 side, the on-the-phone screen during live video reception (second on-the-phone screen) is displayed. On the second on-the-phone screen, the live video distributed from the mobile PC 16 is displayed.

On the wearable viewer side with the first on-the-phone screen displayed, when the worker operates the right button 202b or the left button 202d to select the live video distribution start/stop icon 602b and presses the decision button 202e, the live video distribution is stopped. When the live video distribution is stopped, the screen is switched from the first on-the-phone screen to the on-the-phone screen during live video transmission stoppage (third on-the-phone screen).

On the operator terminal 12 side, when the live video distribution is stopped, the screen is switched from the second on-the-phone screen to the on-the-phone screen during live video reception stoppage (fourth on-the-phone screen).

Figure 17:
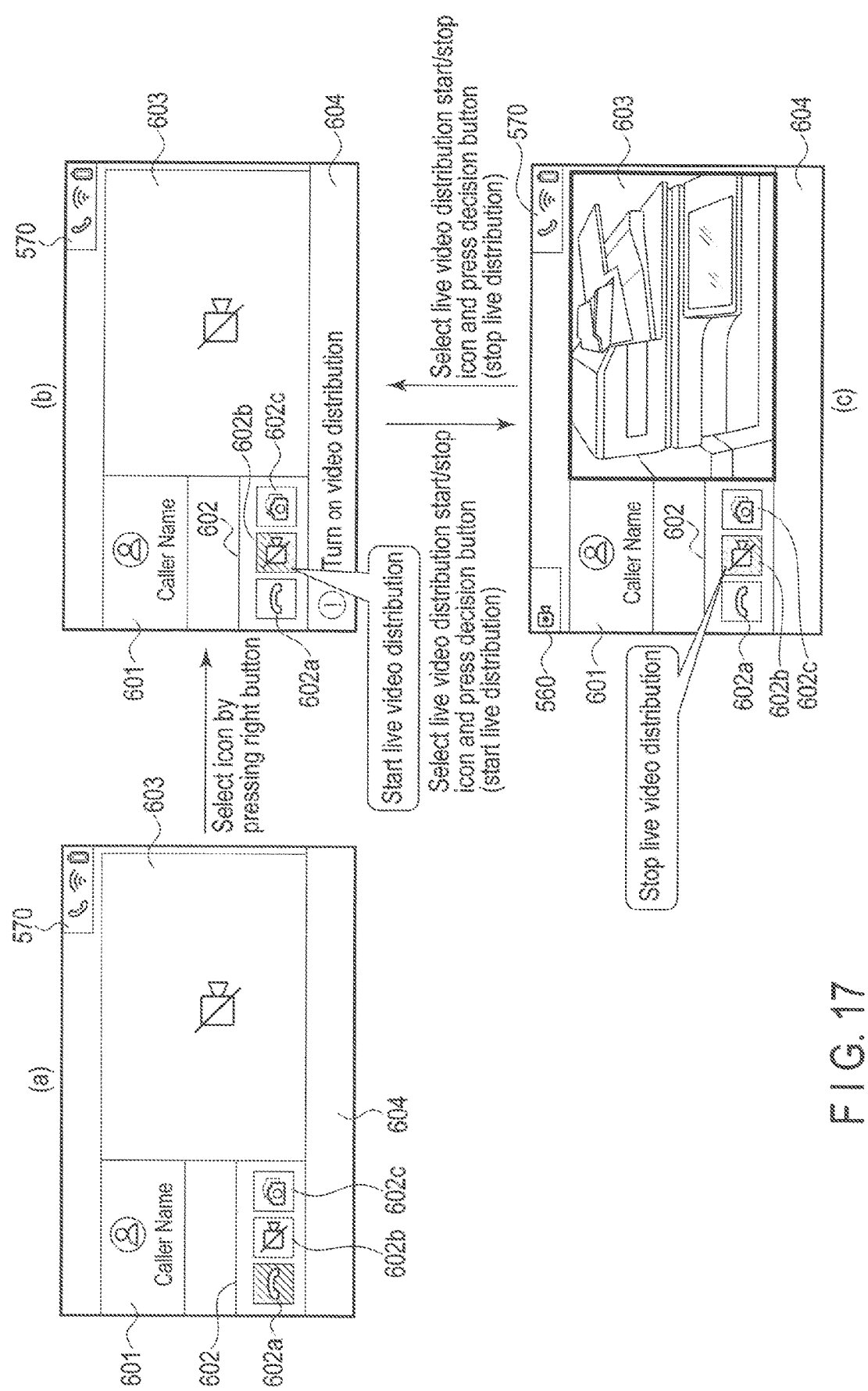
FIG. 17 is a diagram showing an example of transition of the screen displayed on the wearable device 23 in a case where a real-time video taken with the wearable device 23 is distributed to the operator terminal 12.
Figure 26:
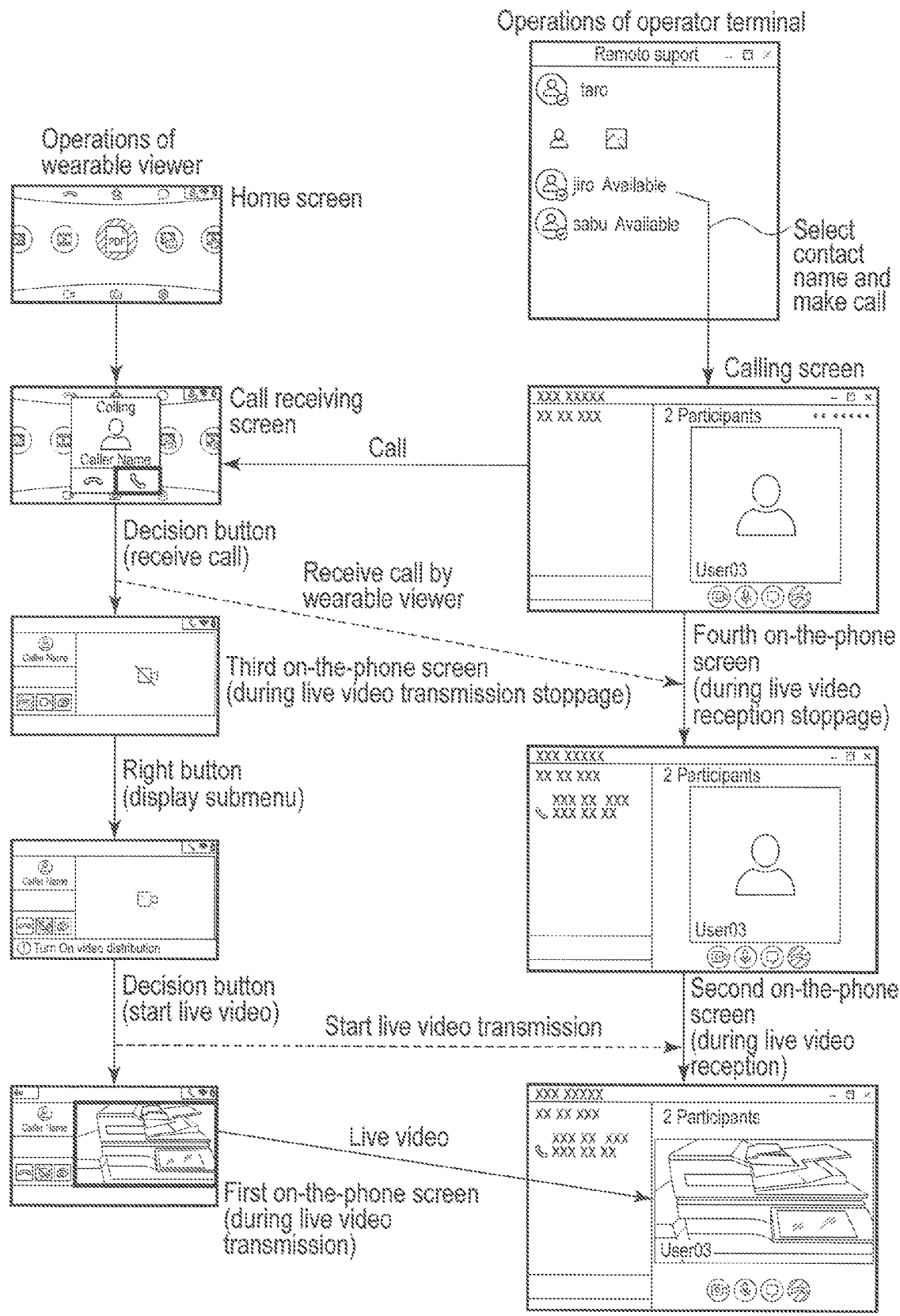
FIG. 26 is a diagram showing a user interface on the wearable viewer side and a user interface on the operator terminal 12 side in a case where the mobile PC 16 receives a call from the operator terminal 12 and a live video distribution is executed.

FIG. 26 shows a user interface provided in a case where the mobile PC 16 receives a call from the operator terminal 12 to allow live video distribution to be performed (FIG. 17). FIG. 26 relates to the latter half of the description of the (1) Voice Call Start, included in the above description of the [Voice Call Function].

If the operator desires to talk on the phone with a certain worker, the operator selects one of the contact names on a prescribed screen which corresponds to the certain worker with whom the operator desires to talk on the phone. When the operator selects the contact name and performs the decision operation, a call is made to the mobile PC 16 corresponding to the selected contact name. At this time, the calling screen is displayed on the operator terminal 12.

On the wearable viewer side, when the call from the operator terminal 12 is received, the call receiving screen is displayed. For example, as shown in FIG. 26, if the home screen is being displayed, the call receiving screen is displayed in the home screen. When the worker presses the decision button 202e, the call from the operator terminal 12 is received. Consequently, a voice call path between the mobile PC 16 and the operator terminal 12 is established to allow a voice call session to be started.

On the wearable viewer side, when the call from the operator terminal 12 is received, the on-the-phone screen during live video transmission stoppage (third on-the-phone screen) is displayed. That is, when a voice call session is started in response to the call from the operator terminal 12, live video distribution is not started.

On the operator terminal 12 side, when the mobile PC 16 receives the call, the displayed screen is switched from the calling screen to the on-the-phone screen during live video reception stoppage (fourth on-the-phone screen).

On the wearable viewer side, when the worker operates the right button 202b to select the live video distribution start/stop icon 602b and presses the decision button 202e, live video transmission is started. At this time, the displayed screen is switched from the third on-the-phone screen to the on-the-phone screen during live video transmission (first on-the-phone screen).

On the operator terminal 12 side, when the mobile PC 16 starts the live video transmission, the displayed screen is switched from the fourth on-the-phone screen to the on-the-phone screen during live video reception (second on-the-phone screen). The second on-the-phone screen displays the live video distributed from the mobile PC 16.

Figure 18:
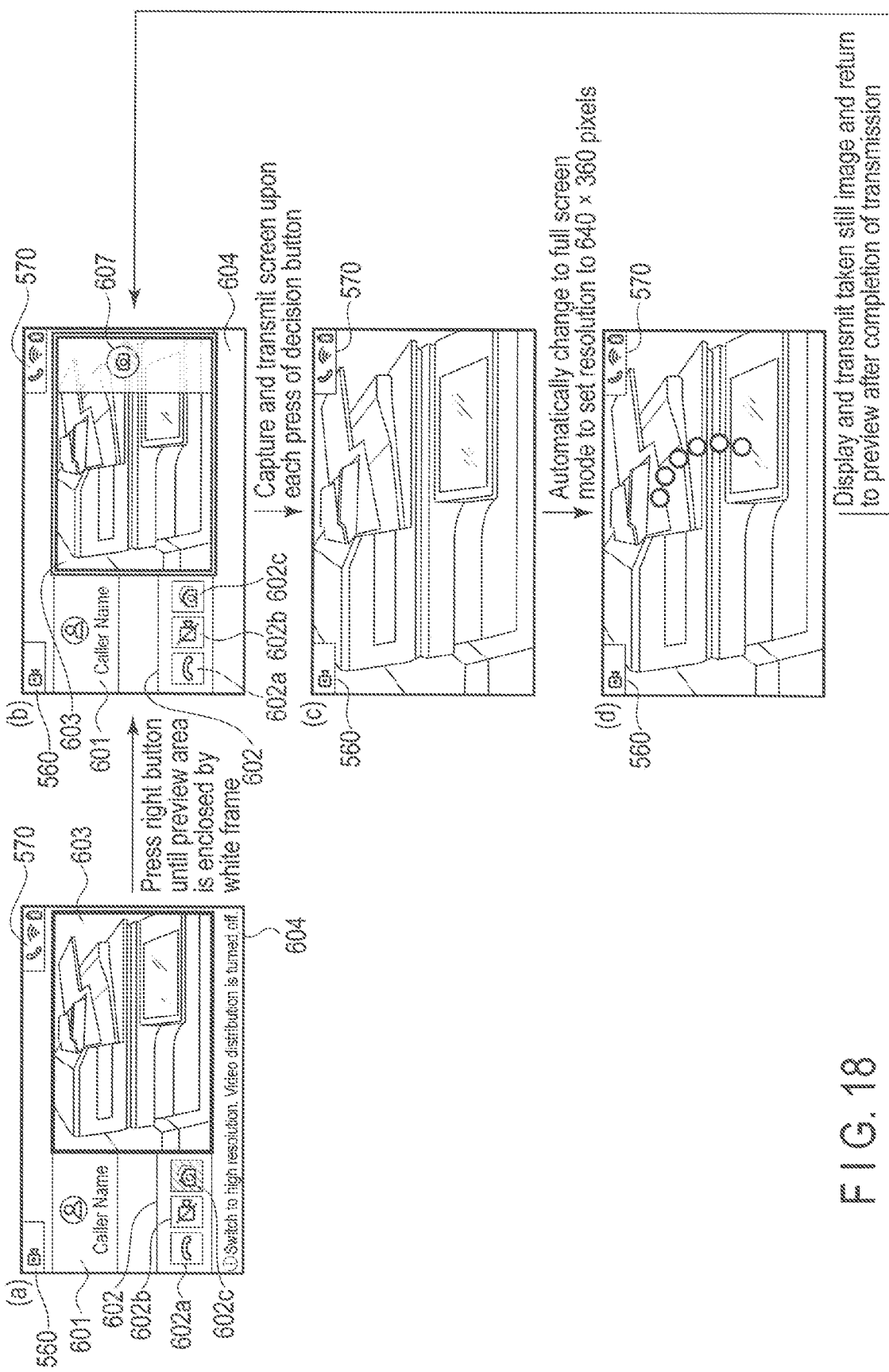
FIG. 18 is a diagram showing an example of transition of the screen displayed on the wearable device 23 in a case where a still image is taken in a standard mode while the mobile PC 16 and the operator terminal 12 are in a voice call session.
Figure 27:
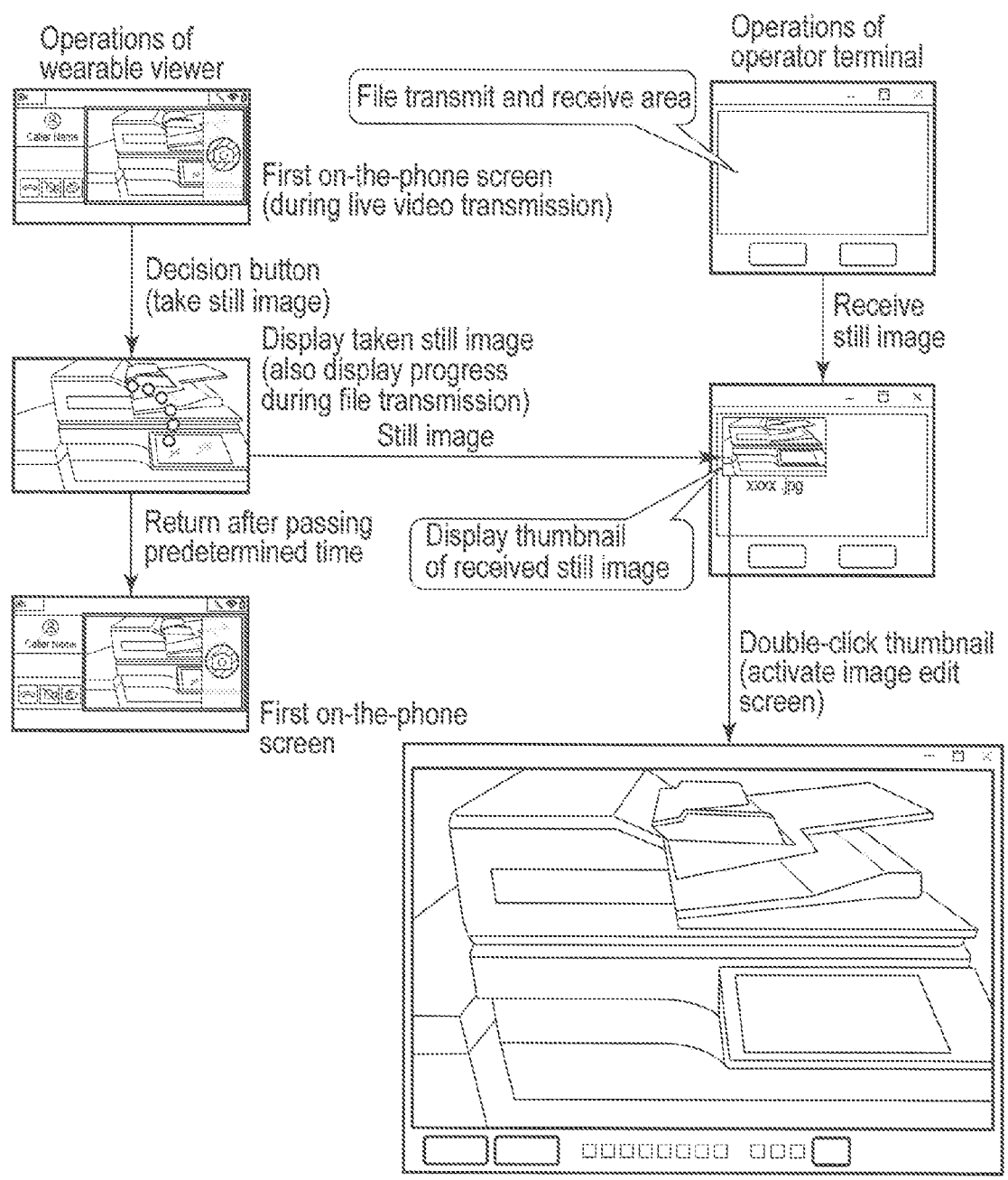
FIG. 27 is a diagram showing a user interface on the wearable viewer side and a user interface on the operator terminal 12 side in a case where a still image is taken in the standard mode and the taken still image is transmitted from the mobile PC 16 to the operator terminal 12.

FIG. 27 shows a user interface provided in a case where a still image is taken in the standard mode and transmitted from the mobile PC 16 to the operator terminal 12 (FIG. 18).

If the wearable viewer side takes a still image in the standard mode while the mobile PC 16 is distributing the live video to the operator terminal 12, the worker needs to place the focus in the preview area 603 on the on-the-phone screen during live video transmission (first on-the-phone screen). That is, the worker needs to operate the right button 202b to allow the live video displayed on the display 124 to be enclosed by a white frame.

With the live video enclosed by the white frame in the first on-the-phone screen, when the operator presses the decision button 202e, a still image is taken. When the still image is taken, the taken still image is displayed in the full-screen mode. The taken still image is also transmitted to the operator terminal 12 (operator on the phone). When the transmission of the still image is completed, the displayed screen returns from the state where the still image is displayed in the full-screen mode to the state where the first on-the-phone screen is displayed.

On the other hand, on the operator terminal 12 side, the file transmit and receive screen 710 needs to be displayed before the still image is received from the mobile PC 16.

With the file transmit and receive screen 710 displayed, if the operator terminal 12 receives the still image transmitted from the mobile PC 16, then a thumbnail of the received still image (received image) is displayed in the file receive area 740 in the file transmit and receive area 760 on the file transmit and receive screen 710. When the operator selects (double-clicks) the thumbnail of the received image, the image edit screen 715 is activated to display the selected still image thereon. Consequently, the operator may edit the selected still image, for example, adding an annotation to the still image, and the like.

Figure 19:
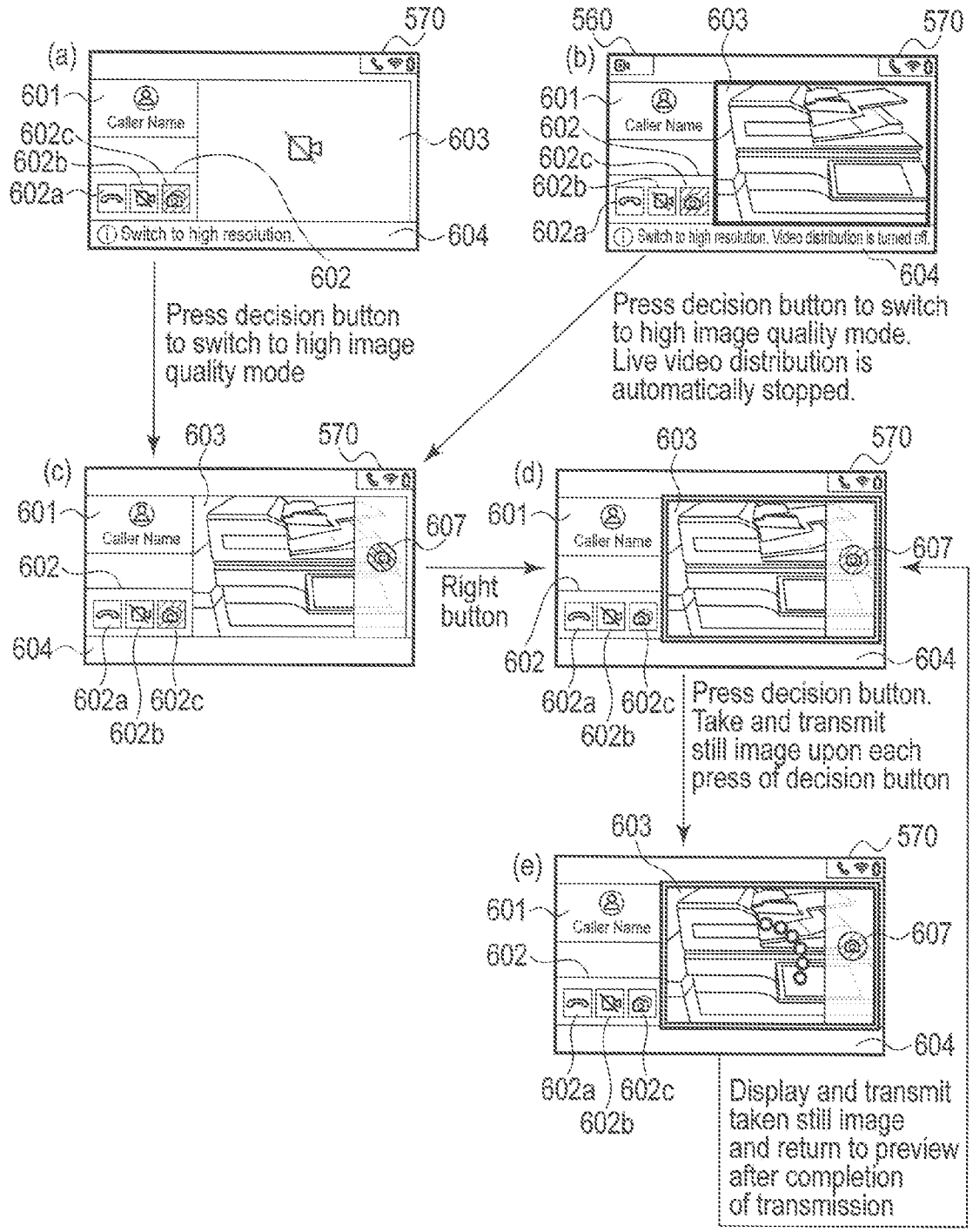
FIG. 19 is a diagram showing an example of transition of the screen displayed on the wearable device 23 in a case where a still image is taken in a high image quality mode while the mobile PC 16 and the operator terminal 12 are in a voice call session.
Figure 28:
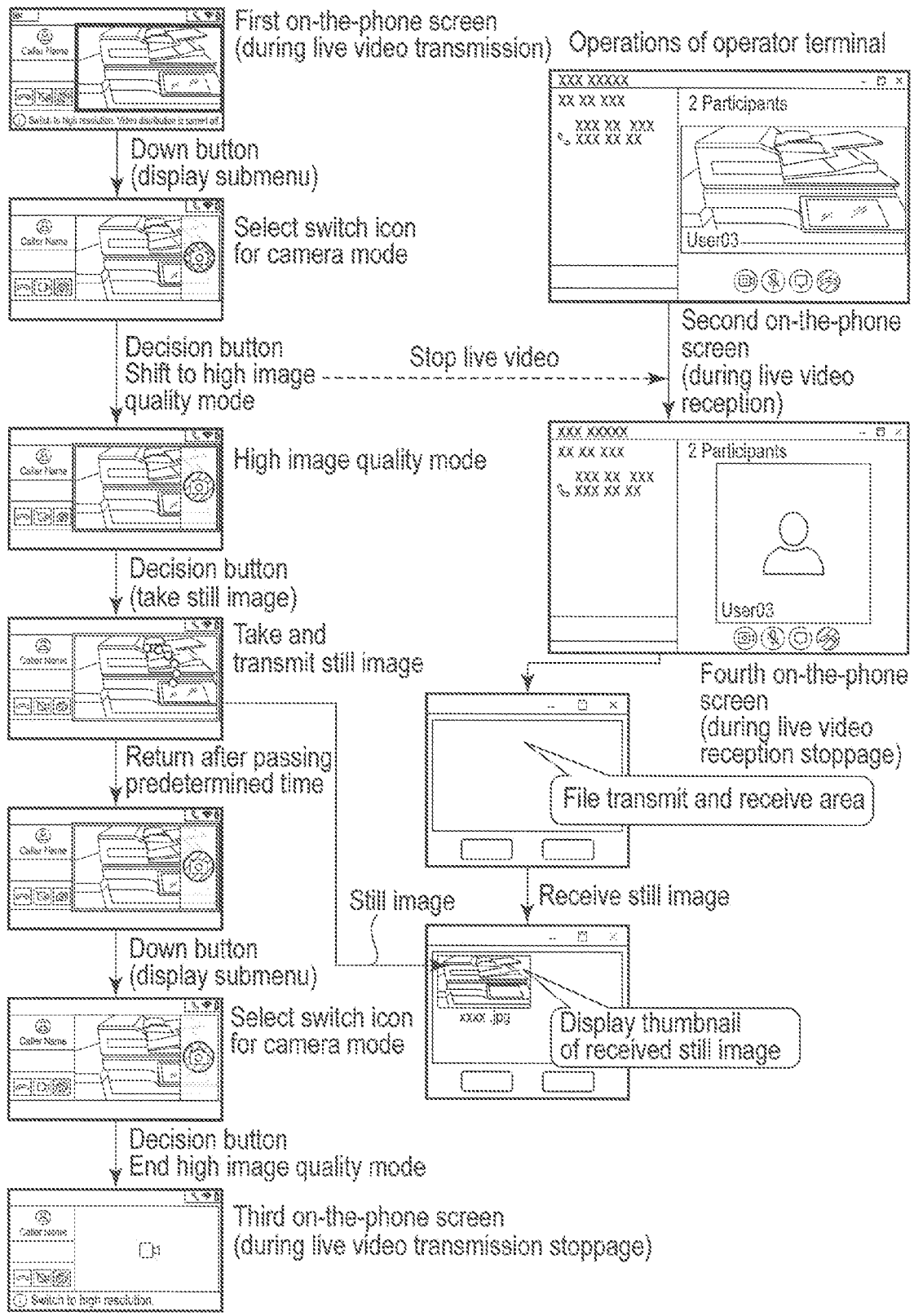
FIG. 28 is a diagram showing a user interface on the wearable viewer side and a user interface on the operator terminal 12 side in a case where a still image is taken in the high image quality mode and the taken still image is transmitted from the mobile PC 16 to the operator terminal 12.

FIG. 28 shows a user interface provided in a case where a still image is taken in the high image quality mode and the taken still image is transmitted from the mobile PC 16 to the operator terminal 12 (FIG. 19).

On the wearable viewer side, if a still image is taken in the high image quality mode while the mobile PC 16 is distributing a live video to the operator terminal 12, the image taking mode of the camera 116 needs to be switched from the standard mode to the high image quality mode.

With the on-the-phone screen during live video transmission (first on-the-phone screen) displayed, when the worker selects the image taking mode switch icon 602c and presses the decision button 202e, the image taking mode is switched to the high image quality mode. At this time, a preview image from the camera 116 is displayed on the on-the-phone screen.

When the mode of the camera 116 is switched, the worker presses the down button 202c on the first on-the-phone screen to display a sub-menu for a change in camera mode. Furthermore, the mobile PC 16 stops the live video distribution to the operator terminal 12 before the mode of the camera 116 is switched to the high image quality mode.

On the operator terminal 12 side, when the live video transmission from the mobile PC 16 is stopped, the displayed screen is switched from the second on-the-phone screen to the fourth on-the-phone screen. As described above, the second on-the-phone screen is the on-the-phone screen during live video reception, and the fourth on-the-phone screen is the on-the-phone screen during live video reception stoppage on the operator terminal 12 side.

On the wearable viewer side, when the worker presses the decision button 202e with the preview image from the camera 116 displayed on the on-the-phone screen, a still image is taken in the high image quality mode (photo taking). Subsequently, the mobile PC 16 transmits the taken still image (photograph) to the operator terminal 12. Furthermore, the taken still image (photograph) is displayed on the on-the-phone screen. After passing a predetermined time, the displayed screen of the display 124 returns to the on-the-phone screen with the preview image from the camera 116 displayed thereon.

Subsequently, when the image taking mode switch icon 602c is selected and the decision button 202e is pressed, the image taking mode is switched from the high image quality mode to the standard mode. At this time, the screen displayed on the display 124 is switched to the on-the-phone screen during live video transmission stoppage (third on-the-phone screen).

On the operator terminal 12 side, when the operator terminal 12 receives the still image (photograph) transmitted from the mobile PC 16, a thumbnail of the received still image (photograph) is displayed in the file receive area 740 on the file transmit and receive screen 710. As described above, the file receive area 740 corresponds to the left half of the file transmit and receive area 760.

Figure 29:
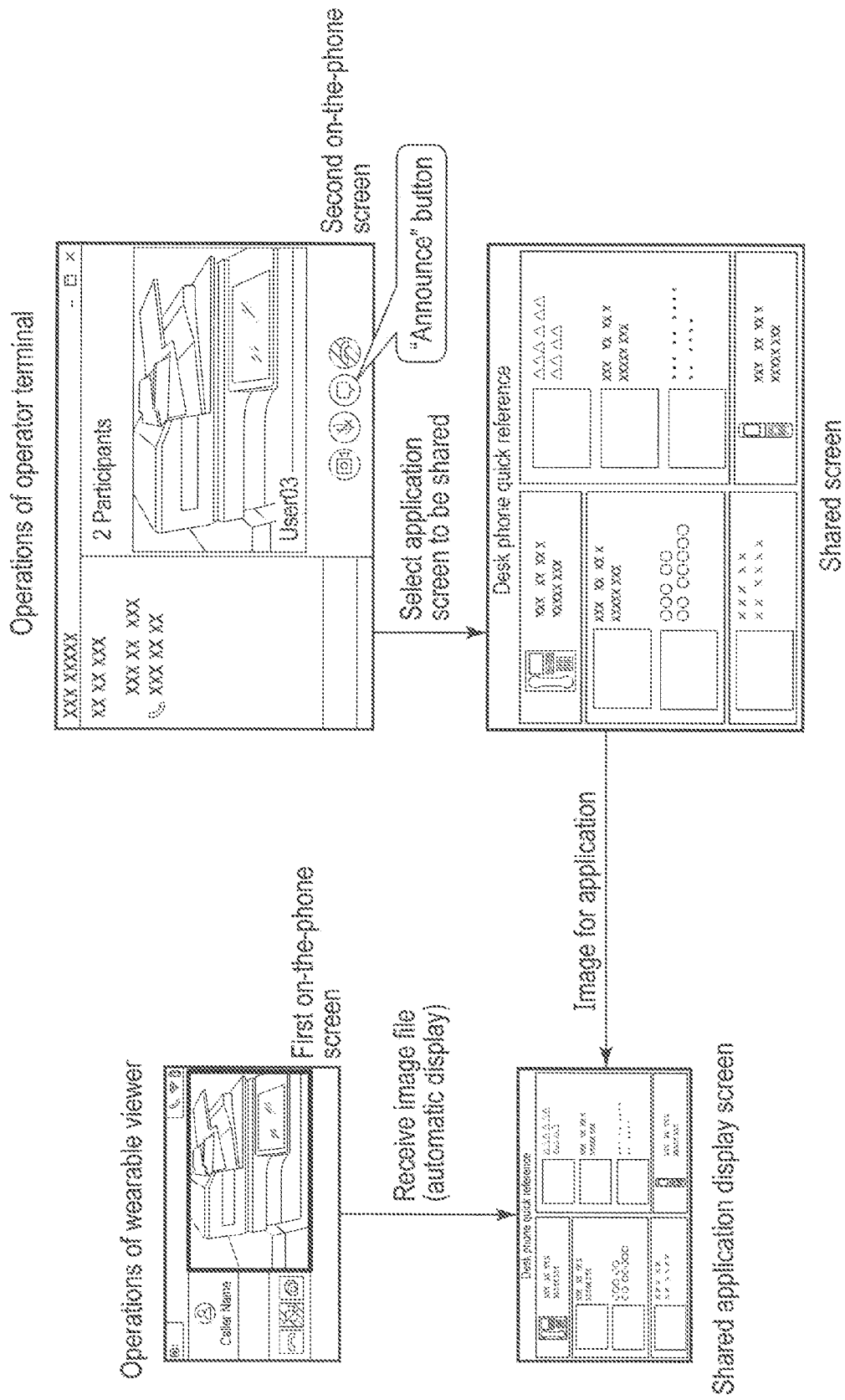
FIG. 29 is a diagram showing a user interface on the wearable viewer side and a user interface on the operator terminal 12 side in a case where a desktop screen of the operator terminal 12 or a screen of an application in operation is shared with the mobile PC 16 which is in communication with the operator terminal 12.

FIG. 29 shows a user interface provided in a case where the desktop screen of the operator terminal 12 or a screen of the application in operation is shared with the mobile PC 16 which is in communication with the operator terminal 12. FIG. 29 relates to the above description of the [Screen Share Function]. FIG. 29 shows a case where the screen is shared during live video distribution.

While the operator terminal 12 is in a voice call session with the mobile PC 16, the operator is assumed to desire to share a certain screen of the application with the worker on the phone. Then, as illustrated in FIG. 29, when the operator selects the screen of the application to be shared, further selects an announce button on the second on-the-phone screen, and depresses the decision button 202e, an image for the selected application is transmitted to the mobile PC 16.

On the wearable viewer side, when the image for the application (image file) transmitted from the operator terminal 12 is received, the received image is automatically displayed on the display 124. That is, the first on-the-phone screen is switched to a share display screen with the received image (transmitted image for the application) displayed thereon. Consequently, the screen selected by the operator may be shared between the wearable viewer side and the operator terminal 12 side.

FIG. 29 shows a case where the screen share is executed during live video distribution. However, the screen share may be executed during other than the live video distribution. In this case, on the operator terminal 12 side, when the operator selects the image for the application to be shared, then selects the announce button, and presses the decision button 202e, the selected image for the application is transmitted to the mobile PC 16. Furthermore, on the wearable viewer side, if the mobile PC 16 receives the image for the application with the third on-the-phone screen displayed on the display, the third on-the-phone screen transitions to the share display screen.

Figure 30:
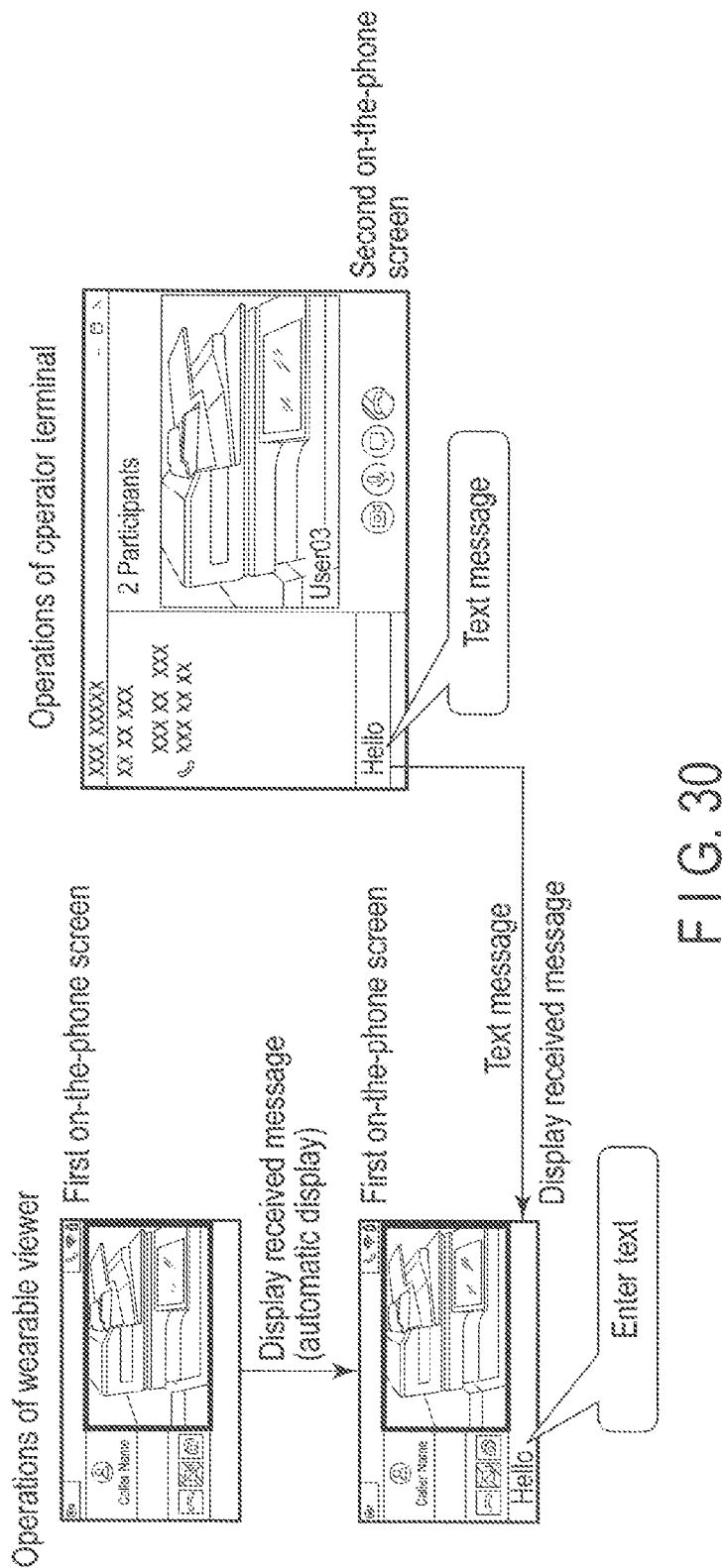
FIG. 30 is a sequence diagram showing a user interface on the wearable viewer side and a user interface on the operator terminal 12 side in a case where a text message is transmitted from the operator terminal 12 to the mobile PC 16.

FIG. 30 shows a user interface provided in a case where the operator terminal 12 transmits a text message to the mobile PC 16. FIG. 30 shows a case where a live video is distributed from the mobile PC 16 (FIG. 20(*a*)).

If the operator transmits a text message to the worker on the phone, when the operator enters the text onto the second on-the-phone screen and performs a transmitting operation, the entered text is transferred from the operator terminal 12 to the mobile PC 16.

On the wearable viewer side, when the text (text message) from the operator terminal 12 is received, the received text is displayed on the first on-the-phone screen displayed on the display 124. More specifically, the received text is displayed in the message area on the first on-the-phone screen.

In an example in FIG. 30, on the operator terminal 12 side, "Hello" is entered, and thus, on the wearable viewer side, "Hello" is displayed in the message area on the first on-the-phone screen.

The operator terminal 12 can transmit a text message even while the mobile PC 16 is not distributing any live video. If the mobile PC 16 and the operator terminal 12 are in a voice call session with no live video distributed, the operator enters a text onto the fourth on-the-phone screen. Furthermore, on the wearable viewer side, the received text is displayed on the third on-the-phone screen.

Even if the mobile PC 16 and the operator terminal 12 are not in a voice call session, the mobile PC 16 may receive a text message. In this case, operations on the wearable viewer side are as shown in FIG. 20(b).

[Sequence Diagram]

Figure 31:
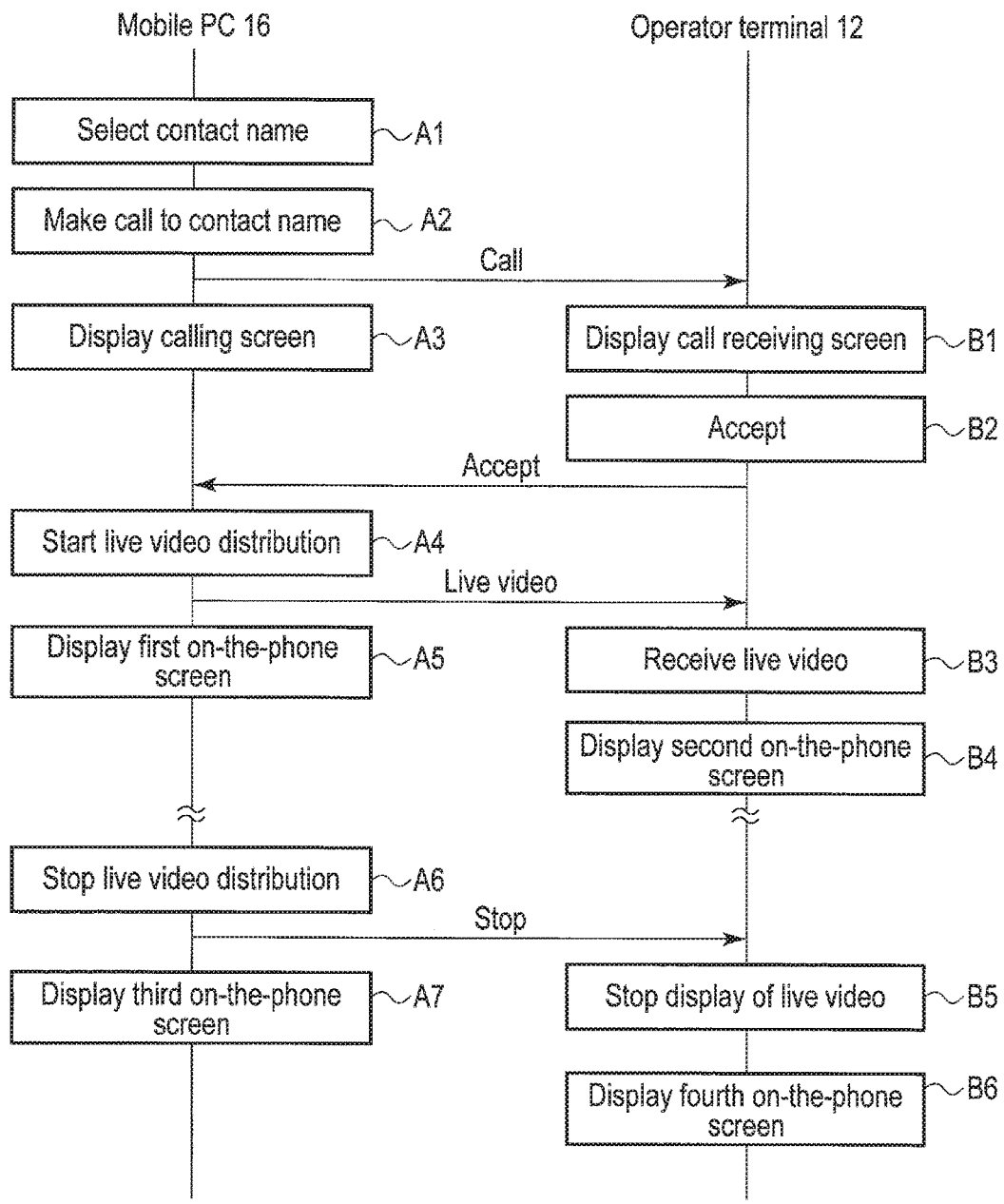
FIG. 31 is a sequence diagram showing an example of an operation of distributing a live video to the operator terminal 12 in a case where the operator terminal 12 receives a call from the mobile PC 16.

FIG. 31 is a sequence diagram showing an operation of distributing a live image to the operator terminal 12 when a call from the mobile PC 16 is received by the operator terminal 12.

If the worker desires to talk on the phone with the operator, the worker allows the contact list screen to be displayed by using the Conversation icon arranged in the communication area 520 on the home screen as shown in FIG. 12(e) and FIG. 12(f). The worker then selects one of the contact names in the contact name list displayed on the contact list screen (step A1). When the worker further presses the decision button 202e, the mobile PC 16 makes a call (voice call request) to the contact name (operator terminal 12) (step A2).

When the call (voice call request) is made from the mobile PC 16 to the operator terminal 12, the display 124 displays the calling screen (the third screen from the top on the left side of FIG. 25) (step A3).

On the operator terminal 12 side, the operator terminal 12, upon receiving the call (voice call request) from the mobile PC 16, displays the call receiving screen (the uppermost screen on the right side of FIG. 25) on the LCD 64 (step B1). When the operator presses the accept button of the operator terminal 12, the call (voice call request) from the mobile PC 16 is accepted (step B2). Consequently, a voice call path between the mobile PC 16 and the operator terminal 12 is established to allow a voice call session to be started.

When the voice call session is started, distribution of a live video taken with the camera 116 to the operator terminal 12 is automatically started (step A4). Then, the first on-the-phone screen (the fourth screen from the top on the left side of FIG. 25) is displayed on the display 124 (step A5). The first on-the-phone screen displays the transmitted live video.

On the operator terminal 12 side, the operator terminal 12 receives the live video transmitted from the mobile PC 16 (step B3) and displays the second on-the-phone screen (the second screen from the top on the right side of FIG. 25) on the LCD 64 (step B4). The second on-the-phone screen displays the received live video.

After the live video is distributed for a while, if the operator selects the live video distribution start/stop icon 602b on the first on-the-phone screen and presses the decision button 202e, then the live video distribution from the mobile PC 16 is stopped (step A6). Then, the third on-the-phone screen (the lowermost screen on the left side of FIG. 25) is displayed on the display 124 (step A7).

On the operator terminal 12 side, when the live video distribution from the mobile PC 16 is stopped, the operator terminal 12 stops the display of the live video on the LCD 64 (step B5). Then, the fourth on-the-phone screen (the lowermost screen on the right side of FIG. 25) is displayed on the LCD 64 (step B6).

Figure 32:
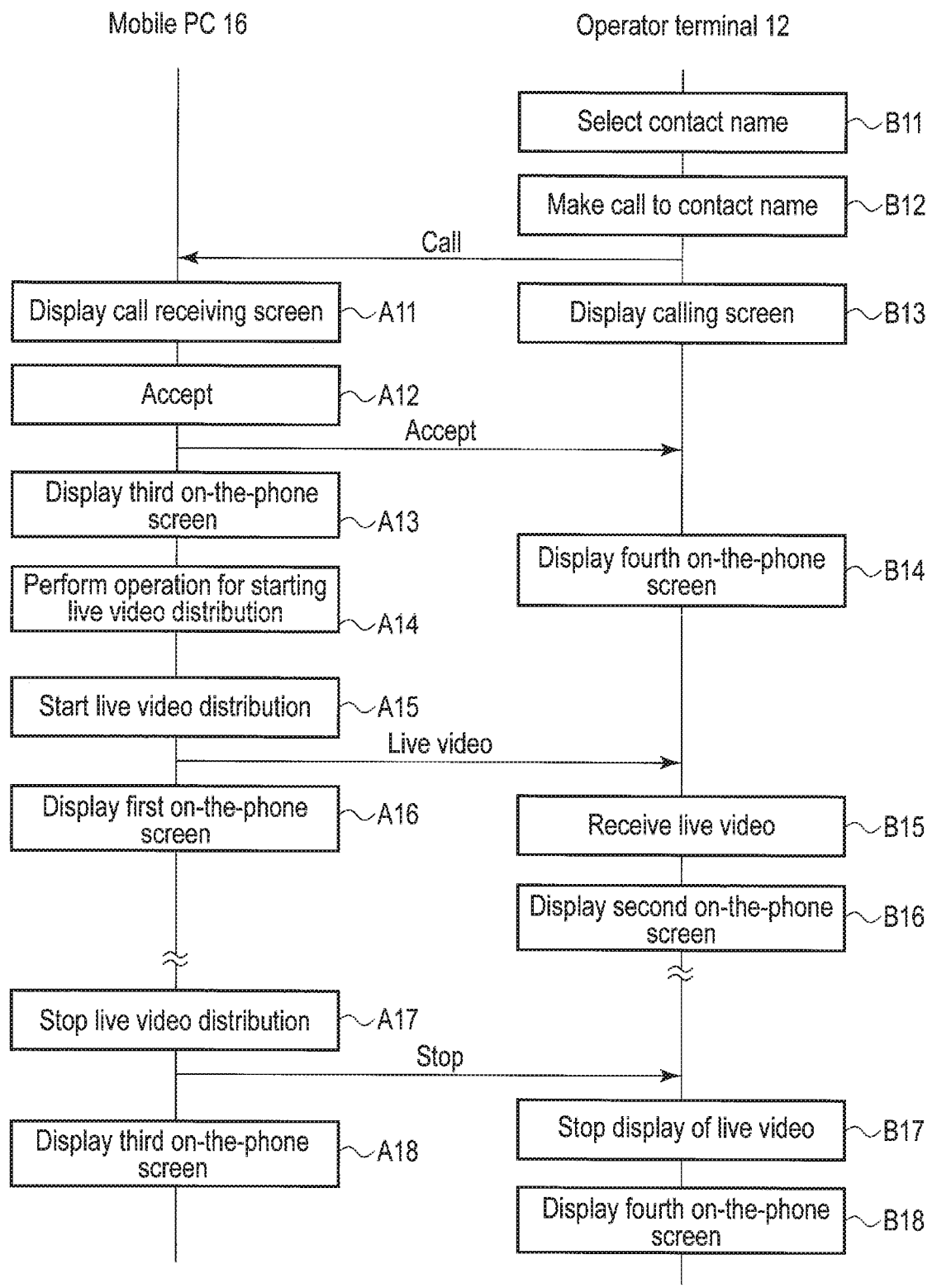
FIG. 32 is a sequence diagram showing an example of an operation of distributing a live video to the operator terminal 12 in a case where the mobile PC 16 receives a call from the operator terminal 12.

FIG. 32 is a sequence diagram showing an operation of distributing a live video to the operator terminal 12 when a call from the operator terminal 12 is received by the mobile PC 16.

If the operator desires to talk on the phone with a certain worker, the operator selects one of the contact names on a prescribed screen (the uppermost screen on the right side of FIG. 26) displayed on the LCD 64 which contact name corresponds to the certain worker with whom the operator desires to talk on the phone. When the operator selects the contact name (step B11) and performs the decision operation, the operator terminal 12 makes a call (voice call request) to the mobile PC 16 corresponding to the selected contact name (step B12). At this time, the calling screen (the second screen from the top on the right side of FIG. 26) is displayed on the LCD 64 of the operator terminal 12 (step B13).

Upon receiving the call (voice call request) from the operator terminal 12, the mobile PC 16 displays the call receiving screen (the second screen from the top on the left side of FIG. 26) on the display 124 (step A11). When the worker presses the decision button 202e, the call (voice call request) from the operator terminal 12 is accepted (step A12). Consequently, a voice call path between the mobile PC 16 and the operator terminal 12 is established to allow a voice call session to be started. Then, the mobile PC 16 displays the third on-the-phone screen (the third screen from the top on the left side of FIG. 26) on the display 124 of the wearable device main body 24 (step A13).

On the operator terminal 12 side, if the call (voice call request) is accepted, the operator terminal 12 displays the fourth on-the-phone screen (the third screen from the top on the right side of FIG. 26) on the LCD 64 (step B14).

If the worker performs an operation for live video distribution (step A14), the mobile PC 16 starts to distribute a live video taken with the camera 116 to the operator terminal 12 (step A15). Specifically, the operation for live video distribution refers to selecting the live video distribution start/stop icon 602b on the third on-the-phone screen and pressing the decision button 202e. Then, the mobile PC 16 displays the first on-the-phone screen (the lowermost screen on the left side of FIG. 26) on the display 124 (step A16). The first on-the-phone screen displays the distributed live video.

On the operator terminal 12 side, when the live video distribution from the mobile PC 16 is started, the operator terminal 12 receives the live video (step B15). The operator terminal 12 then displays the second on-the-phone screen (the lowermost screen on the right side of FIG. 26) on the LCD 64 (step B16). The second on-the-phone screen displays the received live image.

Stoppage of the live video distribution is similar to the stoppage of steps A6 and A7 and of steps B5 and B6 in FIG. 31. That is, steps A17, A18 in FIG. 32 correspond to steps A6, A7 in FIG. 31 respectively, and steps B17, B18 in FIG. 32 correspond to steps B5, B6 in FIG. 32 respectively.

Figure 33:
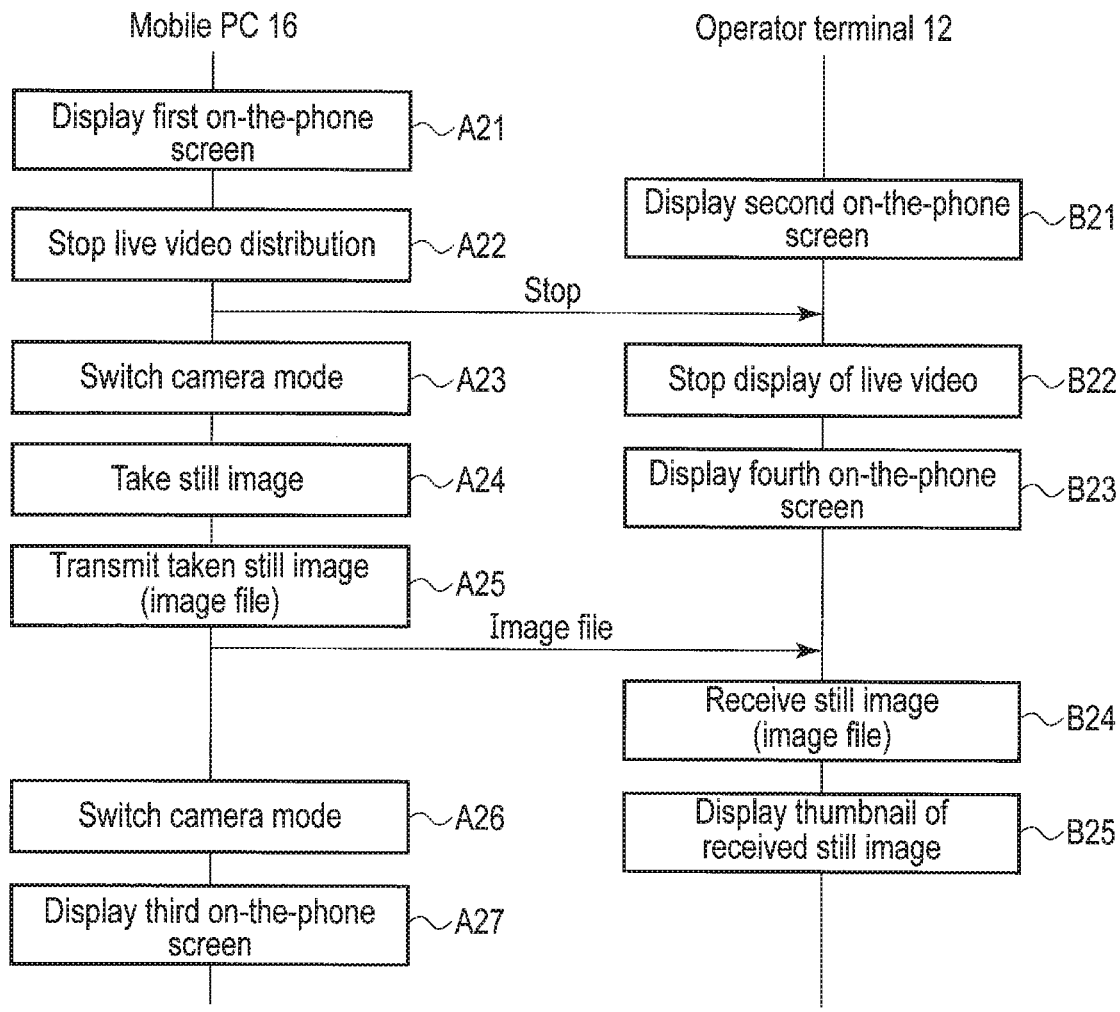
FIG. 33 is a sequence diagram showing an example of an operation in which a still image is taken in the high image quality mode and the taken high-quality still image is transmitted from the mobile PC 16 to the operator terminal 12.

FIG. 33 is a sequence diagram showing an operation of taking a still image in the high image quality mode and transmitting the taken high-image-quality still image from the mobile PC 16 to the operator terminal 12.

While distributing a live video to the operator terminal 12, the mobile PC 16 displays the first on-the-phone screen (the uppermost screen on the left side of FIG. 28) on the display 124 (step A21).

Furthermore, while receiving the live video from the mobile PC 16, the operator terminal 12 displays the second on-the-phone screen (the uppermost screen on the right side of FIG. 28) (step B21).

When the worker selects the image taking mode switch icon 602c on the first on-the-phone screen and presses the decision button 202e, the mobile PC 16 stops the live video distribution to the operator terminal 12 (step A22). Subsequently, the image taking mode of the camera 116 is switched to the high image quality mode (step A23).

On the operator terminal 12 side, when the live video distribution from the mobile PC 16 is stopped, the operator terminal 12 stops the display of the live video on the LCD 64 (step B22). Then, the operator terminal 12 displays the fourth on-the-phone screen (the second screen from the top on the right side of FIG. 28) on the LCD 64 (step B23).

If the worker presses the decision button 202*e*, a still image is taken with the camera 116 in the high image quality mode (step A24). Subsequently, the mobile PC 16 transmits the taken still image (image file) to the operator terminal 12 (step A25).

On the operator terminal 12 side, when the operator terminal 12 receives the still image (image file) transmitted from the mobile PC 16 (step B24), a thumbnail of the received still image is displayed on the LCD 64 (step B25). More specifically, the thumbnail is displayed in the file receive area 740 on the file transmit and receive screen 710 displayed on the LCD 64 (the second screen from the bottom on the right side of FIG. 28). As described above, the file transmit and receive screen 710 needs to remain active before the image is received from the mobile PC 16.

Subsequently, when the worker selects the image taking mode switch icon 602*c* and presses the decision button 202*e*, the image taking mode of the camera 116 is switched from the high image quality mode to the standard mode (step A26). At this time, the mobile PC 16 displays the third on-the-phone screen (the lowermost screen on the left side of FIG. 28) on the display 124 (step A27).

Figure 34:
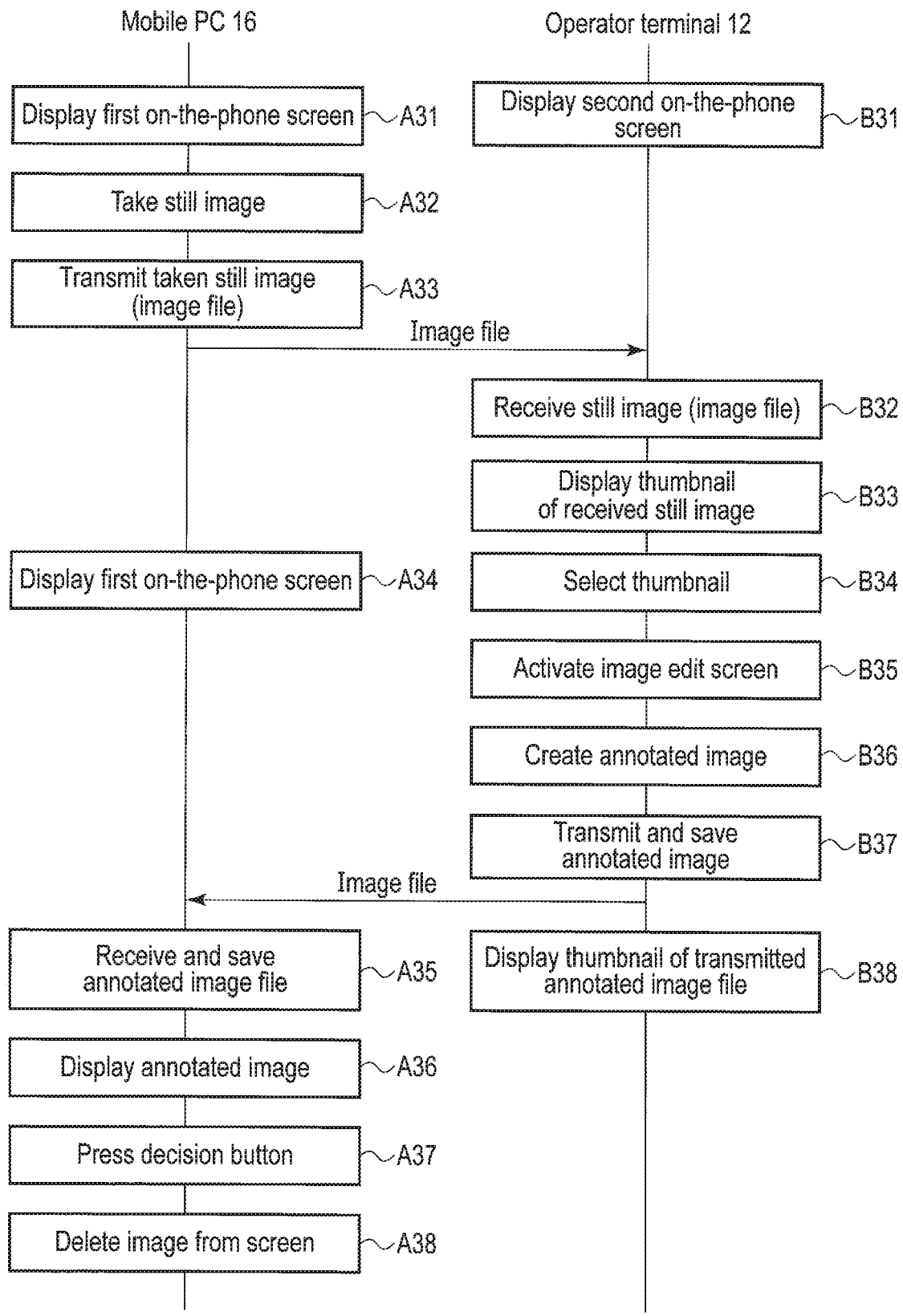
FIG. 34 is a sequence diagram showing an example of an operation of transmitting a still image with an annotation added thereto from the operator terminal 12 to the mobile PC 16.

FIG. 34 is a sequence diagram showing an operation of transmitting a still image with an annotation added thereto from the operator terminal 12 to the mobile PC 16. The operation shown in FIG. 34 is performed while a live video is being distributed from the mobile PC 16 to the operator terminal 12.

While distributing the live video to the operator terminal 12, the mobile PC 16 displays the first on-the-phone screen (the uppermost screen on the left side of FIG. 28) on the display 124 (step A31).

Furthermore, while receiving the live video from the mobile PC 16, the operator terminal 12 displays the second on-the-phone screen (the uppermost screen on the right side of FIG. 28) (step B31).

When the worker performs an operation for still image taking in the standard mode, a still image is taken with the camera 116 (step A32). The operation for still image taking refers to operating an operation button (in this case, the right button 202*b*) to place the focus in the preview area of the first on-the-phone screen to allow the live video to be peripherally enclosed by a white frame, and pressing the decision button 202*e*. Subsequently, the mobile PC 16 transmits the taken still image (image file) to the operator terminal 12 (step A33).

On the operator terminal 12 side, the file transmit and receive screen 710 (the uppermost screen on the right side of FIG. 27) is previously displayed on the LCD 64. The operator terminal 12 then receives the still image (image file) from the mobile PC 16 (step B32), and displays a thumbnail of the still image in the received image file on the LCD 64 (step B33). In actuality, the thumbnail of the still image in the received image file is displayed in the file receive area 740 on the file transmit and receive screen 710 (the second screen from the top on the right side of FIG. 27).

In this case, when the operator performs an operation of selecting any one of the thumbnail still images on the file transmit and receive screen 710 (step B34), the image edit screen 715 is activated (step B35) to display the selected image file thereon (the lowermost screen on the right side of FIG. 27).

When the operator then performs a write operation on the still image selected by the operator, the operator terminal 12 creates an annotated image based on the selected image and the contents written by the write operation (step B36). Subsequently, when the operator presses the file transmit button 722 on the image edit screen 715, a file of the annotated image (the image with the annotation added thereto) is transmitted to the mobile PC 16, and the transmitted image file is saved in the operator terminal 12 (step B37). Furthermore, the operator terminal 12 displays a thumbnail of the transmitted annotated image on the LCD 64 (step B38). In actuality, the thumbnail is displayed in the file transmit area 750 on the file transmit and receive screen 710 (the lowermost screen on the right side of FIG. 23).

Upon receiving the annotated image (the image with the annotation added thereto) from the operator terminal 12, the mobile PC 16 saves the received image (step A35) and displays the image on the display 124 (step A36). At this time, the received image is displayed in the full-screen mode (the second screen from the top on the left side of FIG. 23).

Then, if the operator presses the decision button 202*e* (step A37), the mobile PC 16 deletes the received image (annotated image) from the screen displayed on the display 124 (step A38).

As described above, according to the present embodiment, the remote support application 503 is automatically activated when the home application 502 is activated. Thus, the worker can use the remote support function and receive remote support at any time without the need for an operation of separately activating the remote support application.

Furthermore, according to the present embodiment, the home screen is divided into three horizontally long areas, and each of the areas has a size and a shape which can be varied by moving the focus. The area with the focus placed thereat is the largest in width (vertical width). Thus, the icon in the focus area can be displayed larger than the icons in the other areas and thus has high visibility. The wide area is moved in conjunction with movement of the focus. The upper and lower boundary lines of each area are not linear, and the upper boundary line of the focus area is bent slightly downward (toward the focus area), whereas the lower boundary line of the focus area is bent slightly upward (toward the focus area). Thus, the width of the focus area is smallest at the central portion thereof and increases toward the opposite ends thereof. Thus, the icon positioned in the center of the focus area can be provided with higher visibility.

Moreover, according to the present embodiment, if a voice call session is started in response to a request from the mobile PC 16, live video distribution is automatically started when the voice call session is started. If the voice call session is started in response to a request from the operator terminal 12, the live video distribution is started in accordance with a distribution instructing operation performed by the worker. Thus, the live video distribution reflecting the worker's intension can be achieved.

Furthermore, according to the present embodiment, during the live video distribution, the live video is displayed enclosed by the frame in the first color in the displayed screen. When a still image is taken, the preview image from the camera is displayed enclosed by the frame in the second color different from the first color in the displayed screen. Consequently, the worker can easily recognize that the live video distribution is in execution or that a still image is enabled to be taken.

Moreover, according to the present embodiment, images may be transmitted and received between the mobile PC 16 and the operator terminal 12 while the mobile PC 16 and the operator terminal 12 are in a voice call session. Thus, the remote support provided to the worker by the operator has improved quality, and allows the worker to receive more appropriate remote support. Furthermore, when a still image is taken in the high image quality mode, the live video distribution to the operator terminal 12 is stopped, and prevents the live video distribution from being executed even when not needed. This allows extension of a battery runtime for the mobile PC 16 and the wearable device 23.

Furthermore, according to the present embodiment, the arrangement of the icons on the home screen and the files activated by the selecting operation for the icons are described in XML. Releasing the XML files to end users allows the worker to rewrite the XML description to rearrange the icons on the home screen, add an icon corresponding to an additional application onto the home screen, and delete an icon for an application from the home screen. This enhances the extendability of the front-end application 502.

Moreover, according to the present embodiment, on the operator terminal 12 side, thumbnails of still images transmitted by the operator terminal 12 and thumbnails of still images received by the operator terminal 12 are displayed on the file transmit and receive screen 710 in the respective areas in chronological order (in time series). This facilitates management of the transmitted still images and the received still images by the operator terminal 12. Furthermore, the operator using the operator terminal 12 can view the thumbnails of the transmitted still images and the thumbnails of the received still images in an easy-to-understand manner, and also easily understand the chronological relationship among the transmissions and receptions of the still images.

According to the embodiments, the following system and electronic device are provided.

(1) A system comprising:
a wearable device comprising a first user interface and a display; and
an electronic device comprising a second user interface and causing the display to display a home screen, wherein
the home screen is divided into variable-sized first, second, and third areas,
first icons of a first type are displayed in the first area,
second icons of a second type are displayed in the second area,
third icons of a third type are displayed in the third area,
one area of the first area, the second area, and the third area is selectable by an operation from the first user interface or the second user interface,
the one area is larger than non-selected areas among the first area, the second area, and the third area,
the first icons, the second icons, and the third icons are scrollable by an operation from the first user interface or the second user interface,
a central icon in the one area is larger than other icons in the one area, and
a display format of the central icon in the one area is different from a display format of the other icons in the one area.

(2) The system of (1), wherein the electronic device generates the home screen and causes the display to display the home screen by activating a home application in a front-end application.

(3) The system of (1), wherein
the one area is vertically wider than the non-selected areas, and icons in the one area are larger than icons in the non-selected areas.

(4) The system of (3), wherein
the first user interface is able to move a focus between left and right regions of the one area, and
the second user interface is able to move a focus between left and right regions of the one area,
when the focus is moved to the left or the right regions of the one area based on an operation from the first user interface or the second user interface for the one area, an icon with the focus placed is displayed in a center of the one area.

(5) The system of (4), wherein
related information of the icon with the focus placed is displayed on the home screen, based on an operation from the first user interface or the second user interface for the icon with the focus placed in the one area.

(6) The system of (5), wherein
the related information displayed on the home screen is deleted and the home screen comprising the icon with the focus placed in the one area is displayed again, based on an operation from the first user interface or the second input user interface for the related information displayed on the home screen.

(7) The system of (1), wherein
an icon indicating a state of the wearable device or the electronic device is displayed at a right end or a left end of the first area.

(8) The system of (7), wherein
the state of the wearable device or the electronic device comprises a remaining battery level, a network connection state, or a call state.

(9) The system of (1), wherein
vertical sizes of the first area, the second area, and the third area are respectively changed in accordance with a selection of the one area.

(10) The system of (9), wherein
a boundary between the first area and the second area and a boundary between the second area and the third area are curves, and
a boundary between the one area and an area above or under the one area is a curve projecting to a side of the one area.

(11) The system of (1), wherein
the wearable device further comprises a camera,
the electronic device is connected to an external device, enabling a call to be performed between the electronic device and the external device, and further comprises a memory that stores an image taken by the camera or an image transmitted from the external device,
the first icons comprise icons related to the call with the external device,
the second icons comprise icons related to browsing images stored in the memory, and
the third icons comprise icons related to a taking mode of the camera.

(12) The system of (11), wherein
the second icons comprise an icon related to activation of a content viewer application, and
the third icons comprise an icon related to setting of a wearable viewer.

(13) The system of (11), wherein
after a remote support application with the external device is activated,
a live video taken by the camera during a call with the external device is transmitted to the external device during the call with the external device.

(14) The system of (11), wherein
after a remote support application with the external device is activated,
an image taken by the camera or an image stored in the memory is transmitted to the external device, and
an image transmitted from the external device is received and transmitted to the wearable device.

(15) The system of (11), wherein
after a remote support application with the external device is activated,
an annotated image transmitted from the external device is received and transmitted to the wearable device.

(16) The system of (11), wherein
the second icons are related to browsing a document file, an image file, and a video file stored in the memory.

(17) The system of (11), wherein
the camera is operable in a first mode for taking a still image with a first image quality or a second mode for taking a still image with a second image quality higher than the first image quality.

(18) The system of (11), wherein
the third icons comprise an icon related to activation of a photograph taking function and an icon related to activation of a video taking function.

(19) A system comprising:
a wearable device comprising a camera; and
an electronic device connectable to an external device and the wearable device, wherein
the electronic device comprises a first transmitter,
when a call with the external device is started in response to a request from the electronic device, the first transmitter is configured to transmit a live video taken by the camera to the external device, and
when a call with the external device is started in response to a request from the external device, the first transmitter is configured to transmit the live video to the external device in response to a transmission instruction from the electronic device.

(20) The system of (19), wherein
the wearable device further comprises a display, and
the electronic device further comprises:
a second transmitter configured to transmit a signal for display to the display; and
a display controller configured to cause the display to display the live video to be transmitted to the external device such that the live video is surrounded by a first frame in a first color, and cause the display to display an image from the camera such that the image is surrounded by a second frame in a second color different from the first color.

(21) The system of (19), wherein
the camera is operable in a first mode for taking a photograph with a first image quality or a second mode for taking a photograph with a second image quality higher than the first image quality, and
the first transmitter is configured to stop transmitting the live video to the electronic device when the camera takes a photograph with the second image quality in the second mode while the first transmitter transmits the live video to the electronic device.

(22) A system comprising:
a wearable device comprising a camera and a display;
a first electronic device connectable to the wearable device via a cable; and
a second electronic device wirelessly connectable to the first electronic device, wherein
the wearable device comprises a first transceiver configured to transmit image information to the first electronic device and receive image information from the first electronic device,
the first electronic device comprises:
a first calling unit configured to communicate audio information with the second electronic device;
a second transceiver configured to transmit image information to the wearable device or receive image information from the wearable device during communication of audio information with the second electronic device; and
a third transceiver configured to transmit image information to the second electronic device or receive image information from the second electronic device during communication of audio information with the second electronic device,
the second electronic device comprises:
a second calling unit configured to communicate audio information with the first electronic device; and
a fourth transceiver configured to transmit information to the first electronic device or receive information from the first electronic device during communication of audio information with the first electronic device,
the first electronic device causes the display to display a home screen when the wearable device is connected, and
the home screen comprises an icon configured to operate the second transceiver, the third transceiver or the first calling unit.

(23) The system of (22), wherein
the home screen is described in XML.

(24) An electronic device wirelessly connectable to a wearable device comprising a camera, the electronic device comprising:
a transceiver configured to transmit first image information items to the wearable device, and receive second image information items from the wearable device; and
a display configured to display the first image information items transmitted to the wearable device, and the second image information items received from the wearable device, wherein
the first image information items are displayed in a first area of the display in an order of transmission time, and
the second image information items are displayed in a second area of the display in an order of reception time.

The present invention is not limited to the embodiments described above, and the constituent elements can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:
1. A system comprising:
a wearable device comprising a first user interface and a display; and
an electronic device comprising a second user interface and causing the display to display a home screen, wherein
the home screen is divided into variable-sized first, second, and third areas,
first icons of a first type are displayed in the first area,
second icons of a second type are displayed in the second area,
third icons of a third type are displayed in the third area,
one of the first area, the second area, and the third area is selectable by an operation from the first user interface or the second user interface, the selected area being larger than non-selected areas among the first area, the second area, and the third area,
icons displayed in the selected area among the first icons, the second icons, and the third icons are scrollable by an operation from the first user interface or the second user interface, a central icon displayed in the selected area among the first area, the second area, and the third area displayed in the home screen being kept larger than other icons displayed in the selected area and icons displayed in the non-selected areas while any one of the first area, the second area, and the third area is being selected, the central icon being displayed in the center of the first area, the second area, or the third area when the first area, the second area, or the third area is respectively selected, and a display format of the central icon in the selected area is different from a display format of the other icons in the selected area.

2. The system of claim 1, wherein the electronic device generates the home screen and causes the display to display the home screen by activating a home application in a front-end application.

3. The system of claim 1, wherein:
the selected area is vertically wider than the non-selected areas, and
icons in the selected area are larger than icons in the non-selected areas.

4. The system of claim 3, wherein:
the first user interface is able to move a focus between left and right regions of the one area, and
the second user interface is able to move a focus between left and right regions of the one area,
when the focus is moved to the left or the right regions of the selected area based on an operation from the first user interface or the second user interface for the selected area, an icon with the focus placed is displayed in a center of the selected area.

5. The system of claim 4, wherein related information of the icon with the focus placed is displayed on the home screen, based on an operation from the first user interface or the second user interface for the icon with the focus placed in the selected area.

6. The system of claim 5, wherein the related information displayed on the home screen is deleted and the home screen comprising the central icon with the focus placed in the selected area is displayed again, based on an operation from the first user interface or the second user interface for the related information displayed on the home screen.

7. The system of claim 1, wherein an icon indicating a state of the wearable device or the electronic device is displayed at a right end or a left end of the first area.

8. The system of claim 7, wherein the state of the wearable device or the electronic device comprises a remaining battery level, a network connection state, or a call state.

9. The system of claim 1, wherein vertical sizes of the first area, the second area, and the third area are respectively changed in accordance with a selection of the selected area.

10. The system of claim 9, wherein:
a boundary between the first area and the second area and a boundary between the second area and the third area are curves, and a boundary between the one area and an area above or under the selected area is a curve projecting to a side of the selected area.

11. The system of claim 1, wherein:
the wearable device further comprises a camera,
the electronic device is connected to an external device, enabling a call to be performed between the electronic device and the external device, and further comprises a memory that stores an image taken by the camera or an image transmitted from the external device,
the first icons comprise icons related to the call with the external device,
the second icons comprise icons related to browsing images stored in the memory, and
the third icons comprise icons related to a taking mode of the camera.

12. The system of claim 11, wherein:
the second icons comprise an icon related to activation of a content viewer application, and
the third icons comprise an icon related to setting of a wearable viewer.

13. The system of claim 11, wherein:
after a remote support application with the external device is activated, and
a live video taken by the camera during a call with the external device is transmitted to the external device during the call with the external device.

14. The system of claim 11, wherein:
after a remote support application with the external device is activated,
an image taken by the camera or an image stored in the memory is transmitted to the external device, and
an image transmitted from the external device is received and transmitted to the wearable device.

15. The system of claim 11, wherein:
after a remote support application with the external device is activated,
an annotated image transmitted from the external device is received and transmitted to the wearable device.

16. The system of claim 11, wherein the second icons are related to browsing a document file, an image file, and a video file stored in the memory.

17. The system of claim 11, wherein the camera is operable in a first mode for taking a still image with a first image quality or a second mode for taking a still image with a second image quality higher than the first image quality.

18. The system of claim 11, wherein the third icons comprise an icon related to activation of a photograph taking function and an icon related to activation of a video taking function.

19. The system of claim 1, wherein in the selected area, only the central icon is displayed larger than other icons in the selected area.

20. The system of claim 1, wherein in the selected area, the central icon displayed larger than other icons in the selected area is switchable between the icons in the selected area.

* * * * *